(12) United States Patent
Wagner et al.

(10) Patent No.: US 12,519,666 B1
(45) Date of Patent: Jan. 6, 2026

(54) CREATING A BLOCK FOR A BLOCKCHAIN IN AN ASYNCHRONOUS BLOCKCHAIN ENVIRONMENT

(71) Applicant: Vendia, Inc., San Francisco, CA (US)

(72) Inventors: Timothy Allen Wagner, Seatle, WA (US); Rory Jacob, Seattle, WA (US); David Carroll, Seattle, WA (US)

(73) Assignee: Vendia, Inc., San Francisco, CA (US)

( * ) Notice: Subject to any disclaimer, the term of this patent is extended or adjusted under 35 U.S.C. 154(b) by 0 days.

(21) Appl. No.: 18/972,580

(22) Filed: Dec. 6, 2024

(51) Int. Cl.
*H04L 9/00* (2022.01)
*G06Q 20/38* (2012.01)
*G06Q 20/40* (2012.01)
*H04L 9/32* (2006.01)

(52) U.S. Cl.
CPC ........... *H04L 9/50* (2022.05); *G06Q 20/3825* (2013.01); *G06Q 20/401* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 5,912,621 A | 6/1999 | Schmidt | |
| 10,951,958 B1 | 3/2021 | Arana et al. | |
| 11,489,693 B2 * | 11/2022 | Daniel | H04L 63/10 |
| 2019/0273610 A1 | 9/2019 | Fan et al. | |
| 2020/0320222 A1 | 10/2020 | Zhou et al. | |
| 2020/0356991 A1 | 11/2020 | Saraniecki et al. | |
| 2021/0006400 A1 | 1/2021 | Hu et al. | |
| 2021/0014042 A1 * | 1/2021 | Sivathanu | H04L 9/0637 |
| 2021/0084174 A1 | 3/2021 | Xu et al. | |
| 2022/0107918 A1 | 4/2022 | Maurer et al. | |
| 2023/0291561 A1 * | 9/2023 | Trock | H04L 9/3239 |
| 2024/0212040 A1 * | 6/2024 | Narayanam | H04L 9/50 |

FOREIGN PATENT DOCUMENTS

| | | |
|---|---|---|
| CN | 110019516 | 7/2019 |
| CN | 114048270 | 2/2022 |

OTHER PUBLICATIONS

Mizrahi, A., Koren, N., Rottenstreich, O. and Cassuto, Y., 2024. Traffic-Aware Merkle Trees for Shortening Blockchain Transaction Proofs. IEEE/ACM Transactions on Networking. (Year: 2024).*
Bruschi, F., Rana, V., Pagani, A. and Sciuto, D., 2020. Tunneling trust into the blockchain: a merkle based proof system for structured documents. IEEE Access, 9, pp. 103758-103771. (Year: 2020).*
Narayanam et al., "Atomic Execution of Optimization Transactions on Permissioned Blockchains," 2021 IEEE International Conference on Blockchain and Cryptocurrency (ICBC), pp. 1-19, IEEE, 2021 (Year: 2021).
U.S. Appl. No. 19/097,431, filed Apr. 1, 2025, Dural.
U.S. Appl. No. 18/972,537, filed Dec. 6, 2024, Mueller.
U.S. Appl. No. 18/972,653, filed Dec. 6, 2024, Mueller.

* cited by examiner

*Primary Examiner* — Roderick Tolentino
*Assistant Examiner* — Edward X Long
(74) *Attorney, Agent, or Firm* — Knobbe, Martens, Olson & Bear, LLP

(57) ABSTRACT

Systems and methods are disclosed for generating a block for a blockchain in an asynchronous blockchain environment. A participant node receives an instruction to generate a block for the blockchain, identifies transactions to be processed, processes the identified transactions asynchronously, and creates a block based on the processed transactions.

18 Claims, 13 Drawing Sheets

| Transaction | #1 | #2 | #3 | #4 | #5 | #6 | #7 | #8 | #9 |
|---|---|---|---|---|---|---|---|---|---|
| Owner Node | A | B | C | AB | BC | AC | B | C | A |
| Data Updated | 123.4 | 456.7 | 987.4 | A(454) B(787) | B(999) C(888) | A(444) C(555) | 456.8 | 987.5 | 123.5 |

*FIG. 4B*

CREATING A BLOCK FOR A BLOCKCHAIN IN AN ASYNCHRONOUS BLOCKCHAIN ENVIRONMENT

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

Cloud service providers can provide computing resources in a variety of forms, which may be combined by users to provide desired functions or services. For example, a cloud provider can provide compute resources, like virtual machines, that conduct computation, block storage resources that act as virtual hard drives for compute resources, object storage services that act as network-accessible data stores, and the like. A cloud provider can further provide "control plane" functionalities, that control or configure other services (like compute services, storage services, or more complex services built on compute and storage services). For example, control plane functionalities can provide access control, including authorization and authentication services, configuration and versioning services, and monitoring and logging services. Clients may combine cloud services to provide a wide variety of computing functionalities via the cloud.

BRIEF DESCRIPTION OF THE DRAWINGS

Illustrative examples are described in detail below with reference to the following figures:

FIG. 4B depicts a table of example transactions with corresponding data updates for the example transactions;

DETAILED DESCRIPTION

Figure 1:
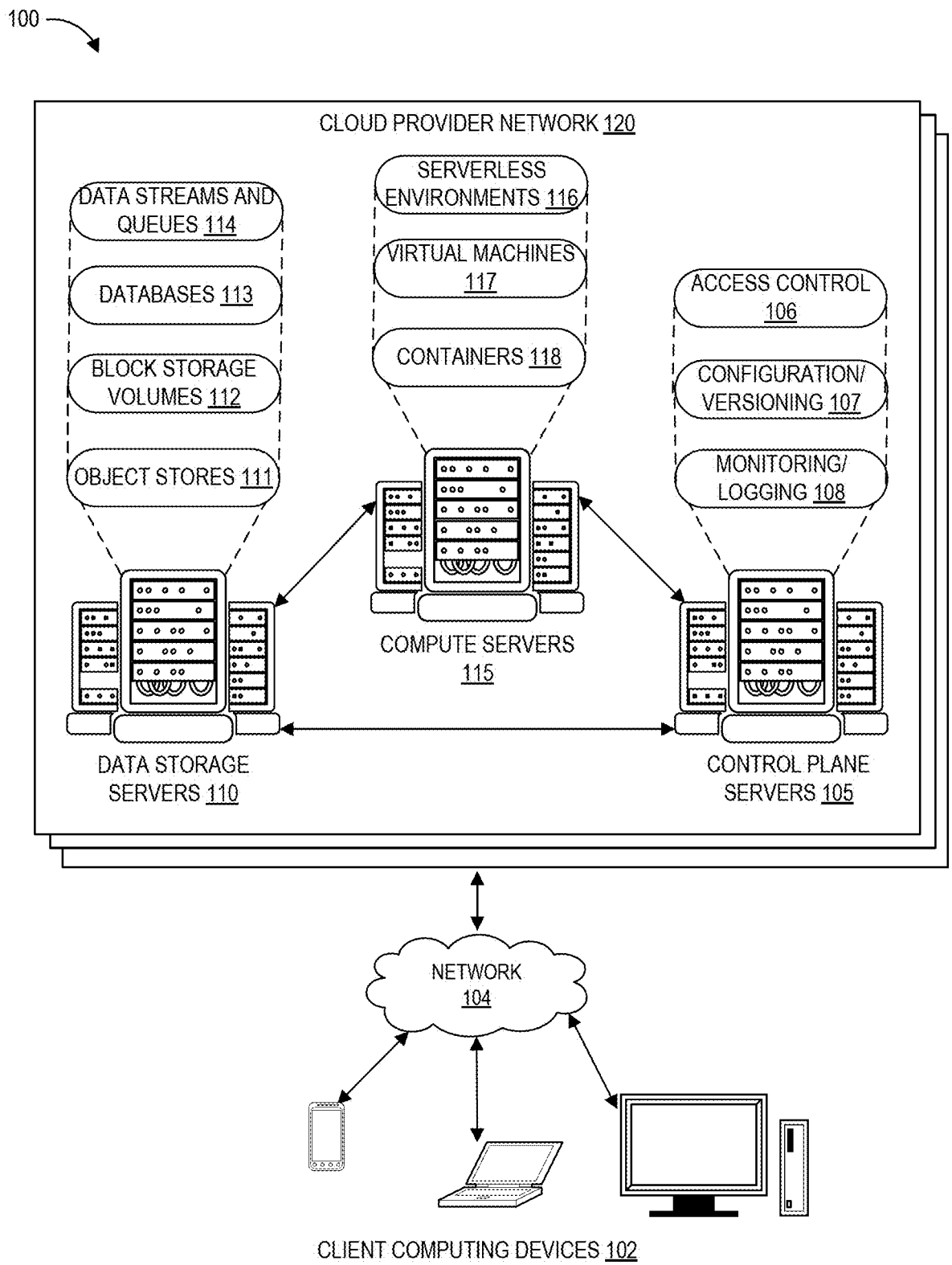
FIG. 1 depicts an example computing environment including one or more cloud provider networks in which embodiments of the present disclosure can be implemented.

Aspects of the present disclosure relate to efficiently and securely implementing blockchains by allowing a participant node of a blockchain system to modify data in a distributed ledger and asynchronously communicate the modification to other participant nodes of the blockchain system. As described herein, modifying data in the distributed ledger can mean adding or creating new entries, updating existing entries, deleting entries, and/or other possible changes associated with the distributed ledger. Embodiments of the present disclosure further relate to use of a cloud-primitive blockchain to provide for data sharing between different cloud providers and/or different end users, providing resilient, secure, efficient, and agile data sharing between parties. As used herein, use of cloud resource primitives can alter a number of aspects of blockchain implementation, resulting in more efficient blockchains while maintaining key security benefits, such as a mutually understood trust model.

Generally described, a blockchain can represent a distributed ledger, in which transactions are represented within "blocks" of data that are "chained" in a manner that prevents or substantially inhibits retroactive alteration of transactions. An initial state of the ledger can be recorded in a first block. Thereafter, each transaction (which may include, for example, writing new data, modifying existing data, deleting existing data, etc., all of which may generally be described as entries in the distributed ledger) may be recorded within a subsequent block, with the subsequent block being cryptographically linked to a prior block, such as by including a cryptographic hash value of the prior block (or a subset of data of the prior block) in the subsequent block. Thus, each block in the blockchain can indicate a particular state of the distributed ledger. Due to inclusion of cryptographic hashes, it may be difficult or impossible to alter a block (or "link") in the chain without being detected (e.g., by the cryptographic hash of an altered block not being properly recorded within a subsequent block). In this manner, an auditor may verify the state of the distributed ledger by obtaining the blockchain and "replaying" transactions from the first block to a current block, verifying that cryptographic hashes within the chain match those expected based on the transactions and verifying that the ledger matches state indicated by the transactions.

Due to the cryptographic links within blocks and other security measures-such as a mutually-agreed on consensus for when blocks are to be added to a chain, blockchains are often valued for their security. For example, different parties that do not trust one another may utilize a blockchain to record conveyance of assets, without requiring trust of any respective party to validate that conveyance. However, some aspects of past blockchains that ostensibly add security also significantly reduce these past blockchain's efficiency, resulting in excessive use of computing resources. For example, some past blockchains use multiple rounds (e.g., soliciting votes from participant nodes to approve a transaction, collecting votes for counting, and notifying approval of transaction based on vote counting results) of communication sequentially among participant nodes to achieve consensus among participant nodes, even when a significant portion of communications are for processing transactions modifying data owned by a single participant node in which approvals from other participant nodes might not be necessary. While these blockchains can achieve data consistency and fault tolerance, the communications among the participant nodes may occupy significant communication bandwidth and can become unnecessarily "chatty." Thus, latency associated with these blockchains may increase and throughput may decrease. As a result—and somewhat paradoxically to typical operation of distributed computing systems—these blockchains become less and less efficient as they are adopted by more parties, consuming more and more resources to redundantly perform the same computation.

Past blockchains ostensibly provide for "zero trust" security models, in which each actor need not trust any other actor. However, nearly any blockchain being practically implemented must nevertheless rely on primitives outside the algorithmic model itself that are implicitly trusted. For example, blockchains implemented on the Internet must generally assume that large amounts of Internet traffic are not being manipulated by a sufficiently powerful party. Similarly, blockchains implemented using consumer computing devices must generally assume that component manufactures for such computing devices, including processor manufacturers, memory and storage manufacturers, network interface device manufacturers, etc., are not designing such components in a way to subvert secure operation of the blockchain. Thus, a blockchain is typically not zero trust, but relies on a set of trust primitives. These primitives, in turn, factor into algorithmic operation of the blockchain, modifying how such chains operate. In this way, blockchains are typically "downward trust"-based, insomuch as participants trust the primitives on which the chain is built. Rather than allowing for "zero trust," blockchains in practice often simply avoid trust between participants (which may be referred to as "peer" trust or "sideways" trust).

Embodiments of the present disclosure provide for more efficient operation of a blockchain, while maintaining security and a trust model of such a blockchain (which may be sufficiently similar to or in some ways exceed security and trust models of existing blockchain implementations), by adopting cloud resources as trusted primitives, and allowing a participant node to process some transactions to update data owned by itself without obtaining approvals from other participant nodes and asynchronously communicate the update to other participant nodes for replicating transactions on other participant nodes. These cloud resources may include, for example, compute resources, storage resources, and control plane resources provided by a trusted cloud provider. Similarly to past blockchains, the blockchains disclosed herein may request each participant to place trust within a provider of primitives; trusting, for example, that a cloud provider is operating in a trustworthy manner, similarly to how traditional blockchains may trust that Internet Service Providers and component manufacturers are operating in a trustworthy manner.

Given such trust, many computational inefficiencies of past blockchains can be removed, without altering the security or trust model of a blockchain with respect to untrusted actors (e.g., other end users of the blockchain). For example, recall that "smart contracts" in past blockchains may require independent computation by each verifier, duplicating work and providing for increasing inefficiency as participation in such a blockchain grows. Where cloud resources are adopted as trust primitives, such inefficiency can be replaced by using a trusted cloud computation service to execute code of a smart contract once, in a manner verifiable to all parties. For example, a cloud service provider may provide a "serverless compute" service, which operates to execute a given set of code (a "serverless function") on-demand and provide a result. The provider may further provide for immutability of a set of code, such that once given an identifier (e.g., a name and version number) any request to invoke the set of code with that identifier always results in the same set of code being executed. Under these conditions, a smart contract may be embedded within a set of code submitted to the serverless compute service, and a block may be added to the blockchain to reflect execution of the code within the serverless compute service. The block may include sufficient information to later verify that the expected set of code was actually executed on the serverless compute service, such as the identifier of the set of code, authentication information for the set of code when executed on the serverless compute service, etc. In this manner, only a single execution of the set of code is required to execute the smart contract-because all parties to the blockchain "trust" the serverless compute service, a single execution of the code on the serverless compute service is sufficient to result in a trusted transaction on the blockchain. Accordingly, there is no requirement that each party independently execute the set of code, and the inefficiencies related to independent execution of code by each part is removed.

In some embodiments, a participant node may receive a proposed transaction (e.g., from a user or from other participant nodes) that includes a modification to one or more pieces of data in a distributed ledger represented by a blockchain. The participant node may verify that it has permissions or is authorized (e.g., the participant node has ownership over the data) to modify the one or more pieces of data. In response to verifying that the participant node has authorization to modify the data (e.g., that it owns the data), the participant node may proceed to modify the data in its local instance of the distributed ledger (e.g., the instance at the participant node) without needing to obtain approval from other participant nodes in a network or of a blockchain system. Advantageously, this allows for efficient and quick updates to the blockchain by enabling local modifications (modification at the participant node) without the overhead of consensus from other nodes. After modifying data locally, the participant node may send a notification to other participant node(s) of the blockchain system to inform other participant node(s) that the data has been modified. Advantageously, this allows other participant node(s) in the blockchain system to be aware of the changes and can update their local instances of the distributed ledger asynchronously. The asynchronous communication helps maintain consistency across the distributed ledger while allowing for efficient local updates. By allowing local modifications without waiting for immediate consensus from other participant nodes, the blockchain system can process transactions more quickly and efficiently. This reduces latency and increases the throughput of the blockchain system. Further, as participant nodes can process certain transactions without waiting for upfront network-wide approval or consensus, the blockchain system can be more scalable as the number of nodes increases. Additionally, asynchronous communication of modifications to other participant nodes ensures that all participant nodes eventually have a consistent view of the distributed ledger. This approach also enhances fault tolerance, as nodes can continue to operate and process transactions even if some nodes are temporarily unavailable.

In some embodiments, a participant node (e.g., a first computing node) may receive a proposed transaction that includes modifications to data owned by different participant nodes. For example, the proposed transaction may intend to modify first data in a local instance of a distributed ledger stored on the first computing node and second data in a second local instance of the distributed ledger stored on a second computing node. The first computing node may verify that the first computing node is authorized to modify the first data, and verify that the second computing node is authorized to modify the second data. In response to verifying that the first computing node is authorized to modify the first data and that the second computing node is authorized to modify the second data, the first computing node may send a request to a multi-home node (e.g., a multi-home consensus node) for authorization to initiate the proposed transaction. In response to receiving the authorization to initiate the proposed transaction from the multi-home node, the first computing node may asynchronously modify the first data in the local instance of the distributed ledger without obtaining approval from other computing nodes of a blockchain system. The first computing node may communicate the second modification to the second computing node, and the second computing node may asynchronously modify the second data in the second local instance of the distributed ledger. Advantageously, the authorization from the multi-home node can ensure that the proposed transaction is coordinated and approved by the multi-home consensus node before proceeding to maintain security and integrity of a blockchain system. Also, more efficient and quick updates to the blockchain system may be achieved by enabling modifications to local instances of the distributed ledger and by allowing asynchronous communication of the modifications to maintain consistency and integrity of the distributed ledger.

In some embodiments, participant nodes of a blockchain system can preserve, maintain, or keep partial orderings associated with data items by processing transactions that affect the same data items in a specific sequence. But the participant nodes can process transactions that affect different or non-overlapping data items in various orders without keeping or maintaining total orderings associated with data items. By maintaining partial orderings without maintaining total orderings associated with data items in a distributed ledger, the blockchain system can process multiple transactions concurrently without frequently waiting for each transaction to be completed before starting another transaction. Advantageously, this allows the blockchain system to handle a higher volume of transactions, and/or result in reduced latency associated with transactions handled by the blockchain system.

In some embodiments, participant nodes may compute end-block data for creating a block for a blockchain by calculating Merkle trees to verify that transactions are processed consistently among participant nodes. The Merkle tree may allow for efficient verification of individual transactions without needing to examine an entire block or the entire blockchain. In some embodiments, a participant node may calculate a Merkle tree by hashing individual transactions (e.g., hashing individual single-home transactions, hashing two single-home portions of a multi-home transaction), and then hashing the resulting hashes together in a hierarchical manner according to a specific order until a single root hash (e.g., a Merkle root) is obtained. Each leaf node of the Merkle tree may represent a hash of an individual transaction or set of transactions (or a value received from another participant node, such as when one participant node seeks to obfuscate transaction information from another participant node), and each non-leaf node may represent the hash of its child nodes. The Merkle root (e.g., a global hash) can be a single hash value obtained at the top of the Merkle tree and may represent a cryptographic summary of all transactions included in a block. Once calculated, the Merkle tree can be stored for future verification and/or auditing purposes.

In some embodiments, each participant node may follow the same hashing order to calculate Merkle trees. Assuming the transactions and the replicated transactions are processed appropriately by each node, using the same specific order to calculate Merkle trees can result in consistent (e.g., the same) Merkle trees calculated by different participant nodes. By sharing Merkle trees with each other, for example, a participant node may then compare the Merkle tree calculated by itself with a Merkle tree calculated by other participant node(s) to verify that nodes of a blockchain system processed the same transactions and replicated transactions consistently. Advantageously, the same Merkle trees calculated can provide verifiable records of all transactions included in blocks to preserve data integrity, consistency, accuracy, and/or reliability associated with a blockchain system.

Blockchains as disclosed herein may be used to store a wide variety of data. For example, the distributed ledger maintained via transactions on the blockchain may operate as a database storing information accessible to blockchain participants. The information in the distributed ledger may be considered "on chain," in that such information is directly derivable from data of the blockchain. To ensure such derivability, participants in the blockchain may agree to a specific information schema: a representation of the organization and format of information within the distributed ledger. For example, in a manner analogous to traditional databases, participants may agree on collections of data elements (e.g., tables) and a format of such data elements (e.g., with each element representing a "row" and containing one or more field values corresponding to "columns" in a table). In some embodiments, the distributed ledger may further support "off chain" or "chain adjacent" data. For example, the ledger may support inclusion of links or identifiers for other data accessible to participants, such as uniform resource identifiers (URIs) identifying data within a particular location on a network. In some embodiments, a blockchain system may provide for additional functionalities related to availability, accountability, and non-repudiation of such off chain or chain adjacent data hosted according to trusted cloud primitives. For example, a blockchain transaction may cause the data to be copied to a threshold number of blockchain participants implemented using trusted cloud primitives, such that the data is unlikely to be lost in case of failure of less than all participants. Blockchain transactions may further reflect transmission of data copies to various participants. Subsequent transactions may be used to manage the data as stored among the participants, including for example modification or deletion of the data. Because this data is not directly encoded within the blockchain, but may be managed via blockchain transactions in the same manner as on-chain data and provide a number of the same trust model guarantees as on-chain data, this data is therefore referred to herein as "chain adjacent" data. In contrast, other data not encoded within a blockchain, such as data that is linked to within a blockchain but not managed via the blockchain system, is referred to as "off chain" data. Use of off chain or chain adjacent data may enable, for example, sharing of large data sets between parties, without requiring that the entirety of such a data set be included within the blockchain. In addition, off chain and chain adjacent data may not be required to conform to any particular format, enabling support for schema-less data via the blockchains discussed herein.

The data sharing provided by blockchains as disclosed herein may be used in a wide variety of applications in which multiple parties wish to exchange data in a secure, resilient, verifiable, and efficient manner. As one example, multiple parties to a supply chain may wish to track physical inventory as it passes between parties. While these parties may generally trust one another, disputes might arise when inventory does not pass smoothly between the parties, such as when inventory is lost or damaged. To address such disputes, these parties may utilize a blockchain according to embodiments of the present disclosure, with transactions of the blockchain indicating an agreed exchange of physical inventory. Each party may then consult the blockchain to verifiably identify the party responsible for inventory at a given point in time, without requiring trust in the other party's accounting for such inventory. This application therefore maintains the "zero trust" model of past blockchains, as between parties to the chain. But unlike past blockchains, the blockchains disclosed herein operate significantly more efficiently, reducing excessive computation associated with past blockchains.

The examples discussed herein generally (unless stated otherwise) assume a multi-party, permissioned, non-public blockchain with restricted membership, sometimes referred to as a federated blockchain or a blockchain consortium. However, embodiments may alternatively or additionally be applied to private and public blockchains. For example, assume a single party wishes to resiliently store a set of data among multiple cloud providers (e.g., to ensure that a disruption in one cloud provider does not remove access to that set of data). In accordance with present embodiments, the party might configure the set of data as a distributed ledger, and further configure two distinct "nodes": each acting as a participant to a private blockchain, and each being implemented on a distinct cloud provider network. Any modifications to the data may be recorded in transactions on the blockchain, which are replicated between the nodes according to operation of the blockchain. Thus, data within the ledger is programmatically replicated to both nodes, spanning the two cloud provider networks. Should one provider network fail, data can be retrieved at the other node without interruption. Accordingly, the party can be enabled to migrate and replicate data between locations without manually configuring such migration or replication.

In one embodiment, various characteristics of a blockchain, which may be referred to as "metadata" regarding the blockchain, may be stored within the blockchain itself. For example, the blockchain may identify (e.g., within a first block) metadata such as authorized participants to the blockchain (e.g., nodes representing actors), permissions of such participants (e.g., to add new participants), a schema for the distributed ledger (e.g., defining all or a portion of data stored in the distributed ledger, such as by arrangement, format, variable type, readability or writability, etc.), policies for amending that schema, identifying information for a multi-home consensus node (representing code executable to conduct consensus when adding blocks), policies for amending the multi-home consensus node, and policies for amending the metadata. Each transaction on the chain may include information sufficient to ensure compliance with this metadata. For example, each transaction may be signed with a "private key" of an authorized party who is identified in the metadata (e.g., via a public key, according to public/private key cryptography) as having permission to perform the transaction. Thus, by reading the blockchain and metadata embedded therein, an auditor (e.g., a party to the blockchain or an authorized third party) may verify the validity of each transaction recorded therein. In one embodiment, the metadata is mutable according to specific policies. For example, should a change to a node be desired or required (e.g., as a software upgrade, change in cloud provider, etc.), such change may be processed by another node as a transaction on the blockchain, thus ensuring continuity between the nodes and a verifiable, validated hand off between the nodes. Thus, all information required to verify a state of a distributed ledger may be included within the blockchain itself, providing for a wide amount of flexibility in the particular implementation of any blockchain without sacrificing security and verifiability.

As will be appreciated by one of skill in the art in light of the present disclosure, the embodiments disclosed herein improve the ability of computing systems to share data among multiple computing devices or parties. These embodiments provide for security and low shared trust among parties in a manner similar to past blockchains, while addressing the significant computational inefficiencies of such blockchains. Moreover, the presently disclosed embodiments address technical problems inherent within computing systems; specifically, the difficulty of securely, verifiably, and resiliently sharing data among potentially untrusting parties without incurring significant or excessive computational expense. These technical problems are addressed by the various technical solutions described herein, including the use of cloud resources as primitives for blockchain operations, such as the use of trusted cloud compute services to provide computation related to blockchain (e.g., in implementing consensus and smart contracts), and the configuration of a blockchain to include metadata reflecting the configuration of the blockchain, thus enabling a wide variety of blockchain configurations while maintaining verifiability as to transactions on the blockchain. Thus, the present disclosure represents an improvement on computing systems utilizing blockchains and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including one or more cloud provider networks 120 in which embodiments of the present disclosure can be implemented. The cloud provider networks 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. A cloud provider network 120 may also be referred to as a hosted computing environment. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes one or more data storage servers 110, and one or more compute servers 115, and one or more control plane servers 105 that are in networked communication with one another and with the network 104 to provide users with on-demand access to computing resources such as databases 113, block storage volumes 112, object stores 11, serverless environments 116, virtual machines 117, containers 118, access control services 106, configuration and versioning services 107, and monitoring and logging services 108, among others. These particular resources are described in further detail below. Some implementations of cloud provider network 120 can additionally include other services (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions. While one illustrative set of resources is shown in FIG. 1, the particular set of resources provided by a cloud provider network 120 may vary, and these resources may vary across different networks 120.

Each cloud provider network 120 can provide on-demand, scalable computing platforms to users through the network 104, for example allowing users to have at their disposal scalable "virtual computing devices," also known as "virtual machines," via their use of the data storage servers 110 and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Turning specifically to the roles of the different servers within the cloud provider network 120, the compute servers 115 include one or more servers which provide computing capacity to users for building and hosting their software systems. The compute servers 115 and associated control plane functionality can provide an elastic compute cloud service of the cloud provider network. Various different forms of compute service may be provided. For example, the compute services 115 may provide for serverless code execution via serverless environments 116. Serverless computing is known in the art, and thus will not be described in detail herein. However, in general, a serverless compute service can enable a user to provide executable code to the cloud provider network 120 (potentially with other supporting data or software, such as libraries, utilities, runtimes, etc.), and later request execution of that code. The cloud provider network 120 may manage storage of the code, such as in object stores 111 (discussed in more detail below). The cloud provider network 120, in response to a requested execution, may generate a serverless environment 116, which may itself be a virtual machine or software container, provision the environment with the code, and execute the code within the environment. Because the cloud provider network 120 handles aspects such as creation of the environment, provisioning of the environment with the requisite data (e.g., the code), and later destruction of the environment, an end user is not required to specifically configure a server to support that execution. Accordingly, such functionality is referred to as "serverless" computing (though, of course, execution nevertheless occurs on a server). While direct submission of code is one example of serverless computing, others are possible. For example, serverless network services may provide for "orchestration" enabling a user to create workflows, processes, or other automation in a "low code" or "no code" environment, such that the workflow, process, or automation is then invokable on demand. Such workflows, processes, or automations are sometimes referred to as "step functions" or "logic apps." Because end users are enabled to execute functionality on-demand without user-provisioning of resources supporting such execution, these services enabling creation and on-demand invocation of such workflows, processes, or automations are also encompassed within the term "serverless" and "serverless computing" as used herein.

As another example of compute service, the cloud provider network 120 may enable end users to directly configure, access, and maintain execution environments, such as virtual machines 117 and software containers 118. Both virtual machines and software containers are generally known in the art, and thus will not be described in detail herein. However, in brief, both virtual machines and software containers provide for virtualization of resources, which provides isolation of software executing within the environment from software executing in other environments. Virtual machines represent virtualized hardware, and are thus in some contexts referred to as "system virtual machines" providing "full virtualization." A virtual machine may thus support installation of an operating system in a similar manner to a non-virtualized (physical) computing device. A software container, in contrast, provides operating-system level virtualization, which utilizes an operating system of a host device (which may be a physical device or a virtual machine) to enable execution of code within the software container while isolating that execution for other code executing on the host device. In some embodiments, a cloud provider network 120 may also enable end users to directly access and utilize certain compute servers 115 without virtualization. These may be referred to as "bare metal" instances, and provide yet another type of compute service.

In addition to compute servers 115, the cloud provider network 120 includes data storage servers 110, which provide a variety of types of data storage, such as data streams and queues 114, databases 113, block storage volumes 112, and object stores 111.

One type of storage provided by data storage servers 110 is data streams and queues 114. Generally described, both a data stream and a data queue represent a location for storing a set of data that can change over time. For example, within a stream, new data may be continuously created and added to the stream, and old data may be removed (e.g., after a set period, after the set reaches a certain size, etc.). A data queue may operate similarly to a stream, with for example different additional and removal criteria. For example, within a queue, data may be removed once transmitted to or processed by a consuming device. Data streams and queues may be ordered or unordered.

Another type of storage provided by data storage servers 110 are databases 113. Databases 113 can represent any number of a wide variety of known database technologies providing for organized collection of data. Databases 113 may include relational databases, non-relational databases, transactional databases, analytical databases, and the like. Client devices 102 may thus interact with databases 113 (and associated control plane functionality) to store, search for, and retrieve a wide variety of data.

Block storage volumes 112 provide another type of storage service, by providing persistent data storage for the compute servers 115 in the form of block storage volumes 112, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block store servers 105 and associated control plane functionality can provide an elastic block store service of the cloud provider network 120. Data of volumes 112 may be encrypted or unencrypted. Network-accessible block-storage devices may in some cases be end-user-accessible, for example by acting as a virtual disk drive for a virtual machine 117.

Yet another type of storage service is provided by object stores 111. The data storage services and associated control plane functionality can utilize object stores 111 to provide an object-based storage service of the cloud provider network. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object stores 111 facilitate storage of variable-length objects associated with a corresponding object identifier. Each object may represent, for example, a file submitted to the servers 110 by a user for storage (though the servers 110 may or may not store an object as a file). In contrast to block-based storage, where input/output (I/O) operations may typically occur via a mass storage protocol, such as serial ATA (though potentially encapsulated over a network), interactions with object stores 111 may occur via a more general network protocol. For example, the servers 110 may facilitate interaction with object stores 111 via a Representational State Transfer (REST) application programming interface (API) implemented over the Hypertext Transport Protocol (HTTP). The object stores 111 may store objects within collections, sometimes referred to as "buckets." Each object typically includes the data being stored, a variable amount of metadata that enables various capabilities for object stores 111 with respect to analyzing a stored object, and a globally unique identifier or key that can be used to retrieve the object. Objects stored in the object stores 111 are associated with a unique identifier, such that authorized access to them can be obtained through requests from networked computing devices in any location. Users can store as many objects as desired within object stores 111, can write, read, and delete objects in object stores 111, and can control access to their objects contained therein. In some embodiments, data storage servers 110 are configured to provide for immutability of objects within the object stores 111, such that modification of an object is not possible. For example, the servers 110 may accept instruction to designate an object as immutable, and thereafter decline an instruction to modify an object designated as immutable, or interpret such an instruction as a request to store a new object representing a modification of the immutable object. Moreover, data storage servers 110 are in some embodiments configured to provide for non-deletion of objects within the object stores 111. For example, the servers 110 may accept instruction to designate an object as deletion-free, and thereafter decline an instruction to delete the object. In some instances, immutability, deletion-free designation, or both may be associated with a time period, such that the servers 110 ensure this designation for a minimum period of time that is not modifiable by a client after initiation. As discussed below, immutability and deletion-free guarantees may form cloud primitives enabling various functionalities of a blockchain.

In addition to data storage servers 110 and compute servers 115, the cloud provider network 120 further includes control plane servers 105. Control plane servers 105 can general implement "control plane" functionality, which typically refers to configuration or control of how data flows, as opposed to actual data flow (which is sometimes referred to as "data plane"). For example, the control plane servers 105 may provide interfaces enabling a client, via a client computing device 102, to create, configure, or maintain other cloud resources, such as virtual machines 117, containers 118, databases 113, block storage volumes 112, or the like. In some configurations, specific cloud resources may not be directly configurable by clients. For example, clients may be unable to directly manage serverless environments 116 or object stores 111, but may interact with those environments 116 or stores 111 via respective cloud services (e.g., a serverless compute service or object storage service, either of which may be implemented as code executing within a virtual machine 117, utilizing storage of block storage volumes 112, etc.).

In addition to enabling creation or access to cloud resources, control plane servers 105 may provide functionalities such as access controls 106, configuration and versioning 107, and monitoring and logging 108. Illustratively, access controls 106 may enable a client to specify particular parties that can access various cloud resources, as well as permissions related to that access. Access controls 106 may additionally enable authentication of or related to cloud services. For example, each compute instance (e.g., a serverless environment 116, virtual machine 117, or container 118) may be associated with authentication information indicating a client associated with that compute instance (e.g., on behalf of which the instance is executing code). Accordingly, any operations conducted by a compute instance may be verifiably linked to a particular client conducting such operations. Additionally, configuration and versioning services 107 may enable an end user to configure specific resources, such as editing the resource, naming the resource, etc., while providing versioning for such resources, such as by associating each configuration with a particular version identifier. Monitoring and logging services 108 may enable an end user to monitor cloud resources and obtain log information regarding such resources, thus gaining visibility into operation of such resources.

In accordance with embodiments of the present disclosure, cloud resources such as those shown in FIG. 1 may be utilized to implement an efficient and secure blockchain. For example, each participant in a blockchain may utilize a combination of cloud services (e.g., compute and storage services) to create one or more "nodes" acting as participants in the blockchain. The cloud services may for example be directly implemented by a client, implemented by an intermediary service provider (sometimes referred to as a "Software as a Service" or SaaS provider), or a combination thereof. (Client computing devices 102 may additionally or alternatively act as such nodes.) In addition, the cloud provider network 120 may provide for computation supporting operation of the blockchain, which computation may not be controlled by any individual participant but instead trusted mutually by the participants. For example, a cloud provider network 120 may implement a consensus node that accepts transactions from participants, verifies such transactions, and writes such transactions to the blockchain in a resilient manner. In one embodiment, the consensus node is a transient node, representing a collection of on-demand resources of the cloud provider network 120, as opposed to statically allocated resources. For example, a given blockchain may be associated with a data queue 114 that stores proposed transactions for the chain. The cloud provider network 120 (e.g., a serverless compute service provided by the network 120) may be configured to invoke one or more serverless functions, within serverless environments 116, on existence of proposed transactions within the queue 114, to process such transactions and (if appropriate) add the transactions to the blockchain. Thereafter, execution of the serverless function may cease until new transactions are added to the queue 114. Thus, a consensus node may represent a transient logical element implemented by, e.g., compute servers 115, rather than a statically allocated device.

In accordance with embodiments of the present disclosure, the cloud provider network 120 may provide for certain sets of code, executable on the compute servers 115, to be verifiably immutable. For example, the cloud provider network 120 may enable sets of code submitted for execution on a serverless compute service (e.g., within a serverless environment 116) to be set, either manually or automatically, as immutable. This immutability may be guaranteed by a cloud provider, such that the code cannot be altered in any way without such change being apparent to a reviewer of the code. For example, the provider network 120 may identify each version of a set of code with a distinct version identifier, such that a given version identifier always and immutably refers to a given set of code, even if that code is later changed (and thus identified under a different version identifier). As disclosed herein, verifiable immutability can provide for efficient blockchain implementations, as compute tasks required by a blockchain can be provided via verifiably immutable code and via a trusted serverless environment 116 (e.g., provisioned and under control of a cloud provider, and not a party to a blockchain). In accordance with embodiments the present disclosure, execution of verifiably immutable code by a trusted cloud provider can enable efficient implementation of blockchains while removing inefficiencies associated with duplicated efforts that are typical of many past blockchain implementations. For example, code executable to implement a consensus node may be established as verifiably immutable, and an identifier of such code may be stored within a blockchain. In this way, operation of the consensus node can be verified by any party to the blockchain, or by an authorized third party. Moreover, utilization of verifiably immutable code by a trusted cloud provider to implement blockchain functionality such as consensus can avoid the need for excess computation that provides other security guarantees in existing blockchain implementation, such as providing Byzantine Fault Tolerance. Rather, because consensus or other functionality can be implemented by a mutually trusted third party, code of each participant need not be trusted by other participants (or even the participant itself). Similarly, code executable to implement smart contracts may be set as verifiably immutable, and transactions related to execution of such smart contracts may include information authenticating the transaction as a result of execution of the code representing the smart contract (e.g., information verifying that the expected code was executed by the compute servers 115). As a result, smart contract code may be executed once by the compute servers 115, and a result may be trusted by all parties (or a third party), without requiring each party to individually execute such code.

As illustrated in FIG. 1, the cloud provider network 120 can communicate over network 104 with client computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 1, elements of the cloud provider network 120 may also act as clients to other elements of that network 120. Thus, a client device 102 can generally refer to any device accessing a network-accessible service as a client of that service.

Figure 2:
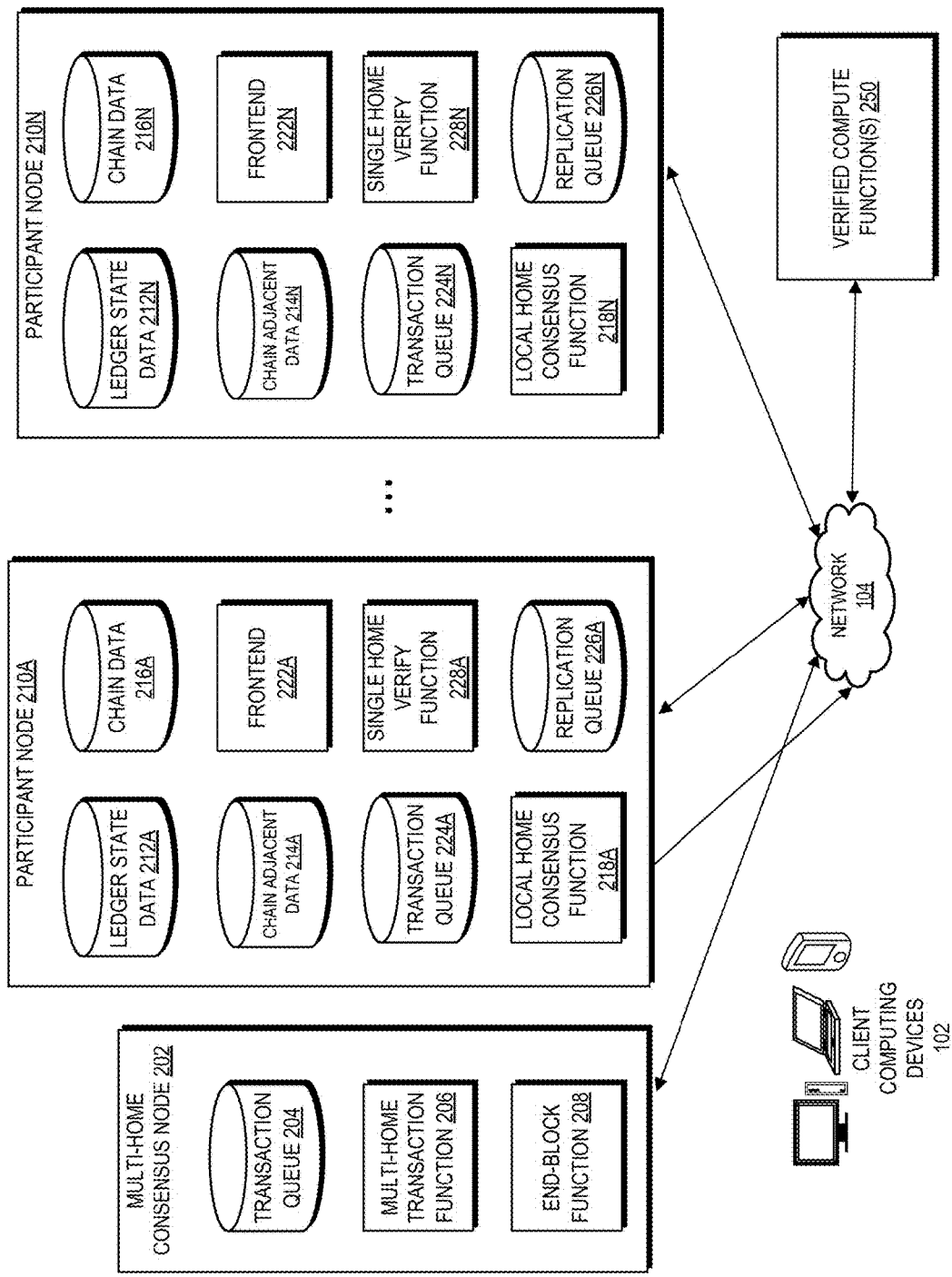
FIG. 2 depicts a computing environment in which a blockchain system using cloud resource primitives is implemented on a multi-home consensus node and a plurality of participant nodes, in accordance with embodiments of the present disclosure.

FIG. 2 depicts a computing environment in which a blockchain system 200 using cloud resource primitives is implemented on one or more cloud provider networks 120. The blockchain can enable multiple parties, each associated with one or more participant nodes, such as participant node 210A—participant node 210N (generically referred to as participant node(s) 210), to share information and conduct transactions in a secure, efficient, resilient, and verifiable manner. Specifically, each party desiring to form a blockchain may implement a participant node 210. In one embodiment, a participant node 210 may be implemented as a collection of resources on a cloud provider network 120. For example, a client computing device 102 may interact with a cloud provider network 120 (e.g., a network-accessible service implemented on a cloud provider network 120) to "spin up" a participant node 210 by initializing resources corresponding to that node. In one embodiment, participant nodes operate on a "Single-tenanted Accounts with Multi-tenanted Infrastructure" ("STAMTI") model. Specifically, each node 210 may be associated with a particular single tenanted account on a cloud provider network 120, such that various account-specific resources (e.g., databases, data objects, compute instances, serverless functions, etc.) can be restricted on the cloud provider network 120 according to access controls specified by an owner of the account. The particular lower-level infrastructure implementing each of the account-specific resources (e.g., the data storage servers 110, compute servers 115, and control plane servers 105, along with multi-tenanted network services build on those servers) may be multi-tenanted, in that they serve multiple accounts (each representing a "tenant"). In one embodiment, creation of participant nodes 210 may be facilitated by a network-accessible service implemented on a cloud provider network 120, which service may be under control of an operator of the cloud provider network 120 or under control of another party. For example, a third-party operator may provide a network-accessible service through which a user can request creation of a participant node 210 implementing a blockchain, and invite other users to similarly request creation of a participant node 210 joining in operation of the blockchain. In response, the third-party service may (via interaction with relevant endpoints of the cloud provider network 120) create a participant node 210 on behalf of each user (e.g., by creating resources on the network 120 that collectively implement functionality of the participant node 210), associated with an account of the user on the cloud provider network 120. Due to association of each participant node 210 to an account of a user on the cloud provider network 120, there is no requirement in this model that users trust a third-party service creating such nodes 210. Rather, each user may trust, on the basis of security provided by the cloud provider network 120, that account-level resources associated with a participant node 210 are accessible only to client computing devices 102 properly authenticated to an underlying cloud provider network 120 under an account associated with the node 210. In one embodiment, the participant nodes 210 for a given blockchain are established in different cloud provider networks 120. For example, each party may have a pre-existing relationship with a cloud provider, and thus elect to implement a participant node 210 in the network 120 of that cloud provider 120. In some instances, a single party may be associated with multiple participant nodes 210. For example, a single party may implement two nodes 210 in two different cloud provider networks 120, thus providing resiliency among the networks 120. Similarly, a single party may implement two nodes 210 associated with different accounts on a given cloud provider network 120, or otherwise differentiated within a cloud provider network 120 (e.g., by implementing two nodes 210 in different "regions" or "availability zones" designating different subsets of resources within a network 120). Utilization of different provider networks 120 or different subsets of resources within a network 120 may provide a variety of benefits, such as fault tolerance, increased connectivity (e.g., lower latency) with other resources, accessibility to provider-specific functionalities, or the like. While discussed herein with reference to cloud-provided participant nodes 210, in other embodiments a user may configure a participant node 210 independently of the cloud provider networks 120. For example, an end user may use a client computing device 102 to create an "on-premises" participant node 210.

In the illustrated example of FIG. 2, each participant node 210 includes a frontend 222 (e.g., 222A-222N), chain data 216 (e.g., 216A-216N), chain adjacent data 214 (e.g., 214A-214N), local home consensus function 218 (e.g., 218A-218N), transaction queue 224 (e.g., 224A-224N), replication queue 226 (e.g., 226A-226N), single-home verify function 228 (e.g., 228A-228N), and ledger state data 212 (e.g., 212A-212N). However, it will be understood that a participant node 210 may include fewer or more components. In the illustrated example, the blockchain system 200 also includes a multi-home consensus node 202 (also referred to as a multi-home node) that includes a transaction queue 204, a multi-home transaction function 206, and an end-block function 208. However, it will be understood that the blockchain system 200 may include fewer or more components.

The ledger state data 212 illustratively represents a materialized view of information recorded within the blockchain, sometimes referred to as a "world state." As noted above, a blockchain can generally represent a distributed ledger, beginning at an initial state and recording transactions that modify that state. Because each transaction modifies state based on prior transactions, a node 210 can maintain ledger state data 212 that reflects a state of a ledger corresponding to the blockchain at a given point, and designated for example as a "block height" or "block number". For example, if a blockchain is implemented in a supply chain context, the ledger state data 212 may reflect inventories of each participant in the supply chain as of a given point. In one embodiment, the ledger state data 212 maintains a current view, reflecting the state of the ledger per a most recent block known to a participant node 210. Additionally or alternatively the ledger state data 212 may maintain other materialized views representing other points in the blockchain, and potentially a materialized view for all points on the chain. For example, multiple world states may be maintained in a database that supports versioning. In some cases, the ledger state data 212 may reflect changes to the ledger for some or each transaction that modifies a data object in the database. The ledger state data 212 may illustratively be implemented on a database 113, storing information according to the schema defined for a blockchain. As discussed below, this schema may vary according to the blockchain being implemented. For example, the schema may be initially defined within an initial block of a blockchain, and potentially altered via subsequent transactions reflected in subsequent blocks of the blockchain. Data representing transactions on the blockchain may be stored within chain data 216, which may for example represent another database 113 (or another portion of the same database 113 used to store the ledger state data 212). When initializing the blockchain, a first block may be stored within chain data 216 that includes initialization information for the blockchain. This initialization information may include, for example, blockchain metadata designating participant nodes 210, identifying information for the multi-home consensus node 202 (discussed in more detail below), schema information detailing the type and format of data stored within the blockchain, permissions information, and the like. The initialization information may further include initial values for various data elements (sometimes referred to as "data objects"), such as inventory amounts for items to be transacted on via the blockchain.

As transactions are received, each participant node 210 can make corresponding alterations to their chain data 216 recording those transactions. In this manner, the chain data 216 represents each participant node 210's understanding of the blockchain, including transactions that may be included in a future block. Moreover, if a participant node 210 determines that the received transaction is a single-home transaction for which the participant node 210 owns (e.g., has control or read/write privileges), the participant node 210 can update the ledger state data 212. For brevity, reference to a participant node 210 owning a transaction or portion of a transaction may refer to the participant node 210 determining that it owns (e.g., has control over, read/write privileges or permissions to modify) the data that is the subject of the transaction or the portion of the transaction and may therefore process/execute the transaction (as opposed to processing/executing a replication of the transaction).

In some cases, each participant node 210 may update its ledger state data 212 and chain data 216 asynchronously resulting in different participant node 210 having differences between their respective ledger state data 212 and chain data 216 (e.g., showing a different "world state"). For example, participant node 210A may receive a transaction (node-A.transaction1), determine that the transaction is a single-home transaction that it has rights to process/execute, process/execute the transaction, and update its instance of the ledger state data 212 and chain data 216. At that time, the instance of the ledger state data 212 and chain data 216 of the participant node 210A may differ from the instance of the ledger state data 212 and chain data 216 of the participant node 210N. Moreover, concurrent to participant node 210A processing its transaction, participant node 210N may receive and process its own transaction (nodeN.transaction1) and update its instance of the ledger state data 212 and chain data 216, resulting in another difference between the ledger state data 212 and chain data 216 of the participant node 210A and the participant node 210N.

To synchronize the ledger state data 212 and chain data 216 of the different participant nodes 210, the participant node 210A and the participant node 210N can asynchronously replicate the respective transactions or changes they made to their respective instances of the ledger state data 212 and chain data 216, and communicate the replicates to each other. Thus, participant node 210A would receive a copy of nodeN.transaction1 (or some other indication of the change made by the participant node 210N from the participant node 210N, and the participant node 210N would receive a copy of nodeA.transaction1 from the participant node 210A (or some other indication of the change made by the participant node 210A). The receiving participant node 210 can update its respective ledger state data 212 and chain data 216 using the replicates received from the other participant node 210.

As described herein, when it is time to add transactions to a block and add the block to the blockchain, the multi-home consensus node 202 and participant node 210 can communicate with each other to verify that the block to be added to the blockchain in the respective participant node 210 includes the same transactions. In other words, the multi-home consensus node 202 and participant node 210 can verify that the same set of transactions in the chain data 216 (across the different participant node 210) are used to create the block and/or that the ledger state data 212 and chain data 216 of the different participant node 210 match. Accordingly, prior to adding a block to the blockchain, the participant node 210 can converge to a shared and consistent "world state." Once the block is added to the blockchain, the "world state" as evidenced by the instances of the ledger state data 212 and chain data 216 of the different participant node 210 may again begin to diverge (and later reconverge as part of adding another block to the blockchain).

While the multi-home consensus node 202 and the participant node 210 can communicate to verify that the contents of a block in the respective participant node 210 to be added to the blockchain include the same content (e.g., same transactions), the order of the transactions in the chain data 216 may be different. For example, consider the scenario above in which the participant node 210A receives and processes a transaction (nodeA.transaction1) concurrently with the participant node 210N receiving and processing a different transaction (nodeN.transaction1), and the participant node 210A and the participant node 210N replicate their respective transactions to each other. In such a scenario, the order of transactions at participant node 210A would be 1) nodeA.transaction1 and 2) nodeN.transaction1 and the order of transactions at participant node 210N would be 1) nodeN.transaction1 and 2) nodeA.transaction1. Moreover, the details of some transactions may not be available to all participant node 210. For example, participant node 210A and participant node 210N may be part of a confidential transaction for which they do not want to share the details. In some such cases, the system may use a Merkle tree to verify the content of a block. Some leaves of the Merkle tree may correspond to transactions owned by distinct participant node 210. Other leaves of the Merkle tree may correspond to transactions that relate to different groups of participant node 210.

As noted above, each block may be cryptographically linked to a prior block, such that transactions within a block are not retroactively editable without breaking cryptographic continuity in the chain. Accordingly, each party may verify (or recreate) the ledger state data 212 by reference to the chain data 216. In some embodiments, one or more blocks of the chain data 216 may be cryptographically signed by participant nodes 210 to provide additional security and trust guarantees. For example, some or all of the participant nodes 210 may provide a digital signature to be included within that block, providing for both non-repudiation and a co-mutual guarantee of consistency and authenticity among the ledgers of the different participants. Absent failure scenarios (or differing permissions to on-chain or chain-adjacent data, as discussed herein), it is generally expected that at the time a block is added to a blockchain, the corresponding chain data 216 is synchronized between all participant nodes 210. As noted above, however, given the asynchronous nature of updates between the participant node 210, following the addition of a block to the blockchain, instances of the ledger state data 212 and chain data 216 in different participant node 210 may diverge (until the time for the addition of an additional block to the blockchain).

In addition to chain data 216, each participant node 210 may include chain adjacent data 214. For example, chain adjacent data 214 may be stored as objects within object stores 111. Unlike chain data 216, chain adjacent data 214 is not directly encoded within transactions of a blockchain. However, in accordance with embodiments of the present disclosure, chain adjacent data 214 may be shared among participant nodes 210 and managed via operation of the blockchain. For example, to share chain adjacent data 214 from one participant node 210 to another, a sharing node 210 may propose a transaction on the blockchain that reflects, for example, a location of the chain adjacent data 214, access credentials for the chain adjacent data 214, and the like. A receiving node 210 may, as part of verifying the transaction, obtain the chain adjacent data 214 from the specified location using the specified access credentials, and verify receipt of the chain adjacent data 214 within the transaction or a subsequent transaction. Thus, operation of the blockchain may facilitate sharing of both on chain and chain adjacent data. Off-chain data, which may not be directly managed via operation of the blockchain, may be similarly shared among participants via transactions. In one embodiment, on-chain data includes scalar data, e.g., individual values of a specific type, as specified within a schema of a blockchain, and chain adjacent data includes any variety of data, unrestricted by that schema. For example, on-chain data sharing may be used to share relatively small amounts of information (e.g., on the order of bytes, kilobytes, megabytes, etc.), while chain adjacent data sharing may be used to share relatively large amounts of information (e.g., on the order of gigabytes, terabytes, etc.). Moreover, by providing for both on-chain and chain adjacent data, each participant node 210 may be provided with multiple mechanisms to obtain data. Illustratively, an account of a participant node 210 may be associated with computing resources otherwise configured to interact with a non-chain data store (e.g., with an object store 111 supporting non-chain data). Thus, an end user may utilize such a non-chain data store as the chain adjacent data 214, and elect to continue to store data within the chain adjacent data 214, rather than directly include the data as on-chain data, to facilitate continued use of these other computing resources.

To facilitate transactions on the blockchain, each node 210 can include a frontend 222 that accepts proposed transactions from a party associated with the node 210 (e.g., via a client computing device 102). For example, the frontend 222 may provide a standardized interface, such as a graphical user interface (GUI), application programming interface (API), command line interface (CLI), message queue, or the like, through which transactions are proposed to modify the distributed ledger. The interface may further enable querying of (reading of) information of the participant node 210, such as information within ledger state data 212, chain data 216, chain adjacent data 214, etc. Illustratively, reading a data object may include retrieving a value of a certain variable or field defined within a blockchain's schema. In one embodiment, the interface is a representational state transfer (REST) compliant interface (a "RESTful" interface). In another embodiment, the interface provides a GraphQL interface enabling submission of queries and mutations (modifications). Illustratively, the GraphQL interface may be generated by reference to the schema reflected in the blockchain, such as by use of a schema-to-GraphQL compiler. In yet another embodiment, the interface is a data manipulation language interface, such as an interface supporting authoring or submission of Structured Query Language (SQL) statements. The frontend 222 may illustratively handle queries by reference to the ledger state data 212, chain data 216, or chain adjacent data 214, such as by conducting the query and returning a result indicated by the respective data. The frontend 222 may illustratively handle proposed transactions by submitting the transaction to the single-home verify function to determine whether the transaction is to be further processed by the local home consensus function 218 or the multi-home consensus node 202. In some embodiments, the frontend 222 conducts initial validation for a proposed transaction, such as verifying that the transaction conforms to a present schema of a ledger, that the transaction does not render the ledger in a disallowed state (e.g., where a transaction is a request to transfer inventory, that a party has sufficient inventory for the transaction), that a party has requisite authorization to conduct the transaction, has been correctly authenticated, etc. The frontend 222 may thus act as an input and output point for reading from and writing to the blockchain.

In some embodiments, each of the participant nodes 210 may include a transaction queue 224. The transaction queue 224 may receive proposed transactions and retain the proposed transactions for further processing by a corresponding participant node 210. For example, an incoming transaction may be stored by the transaction queue 224 for processing by the frontend 222 and/or the frontend 222 may store a proposed transaction in the transaction queue 224 for further processing by the single-home verify function 228 and/or the local home consensus function 218.

In some embodiments, each of the participant nodes 210 may include a single-home verify function 228. In certain embodiments, the single-home verify function 228 may form part of the frontend 222 or be implemented separately.

The single-home verify function 228 may read proposed transactions from the transaction queue 224. As described herein, the proposed transaction may be submitted by the client computing devices 102 and/or other entities (e.g., nodes of the blockchain system 200) and may include modification to the distributed ledger.

The single-home verify function 228 may perform initial checks to verify that the proposed transaction is well-formed and follows the basic requirements of the schema (e.g., verifying that the fields for a transaction are present and correctly formatted) of the blockchain system 200. The single-home verify function 228 may optionally verify the credentials of the entity that submitted the proposed transaction. For example, the single-home verify function 228 may check that the entity has the appropriate permissions to propose the transaction, and/or that the proposed transaction is authenticated using digital signatures.

In addition, the single-home verify function 228 may determine whether the transaction is a single-home transaction in which the proposed modifications to the distributed ledger affect (only) portions that are controlled or owned by a single-home or whether the proposed transaction is a multi-home transaction (also referred to herein as a multi-node transaction) in which the proposed modification(s) to the distributed ledger affect portions controlled or owned by multiple homes or nodes 210. In some embodiments, if the proposed transaction is a multi-home transaction, the single-home verify function 228 may break the proposed transaction down into individual parts or portions, and/or communicate with the multi-home consensus node 202 to process the transaction.

In some embodiments, some or each of the participant nodes 210 may include a local home consensus function 218. In some cases, the local home consensus function 218 can be the same among participant nodes 210, implementing validation according, for example, to blockchain metadata. Illustratively, each of the participant nodes 210 may utilize a common set of code, such as a verifiably immutable serverless function agreed to, e.g., by participant nodes 210 (and potentially identified within blockchain metadata included in the blockchain), to implement the local home consensus function 218. Beneficially, using a common set of code among participant nodes 210 may reduce possibilities for 'corrupted code', limiting attack vectors and reducing reliance on Byzantine Attack-resistant coding requirements for the local home consensus function 218. In other embodiments, local home consensus function 218 may vary among nodes. For example, individual participant nodes 210 may implement participant-specific code as respective local home consensus function 218. In either instance, implementation of local home consensus function 218 may vary among participants according to data available at a participant node 210. For example, one or more local home consensus function 218 may enable specification of user-specific policies for evaluating transactions, specifying, e.g., rules for which transactions to accept or decline. A local home consensus function 218 may therefore reference such rules in evaluating a proposed transaction.

In some embodiments, the local home consensus function 218 may verify and validate transactions that involve data owned by the corresponding participant node. For example, the local home consensus function 218 may check the transaction's structure, verify if the transaction adheres to schema of the blockchain system 200, and/or confirm that the transaction does not violate any predefined rules or policies. The local home consensus function 218 may process transactions locally (e.g., at the participant node 210 of which the local home consensus function 218 is a part) by updating a local instance of the distributed ledger (e.g., by updating the chain data 216 and/or ledger state data 212 of the participant node 210) based on a proposed transaction. The local home consensus function 218 of a participant node 210 may coordinate with the multi-home consensus node 202 and other participant nodes 210 to process some transactions (e.g., multi-home transactions).

In some embodiments, each of the participant nodes 210 may include a replication queue 226 (226A-226N, respectively). The replication queue 226 may store transactions replicated from transactions owned by (e.g., processed/executed by) other participant nodes 210 (also referred to herein as replicated transactions) that are to be applied to the instance of the distributed ledger of the receiving participant node 210 (e.g., included in the chain data 216 and applied to the ledger state data 212 of the receiving participant node 210). As described herein, when a participant node 210 updates its local instance of the distributed ledger (e.g., chain data 216 and/or ledger state data 212) based on a received transaction, it can communicate the update or transaction to another participant node 210 (e.g., as a replicated transaction) for replication on the local instance of the distributed ledger of the other participant node 210.

As described herein, the replicated transaction may include a copy of the (original) transaction, portions (or metadata) of the original transaction, or other information that enable the receiving participant node 210 to make the same modification (as the original transaction) to a different instance of the distributed ledger (an instance controlled by or located at the receiving participant node 210). Moreover, the replicated transaction may include additional information relative to the (original) transaction, such as a partial ordering (as described herein), identification of other transactions related thereto (e.g., as a portion of a multi-home transaction, etc.). In some cases, the replicated transaction may include data generated from the (original) transaction. For example, the replicated transaction may include a hash corresponding to the modifications made according to, or result from executing, the (original) transaction. In some such cases, the replicated transaction may or may not include information that enables the receiving participant node 20 to replicate the modification. For example, rather than making the same modification, the replicated receiving participant node 210 may store a copy of the replicated transaction (e.g., hash) as evidence of the modification that the other participant node 210 made. Accordingly, it will be understood that the replicated transaction may be identical to the (original) transaction or have different (e.g., more, less, or distinct) information as the (original) transaction.

A participant node (e.g., a participant node 210A), after accepting or receiving (e.g., from client computing devices 102) a proposed transaction, may store the proposed transaction to transaction queue 224 (e.g., transaction queue 224A). The participant node 210A may process the proposed transaction depending on the proposed transaction being a single-home transaction or a multi-home transaction.

In some embodiments, a single-home transaction (also referred to herein as a single-node transaction) may involve only one node or home (e.g., the participant node 210A) that owns the data that is to be modified. In certain embodiments, a single-home transaction can be processed locally by the owning node (e.g., the node that controls and/or has the read/write permissions for the relevant data) without requiring approval from other participant nodes 210. For example, when a single-home transaction is initiated, the participant node 210A (e.g., the owning node or node that has the read/write permissions for the data affected by the single-home transaction) may process the single-home transaction and update local chain data 216A and local ledger state data 212A. In some cases a transaction that can be processed locally may be referred to herein as a local transaction. Accordingly, if the participant node 210A determines that it owns (or can process) a single-home transaction, such a transaction may be referred to as a local single-home transaction for the participant node 210A. Similarly, such a transaction may be referred to as an external transaction or external single-home transaction from the perspective of another participant node 210, such as the participant node 210N.

The participant node 210A may then asynchronously inform participant node 210B (not shown)—participant node 210N of the update (e.g., via the respective replication queue 226B (not shown)—replication queue 226N), which may cause participant node 210B—participant node 210N to replicate the single-home transaction and update their chain data 216B (not shown)—chain data 210N, respectively, and ledger state data 212B (not shown)—ledger state data 212, respectively. Compared with situations where participant node 210B (not shown)—participant node 210N need to approve the single-home transaction through approval processes (e.g., multiple rounds of communications and voting), the participant node 210A asynchronously informing other participant node 210 to replicate the single-home transaction may significantly reduce network traffic and latency, as it eliminates one or multiple rounds of voting and confirmation. By allowing the participant node 210A to process the single-home transaction and to asynchronously notify participant node 210B—participant node 210N to replicate the single-home transaction, the blockchain system 200 may enhance scalability and throughput with reduced latency, especially in situations where a significant portion of transactions processed by the blockchain system 200 are single-home transactions.

In some embodiments, when a node (e.g., the participant node 210A) receives a proposed transaction, the participant node 210A may determine whether the proposed transaction is a single-home transaction (e.g., using the single-home verify function 228A). If the participant node 210A determines that the proposed transaction is a single-home transaction, the participant node 210A may also determine whether the single-home transaction involves data that is owned by the participant node 210A. For example, the single-home verify function 228 may determine if the proposed transaction is a single-home transaction that involves data controlled by the participant node 210A and/or to which the participant node 210A has access control and/or read/write permissions (e.g., is a local single-home transaction or a single-home transaction owned by the participant node 210A). In response to determining that the proposed transaction is a (local) single-home transaction that involves data owned by the participant node 210A, the single-home verify function 228A may send the proposed transaction to the local home consensus function 218A for further processing. It will be understood that a single-home transaction may involve one or a combination of operations on or updates to data owned by the respective node. For example, the single-home transaction may involve a combination of reads, writes, conditional writes, etc., on one or more data items owned by the respective node. As another example, the single-home verify function 228A may determine that the proposed transaction is a single-home transaction that involves data owned by the participant node 210N. In this example, the participant node 210A may send the proposed transaction to the participant node 210N for further processing. Additional details regarding the processing of a single-home transaction are described herein with reference to FIG. 3.

In some embodiments, a multi-home transaction (also referred to herein as a multi-node transaction) may involve processing data that is owned by multiple nodes (e.g., the transaction involves multiple participant nodes 210 modifying data to which they have mutually exclusive access control and/or read/write permissions, and/or different participant nodes 210 have access control or read/write permissions for different portions of the transaction) of the blockchain system 200. When a proposed transaction is a multi-home transaction, the involved nodes (e.g., participant nodes 210A and participant node 210N) may coordinate with the multi-home consensus node 202 to process the proposed transaction. In some such cases, the participant node 210A may process and execute the portion of the multi-home transaction that affects data that it owns (e.g., the local home portion to it), and the participant node 210N may process and execute the portion of the multi-home transaction that affects data that it owns (e.g., the local home portion to it and the external home portion to the participant node 210A). Similar to a single-home transaction, it will be understood that a local home portion and the external home portion of a multi-home transaction single-home transaction may involve one or a combination of operations on or updates to data owned by the respective nodes. For example, the local home portion of the multi-home transaction may involve a combination of reads, writes, conditional writes, etc., on one or more data items owned by a first node and the external home portion of the multi-home transaction may involve a combination of reads, writes, conditional writes, etc., on one or more data items owned by a second node.

For example, when the participant node 210A receives a proposed transaction, the participant node 210A may determine (e.g., based on formats, fields, parameters, and/or metadata associated with the proposed transaction) whether the proposed transaction is a single-home transaction or a multi-home transaction. If the participant node 210A determines that the proposed transaction is a multi-home transaction, the participant node 210A may send a notification or request to the multi-home consensus node 202. For example, the participant node 210A may send the notification to the multi-home consensus node 202 to request a multi-home transaction ID for the proposed transaction. In response, the participant node 210A may receive the multi-home transaction ID along with other information from the multi-home consensus node 202 for processing the proposed transaction without causing data conflicts with other transactions processed by the blockchain system 200. In some cases, the data received from the multi-home consensus node 202 includes an ordering for the multi-home transaction. The ordering may indicate the order by which the multi-home transaction is to be processed/executed relative to other multi-home transactions. In some cases, the ordering may be part of the transaction ID and/or may be communicated separately.

The participant node 210A may determine which nodes among the participant node 210B—participant node 210N own data that is to be modified by the proposed transaction. For portions of the multi-home transaction affecting data owned by another participant node 210 (e.g., the "external home portions"), the participant node 210A may send the proposed transaction and information received from the multi-home consensus node 202 transaction to the relevant participant node 210B—participant node 210N that own the data to be modified (including the ordering information). If the participant node 210A also owns data that is to be modified (in accordance with the proposed transaction), the participant node 210A may process the local home portion (e.g., by updating the data that is owned by the participant node 210A) of the proposed transaction.

In processing/executing the multi-home transaction, the participant node 210A and the other participant nodes 210 may use the ordering from the multi-home consensus node 202. In this way, the participant nodes 210 can update the different instances of the distributed ledger in a consistent manner regardless of when the individual participant nodes 210 receive their respective portions of the multi-home transaction. Moreover, similar to the processing of other transactions, the respective participant nodes 210 may send replicated transactions corresponding to their portions of the multi-home transaction to other participant nodes 210 such that all participant nodes 210 may asynchronously update their respective instances of the distributed ledger based on the changes made according to the multi-home transaction. It will be understood that in some cases, as part of updating its respective instance of a distributed ledger based on the changes made according to the multi-home transaction, a particular participant node may perform a barrier synchronization and then apply all the related updates from the multi-homed transaction at once to its local world state, and in an order that is consistent with single-home and multi-home partial ordering instructions. Accordingly, the portions of a multi-home transaction may be replicated and ledgered by the participant nodes 210 asynchronously, whereas updates to respective world states that correspond to the multi-home transaction may be ordered or partially ordered by individual participant nodes 210 relative to other single-home or multi-home transactions.

In some cases, upon completion of the relevant portions of the multi-home transaction, the respective participant nodes 210 may send an acknowledgement to the multi-home consensus node 202. In this way, the multi-home consensus node 202 may track whether all portions of the multi-home transaction have been completed and/or whether a subsequent multi-home transaction can be processed.

In certain cases, the participant node 210A may further asynchronously receive notifications or replicated transactions from other nodes that the "external home portion" of the proposed transaction is completed. In some such cases, once all nodes involved in the proposed transaction complete their processing, the participant node 210A may (e.g., using the local home consensus function 218A) notify the multi-home consensus node 202 of the completion. Additional details regarding the processing of multi-home transaction are described herein with reference to FIG. 4A.

Moreover, as described herein, in some cases, a participant node 210A may await the notifications from other participant nodes 210 before updating its local world state. In this way, the participant node 210A may apply the related updates from the multi-homed transaction at once to its local world state.

With reference to the multi-home consensus node 202, in the illustrated example of FIG. 2, the multi-home consensus node 202 includes a transaction queue 204, a multi-home transaction function 206, an end-block function 208. As described herein, the multi-home consensus node 202 can coordinate with the participant nodes 210A—participant node 210N to process multi-home transactions. For example, the multi-home consensus node 202 may receive proposed multi-home transactions from one or more participant nodes 210A—participant node 210N, and store them in the transaction queue 204. In some cases, the multi-home transaction function 206 may read the multi-home transactions from the transaction queue 204. The multi-home transaction function 206 may order the multi-home transactions to ensure that the multi-home transactions are processed in a predetermined sequence (e.g., chronological order, FIFO, etc.). This may involve determining the sequence in which the transactions should be processed relative to other transactions such that no data conflicts will occur. The multi-home transaction function 206 may also assign transaction IDs to corresponding multi-home transactions, and distribute the ordered transaction information to all involved participant nodes 210A—participant node 210N. In some cases, the multi-home consensus node 202 may use the transaction ID as the ordering mechanism such that participant nodes 210 process the transactions in sequence based on the transaction ID (e.g., lowest ID first, etc.). In certain cases, multi-home consensus node 202 may enforce partial orderings on multi-home transactions based on the identity of the participant nodes 210 involved in the multi-home transaction. For example, the multi-home consensus node 202 may enforce a partial ordering for all multi-home transactions that involve the same node. As a non-limiting example, consider the scenario in which there are four participant nodes 210 (nodes A, B, C, D) and the following multi-home transactions are to be executed: AB, CD. In such a scenario, as the multi-home transactions involve mutually exclusive sets of nodes, the multi-home consensus node 202 may not enforce a partial ordering. As such, the AB transaction and CD transaction may be performed in any order or asynchronously. In contrast, the multi-home consensus node 202 may enforce a partial ordering for AB and BC transaction because they both involve node B. Similarly, the multi-home consensus node 202 may enforce a partial ordering for AC, BC, CD, and ABC because each multi-home transaction involves node C.

Additionally and/or optionally, the multi-home transaction function 206 may verify the multi-home transactions to ensure the multi-home transactions comply with the blockchain's rules, policies, and data integrity requirements, for example, by checking the transaction's structure, ensuring it adheres to the blockchain's schema, and verifying that the transaction does not violate any predefined rules or policies. As another example, the multi-home transaction function 206 may check for global consistency (e.g., that a unique id is assigned as a primary key, or that a unique prefix for a chain-adjacent file is established). Thus, the multi-home consensus node 202 may enforce global (or at least more-than-one-node-in-scope) integrity constraints In some embodiments, the end-block function 208 can initiate a process of creating a block and appending the block to a blockchain by sending a command or signal (e.g., an end-block command or end-block transaction) to participant nodes 210A—participant node 210N. The command can cause the participant nodes 210A—participant node 210N to create a new block. The end-block function 208 can send the command to the participant nodes 210A—participant node 210N spontaneously or in response to some triggering events (e.g., the blockchain system 200 has processed more than a certain number of transactions, the passage of a specific time interval, or other predefined conditions). Upon receiving the end-block command, the participant nodes 210A-participant node 210N may begin the process of completing transactions initiated before receiving the end-block command in preparation for creating a new block. In some embodiments, transactions initiated before receiving the end-block command are processed completely for inclusion in the new block. Although shown as part of the multi-home consensus node 202, it will be understood that the end-block function 208 may be implemented as part of some or all of the participant nodes 210, on a separate device, etc.

In some embodiments, the end-block function 208 may also send hashes calculated by the multi-home consensus node 202 (e.g., the multi-home transaction function 206) or by the participant nodes 210 to the participant nodes 210A—participant node 210N. The end-block function 208 may also send a protocol (e.g., order of hashing, hash algorithm to be used) for calculating Merkle trees to the participant nodes 210A—participant node 210N such that each of the participant nodes 210A—participant node 210N may calculate a Merkle tree in the same way. For example, for a single-home transaction modifying data not owned by the participant node 210A, the multi-home consensus node 202 may hash a result of the single-home transaction and send the resulting hash value (and/or send the single-home transaction) to the participant node 210A. The participant node 210A may then use the resulting hash value to compute a Merkle tree.

As another example, for a multi-home transaction modifying data not owned by the participant node 210N, the multi-home consensus node 202 may hash a result of the multi-home transaction and send a resulting hash value to the participant node 210N. The participant node 210N may then use the resulting hash value to compute a Merkle tree. In some embodiments, each of the participant nodes 210 may further generate hash values by hashing results of single-home transactions and multi-home transactions that involve data owned by the respective participant node 210. The participant nodes 210 may also use the hash values to generate a Merkle tree, in addition to using resulting hash values generated by and received from other participant nodes and/or using transactions (e.g., received from other participant nodes) that do not involve node owned by the respective participant node 210. After computing a Merkle tree, each of the participant node 210A-participant node 210N may share the Merkle tree it calculated with other participant nodes 210 to validate the calculated Merkle trees. If the calculated Merkle trees are validated (e.g., each of the Merkle trees calculated is identical), the participant node 210A-participant node 210N may complete the process of creating a new block and append the new block to the blockchain. Additional details regarding the creation of a block are described herein with reference to FIG. 5A.

As will be appreciated in view of the above, the multi-home consensus node 202 and participant nodes 210 may collectively implement a secure, verifiable blockchain of transactions, thus enabling data sharing among participants.

While the multi-home consensus node 202 is shown in FIG. 2 as a distinct node, it may in some embodiments be implemented in conjunction with a participant node 210. For example, a given participant node 210 may host a transaction queue 204, multi-home transaction function 206 on behalf of the blockchain. The multi-home transaction function 206 may be verifiably immutable and identified within the blockchain, thus avoiding any issue of trust when such functions are hosted by a participant. Transactions within the transaction queue 204 may be required to be digitally signed by a proposing entity, thus avoiding issues of trust when the transaction queue 204 is hosted by a given participant. In some embodiments, multiple participant nodes 210 may each host such a transaction queue 204, multi-home transaction function 206. Illustratively, participant nodes 210 may periodically conduct leader election, according to any of a variety of known leader election protocols, to elect a participant node 210 to act as a multi-home consensus node 202.

Single-Home Transaction and Replicated Transaction

Figure 3:
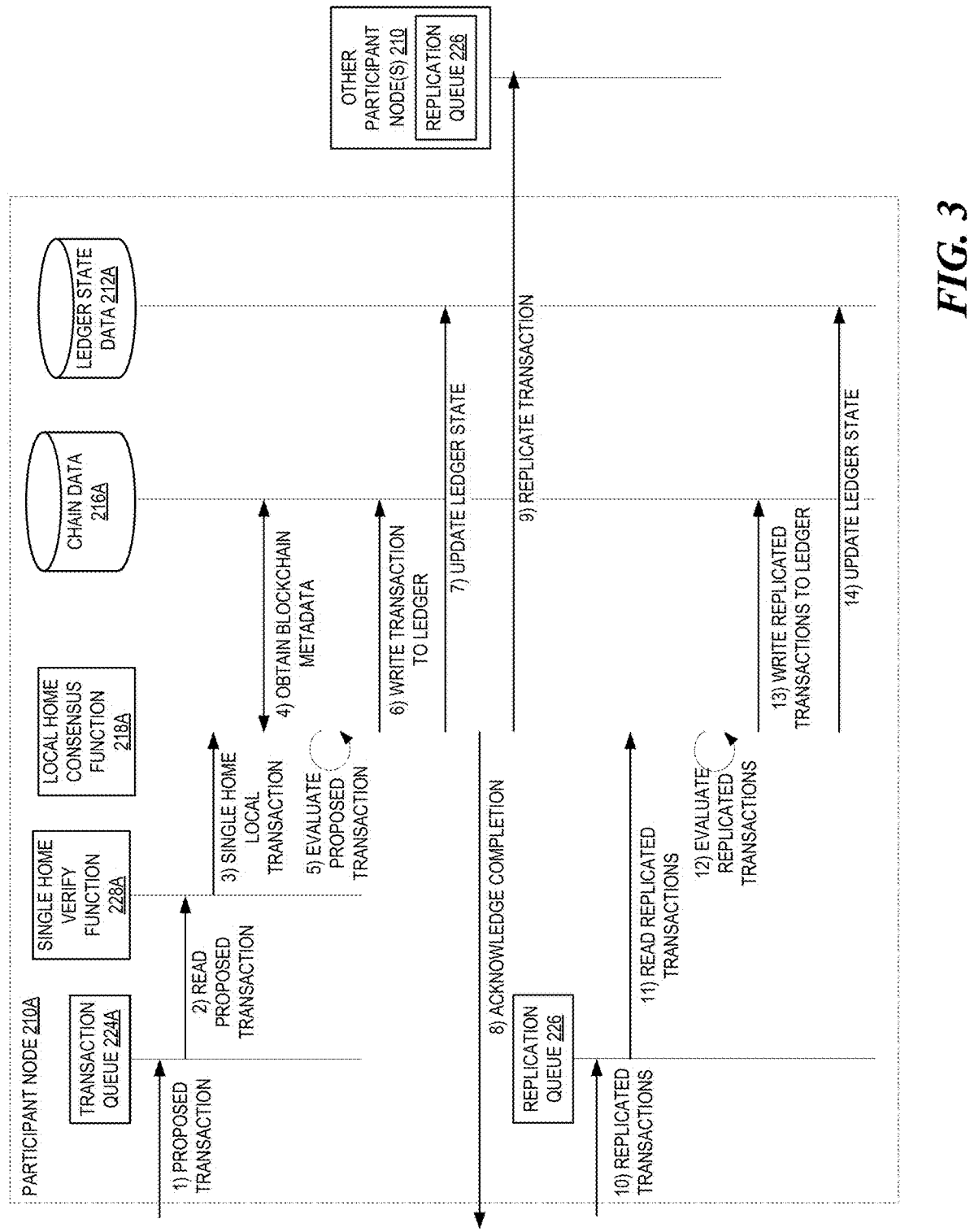
FIG. 3 depicts example interactions for a participant node to process a local single-home transaction and replicated transactions, in accordance with embodiments of the present disclosure.

With reference to FIG. 3, illustrative interactions will be described for a participant node 210A to process a local single-home transaction and to process replicated transactions for ensuring efficiency, consistency, and reliability of a blockchain implemented via trusted cloud resource primitives. The interactions of FIG. 3 may occur, for example, when a participant node to a blockchain proposes a write to the blockchain, such as by submitting a proposed write to a frontend 222 of a participant node 210.

The interactions begin at (1), where one or more proposed transactions are written to a transaction queue 224A of the participant node 210A. Each proposed transaction may include one or more modifications to the world state represented by the local instance of the distributed ledger, such as changing one or more field values or key-value pairs within a data set, including for example addition, modification, or deletion of such values. In some embodiments, proposed transactions may include conditional modifications, such that a modification to a value is conditional on, for example, other values within the ledger. In some embodiments, transactions may include references to smart contracts, corresponding to code executable to implement a transaction. For example, a transaction may include a reference to a particular set of code, such as code stored as on-chain data, stored as chain-adjacent data, or stored as a verifiably immutable set of code held at a cloud provider network 120, along with parameters for invoking that code. In further embodiments, transactions may include references to off-chain or chain adjacent data, such as a location of data within an object store 111 desired to be shared among participants to the blockchain. Each transaction may further include transaction metadata, such as a party proposing the transaction and information enabling the transaction to be authenticated, such as a digital signature of the party proposing the transaction (e.g., generated from a private key of the party proposing the transaction, and verifiable via a corresponding public key).

At (2), the single-home verify function 228A reads the proposed transaction from the transaction queue 224A for verifying and executing the proposed transaction within the participant node 210A. The single-home verify function 228A may represent execution of verifiable code, such as verifiably immutable code held by a cloud provider network 120 and executed by a service of the network 120, such as a serverless compute service. In some embodiments, the single-home verify function 228A may perform authentication checks before proceeding with the proposed transaction.

For example, before sending the proposed transaction for further processing, the single-home verify function 228A may perform authentication checks to ensure that the proposed transaction is submitted by an authorized entity (e.g., an authorized user, other participant node(s) 210 authorized to submit the proposed transaction). More specifically, the single-home verify function 228A may verify the credentials of the entity that submitted the proposed transaction to ensure the entity has the appropriate permissions to submit the proposed transaction. Additionally and/or optionally, the single-home verify function 228A may break up the proposed transaction if the proposed transaction includes multiple transactions. By breaking the proposed transaction including multiple transactions into individual transactions, the participant node 210A may process each transaction separately, thereby allowing for more granular control and verification of transactions.

In some embodiments, the single-home verify function 228A may perform access control list (ACL) checks to verify that the entity proposing the proposed transaction has the appropriate permissions to modify the data involved in the proposed transaction. As such, the participant node 210A may advantageously prevent unauthorized modifications from being made to the distributed ledger represented by the blockchain. In further embodiments, if the proposed transaction is a query that can be answered using the local world state of the participant node 210A, the single-home verify function 228A may retrieve the relevant data from the local instance of the distributed ledger. The single-home verify function 228A may then return the relevant data as the result to the query. As such, the participant node 210A may avoid unnecessary processing and consensus checks for simple query (e.g., read) operations. Advantageously, through the single-home verify function 228A performing some or all of the above checks and operations, the participant node 210A may ensure that the proposed transaction is valid, authorized, and ready for further processing such as evaluating the proposed transaction, writing the proposed transaction for inclusion in the ledger, or updating the ledger state.

At (3), the single-home verify function 228A determines whether the proposed transaction is a single-home transaction. The single-home transaction may only involve data owned by a single participant node (e.g., the participant node 210A) and may not require consensus from multiple participant nodes to modify the data. In some embodiments, if the single-home verify function 228A determines that the proposed transaction is a single-home transaction that modifies data owned by the participant node 210A, the single-home verify function 228A may send the proposed transaction to the local home consensus function 218A for further operations and processing.

In other embodiments not illustrated in FIG. 3, if the single-home verify function 228A determines that the proposed transaction is a multi-home transaction that involves data owned by multiple participant nodes, the single-home verify function 228A may send the proposed transaction to the multi-home consensus node 202 (e.g., the multi-home transaction function 206 and/or a world consensus function of the multi-home consensus node 202) for further processing. In these embodiments, the multi-home consensus node 202 may receive the proposed transaction. The multi-home consensus node 202 may further order the proposed transaction, thereby ensuring that the proposed transaction is processed in an appropriate sequence among other transactions. The multi-home consensus node 202 may then send the proposed transaction that is ordered and designated as a multi-home transaction to receiving nodes for further processing. Example implementation of the blockchain system 200 for processing a multi-home transaction will be described herein at least with reference to FIG. 4A.

If the single-home verify function 228A determines that the proposed transaction is a single-home transaction, then at (4), the local home consensus function 218A may confirm whether the participant node 210A is the owner of the data involved in the proposed transaction. In some embodiments, the local home consensus function 218A may obtain blockchain metadata indicative of data ownership (e.g., ownership metadata) and use the ownership metadata associated with the data to determine if the participant node 210A is the owner or has the authority to modify the data. In some embodiments, if the local home consensus function 218A determines that the participant node 210A is not the owner of the data that is to be updated or modified by the proposed transaction (e.g., determines that the transaction is an external transaction), the participant node 210A may forward or send the proposed transaction to a participant node 210 (e.g., the participant node 210N) that owns the data. As such, the local home consensus function 218A may ensure that the proposed transaction is processed by the participant node 210 that has authority to modify the data.

If the local home consensus function 218A confirms that the participant node 210A is the owner of the data involved in the proposed transaction (e.g., determines that the transaction is a local transaction), then at (5), the local home consensus function 218A may evaluate the proposed transaction based on the obtained blockchain metadata to ensure, for example, that the proposed transaction is valid and does not violate any rules, policies, and/or data integrity requirements associated with the distributed ledger represented by the blockchain. More specifically, the local home consensus function 218A may evaluate that the proposed transaction is valid by checking that the transaction is well-formed, adheres to the blockchain's schema, or does not violate any predefined rules or policies (e.g., the proposed transaction does not result in negative balances or other invalid states in the ledger).

In some embodiments, if the proposed transaction is a read-only query, the local home consensus function 218A may acquire a read lock from an orderer (not shown in FIG. 3) using lexical orders. As such, the local home consensus function 218A may ensure that a read operation does not or will not be interfered with any other ongoing operations (e.g., other write operations). In some embodiments, if the proposed transaction is not a read-only query (e.g., involving writing data), the local home consensus function 218A may acquire write locks for data involved in the proposed transaction. As such, the local home consensus function 218A may ensure that the write operations are performed atomically and do not conflict with other transactions. Accordingly, it will be understood that the local home consensus function 218A may apply locking or other mechanisms to ensure serializable reads and writes or to establish other consistency models.

Additionally and/or optionally, the local home consensus function 218A may implement or offer some mechanisms (e.g., offer for a timeout) to avoid indefinite stalling. The local home consensus function 218A may obey any partial or total orderings specified in an operation list and/or associated with the proposed transaction.

In some embodiments, before performing any read and/or write operations in accordance with the proposed transaction, the local home consensus function 218A may check that any preconditions specified in the proposed transaction are met. For example, preconditions may include conditions or criteria that need to be satisfied for the proposed transaction to be valid or to proceed. More specifically, a precondition may specify that a certain account balance be above a threshold before a transfer based on the proposed transaction can occur. When preconditions, if any, are satisfied, the local home consensus function 218A may perform reads or writes according to the proposed transaction. In some embodiments, if any preconditions are not satisfied, the local home consensus function 218A may indicate a failure of the proposed transaction.

With the proposed transaction evaluated (e.g., checked for authorization, any preconditions, and compliance with the blockchain's rules and policies), the participant node 210A may execute the transaction (e.g., perform reads or writes according to the transaction) and/or record the transaction.

For example, at (6), the local home consensus function 218A may write the transaction to the chain data 216A of the participant node 210A. As noted above, in some embodiments, the local home consensus function 218A may ensure that the transaction is written to the chain data 216A atomically. For example, the local home consensus function 218A may use DynamoDB (DDB) transactions, Postgres transactions, or other single account/locally deployed database transaction mechanism to ensure that the transaction is either fully applied to the chain data 216A or not applied to the chain data 216A at all. As such, the local home consensus function 218A may prevent partial updates to the chain data 216A that could lead to data inconsistencies.

As part of writing or recording the transaction to the chain data 216A, the local home consensus function 218A may enforce an ordering of the transaction with regard to other transactions owned by the participant node 210A. In some cases, the participant node 210A may order the transactions based on time received, time processed, or some other ordering. The local home consensus function 218A may use the ordering in determining the order by which to process transactions. For example, the local home consensus function 218A may process the transactions sequentially based on the assigned order. As described herein, the ordering assigned by the participant node 210A may be used by other participant nodes 210 when they receive a replicated transaction of the transaction owned by the participant node 210A. In this way, the other participant node 210 can apply the transactions owned by the participant node 210A in a consistent manner to maintain consistent instances of the distributed ledger.

At (7), the local home consensus function 218A may execute the transaction. In some cases, such as in response to a read-only query or transaction, executing the transaction may involve reading data from the chain data 216A based on the local world state of the participant node 210 and collecting the relevant data into a resultant payload.

In certain cases, such as in response to a read/write transaction, the local home consensus function 218A may modify or update the local world state via the chain data 212A. For example, the local home consensus function 218A may identify changes or updates for the chain data 212A in the transaction and modify the chain data 212A in accordance with the identified changes or updates. For example, the local home consensus function 218A may update corresponding data items in the ledger state data 212A to reflect new values or states identified in, or resulting from the processing of, the transaction. After performing read or write operations, the local home consensus function 218A may return a result of the transaction.

In some cases, the local home consensus function 218A may ensure updates or modifications (e.g., writes) to the chain data 212A are performed atomically, such as, for example, by using DynamoDB (DDB) transactions, Postgres transactions, or other single account/locally deployed database transaction mechanism. As noted above, the ledger state data 212A may represent a materialized view of the current state of the local instance of the distributed ledger. As described herein, the different participant nodes 210 may have different states for the ledger given the asynchronous update of the ledger by the different participant nodes 210.

At (8), the local home consensus function 218A may acknowledge the completion of the transaction. In some embodiments, after the transaction has been written to the chain data 216A and the ledger state data 212A is updated, the local home consensus function 218A may confirm that the operations associated with the transaction have been completed without errors. For example, the local home consensus function 218A may verify that the transaction has been fully applied and that the chain data 216A and the ledger state data 212A accurately reflect the updates associated with the transaction. If the local home consensus function 218A confirms that the transaction has been completed without errors, the local home consensus function 218A may generate an acknowledgment message indicating the successful completion of the transaction. The acknowledgement message may include details such as the transaction ID, the status of the transaction (e.g., "completed successfully"), and any relevant metadata or results associated with the transaction. In some cases, the acknowledgement may include the changes that were made or end result of the changes made to the distributed leger and/or the partial order of the transaction relative to other transactions processed or completed by the participant node 210.

In some cases, the local home consensus function 218A may send the acknowledgment message to a user, a client, or an entity (e.g., other participant node(s) 210, such as the participant node 210 that initially received the transaction but determined that it did not own the relevant data or transaction), the client computing devices 102) that initially proposed the transaction, etc. As such, the participant node 210A may ensure that an entity associated with the transaction is informed of the outcome of the transaction. The local home consensus function 218A may send the acknowledgment message through various communication channels, such as an API response, a message queue, or a notification service, etc.

At (9), the local home consensus function 218A may replicate the transaction to other participant node(s) 210 for inclusion in their respective local chain data 216 and ledger state data 212. In certain embodiments, the local home consensus function 218A may replicate the transaction by sending a notification or instruction to the other participant node(s) 210 to replicate the transaction. In some embodiments, at (9), the local home consensus function 218A may send the notification/transaction asynchronously (e.g., after the participant node 210A has processed the transaction) to the replication queue 226 of other participant node(s) 210. As such, the local home consensus function 218A may ensure that the transaction is propagated to the local chain data 216 and ledger state data 212 of other participant node(s) 210 for maintaining consistency and integrity of the distributed ledger. Additionally and/or optionally, the local home consensus function 218A may monitor the status of replicating the transaction to other participant node(s) 210 and/or handle any errors encountered while the other participant node(s) 210 replicate the transaction. For example, when errors occur, the local home consensus function 218A may retry sending the transaction to the replication queue 226 of other participant node(s) 210 or logging the errors.

At (10), the participant node 210A may receive replicated transactions from other entities (e.g., other participant node(s) 210) for updating the local chain data 216A and/or the ledger state data 212A of the participant node 210A. In some embodiments, receiving a replicated transaction (e.g., transaction to be replicated on the receiving participant node 210A) from other participant node(s) 210 may enable the distributed ledger (e.g., the chain data 216 and/or the ledger state data 212) to be consistent across all participant nodes 210 such that all participant nodes may have a consistent state for the distributed ledger. Moreover, by receiving and processing replicated transactions, the participant node 210A may synchronize its local distributed ledger based on external transactions performed by other participant nodes 210 (such transactions may be considered local transactions from the perspective of the participant node that executed it/owned the data that was affected by it).

For example, the participant node 210A may monitor its replication queue 226A for incoming replicated transactions corresponding to transactions that have been processed, or are owned, by other participant node(s) 210. The replication queue 226A may manage the receipt of replicated transactions (e.g., avoid overflowing of the replication queue 226) and ensure the replicated transactions are processed by the participant node 210 in a timely manner (e.g., using some queue management scheme, such as first-input-first-output (FIFO)).

In some cases, while the participant nodes 210 attempt to have a consistent state for the distributed ledger, given the ongoing number of transactions across the different participant nodes 210 it may be difficult until such time as a new block is to be added to the blockchain. Moreover, in some cases, not all transactions are shared or viewable by all of the participant nodes 210. In some such cases, the distributed ledgers of the different participant nodes 210 may differ, but in a controlled and consistent manner. For example, consider a scenario in which participant node 210A modifies data in its local chain data 212A but the permissions for that data indicate that participant node 210N does not have access rights (e.g., no read rights or viewable permissions). In such a scenario, the chain data 212A may consistently differ from the chain data 212N because the chain data 212N will not include the data to which participant node 210N does not have access rights. Despite the differences, the participant nodes 210 may verify transactions in a consistent manner as part the creation of a block for the blockchain as will be described herein at least with reference to FIGS. 5A and 5B.

At (11), responsive to replicated transactions added to the replication queue 226A, the local home consensus function 218A may read the replicated transactions. For example, the local home consensus function 218A may fetch replicated transactions data from the replication queue 226A, and prepare replicated transactions for evaluation and integration into the local instance of the distributed ledger. Additionally and/or optionally, the participant node 210A may log the receipt of replicated transactions for purposes such as auditing and historical analysis. The log entry may include details such as the replicated transactions IDs, the source node, the timestamp of receipt, and any relevant metadata.

At (12), the local home consensus function 218A may evaluate replicated transactions to ensure that replicated transactions are valid and comply with the blockchain's rules and policies. The local home consensus function 218A may evaluate replicated transactions similar to evaluating the proposed transaction at (5). For example, the local home consensus function 218A may check that the replicated transactions adhere to the blockchain's schema, and will not result in negative balances or other invalid states in the distributed ledger. In certain cases, the local home consensus function 218A may omit (12) and/or some of the checks of the replications transaction (e.g., not resulting in negative balances or other invalid states) based on a determination that the transaction is a replicated transaction and therefore another participant node 210 performed relevant evaluations. In certain cases, as part of evaluating the replicated transaction, the local home consensus function 218A can verify that the other participant node 210 owned the data of the transaction corresponding to the replicated transaction and that the participant node 210A has the relevant privileges/permissions to receive the replicated transaction and update its instance of the distributed ledger based on it.

At (13), the local home consensus function 218A may write the replicated transactions to the chain data 216A. In certain cases, if the replicated transactions have been verified and/or evaluated (e.g., checked for authorization, any preconditions, and compliance with the blockchain's rules and policies), the local home consensus function 218A writes the replicated transaction to the chain data 216A. In some cases, the local home consensus function 218A writes the replicated transaction without performing the evaluations of (12) and/or responsive to a determination that the transaction is a replicated transaction and another participant node 210 performed the relevant evaluations.

As described herein, as part of processing and/or executing the transaction, the local home consensus function 218A may write the replicated transaction to the chain data 216A of the participant node 210A. In some embodiments, the local home consensus function 218A may ensure that the replicated transactions are written to the chain data 216A atomically. For example, the local home consensus function 218A may ensure that each of the replicated transactions is either fully applied to the chain data 216A or not applied to the chain data 216A at all. As such, the local home consensus function 218A may prevent partial updates to the chain data 216A that could lead to data inconsistencies.

As part of writing or recording the replicated transaction to the chain data 216A, the local home consensus function 218A may enforce an ordering of the replicated transaction with regard to other transactions. For example, as described herein, each participant node 210 may assign an order to transactions that it processes and communicate that order with the replicated transaction corresponding to the transaction to other nodes. The participant node 210 that receives the replicated transaction may process the replicated transaction according to the "partial ordering" received from the other participant node(s) 210. For example, if a transaction is owned/homed by the participant node 210N and assigned an order by the participant node 210N, the participant node 210A may enforce the order when processing/executing the replicated transaction corresponding to the transaction owned/homed by the participant node 210N. Similarly, the participant node 210N may enforce the ordering of transactions assigned by participant node 210A, etc. Moreover, as described herein, the multi-home consensus node 202 may enforce an ordering of multi-home transactions.

In some cases, while the participant node 210A may enforce a partial ordering of transactions from a particular node and multi-home home transactions (e.g., an intra-node order), the participant node 210A may not enforce an ordering for transactions from different nodes (e.g., an inter-node order). For example, the participant node 210A may process transactions T1, T2, and T3 from participant node 210N in a respective order, process multi-home MHT1, MHT2, and MHT3 in a respective order, and process Ta, Tb, Tc from participant node 210B in a respective order, but it may process the transactions from different nodes in different orders. For example, the participant node 210A may process the transactions as: T1, T2, Ta, MHT1, MHT2, Tb, Tc, MHT3, T3 or any other order provided that the partial ordering of transactions from respective participant nodes 210 is maintained. By distributing ownership/control of ordering the different transactions, the blockchain system 200 can provide a resilient blockchain that enables asynchronous updates between participant node 210 for transactions that affect a subset of the participant node 210. Moreover, the partial ordering can enable the respective participant node 210 to generate hashes for transactions that they own/control and enable other participant node(s) 210 that receive replicates of those transactions to verify the order of the transactions (e.g., by generating a hash that relies on the same order of the transactions).

At (14), the local home consensus function 218A may update the ledger state on the ledger state data 212A based on the replicated transactions, similar to what is described at (7) of FIG. 3. In some embodiments, the local home consensus function 218A may update the ledger state data 212A based on the replicated transactions such that the participant node 210A may have an updated view (e.g., reflecting recent transactions) of the ledger. In some embodiments, to update the ledger state data 212A, the local home consensus function 218A may read some transaction data from the replicated transaction and/or that has been written to the chain data 216A. The data read may include information or details of the replicated transactions, such as modifications made to the distributed ledger. The local home consensus function 218A may apply the modifications specified in the replicated transactions to the ledger state data 212A. For example, the local home consensus function 218A may update corresponding data items in the ledger state data 212A to reflect new values or states resulting from the processing of the replicated transactions. As described above with reference to writing the replicated transaction to the 216A, the local home consensus function 218A may enforce an ordering of replicated transactions when updating the ledger state based on the replicated transactions.

Fewer, more, or different steps may be used herein with reference to the processing of a single-home transaction. For example, any one or combination of blocks of routine 900 may be combined with any one or any combination of blocks in FIGS. 6-8. Moreover, the steps may be rearranged in a different order or performed concurrently. For example, the participant node 210A may concurrently process transactions (e.g., (1)-(9)) and replicated transactions (e.g., (10)-(14)). As another non-limiting example, the participant node 210A may concurrently (6) write transaction to the ledger and (7) update the ledger state based on the transactions and concurrently (13) write replicated transaction to the ledger and (14) update the ledger state based on the replicated transactions.

Although described with reference to processing a single-home transaction, it will be understood that the steps described herein with reference to FIG. 3 may similarly be used to process a local home portion of a multi-home home transaction. For example, as will be described herein with reference to FIG. 4A, one participant node 210A may send a portion of a multi-home transaction to another participant node 210N. The other participant node 210N may process their portion (e.g., their local portion) of the multi-home transaction along the lines described herein with reference to FIG. 3.

Multi-Home Transaction

Figure 4A:
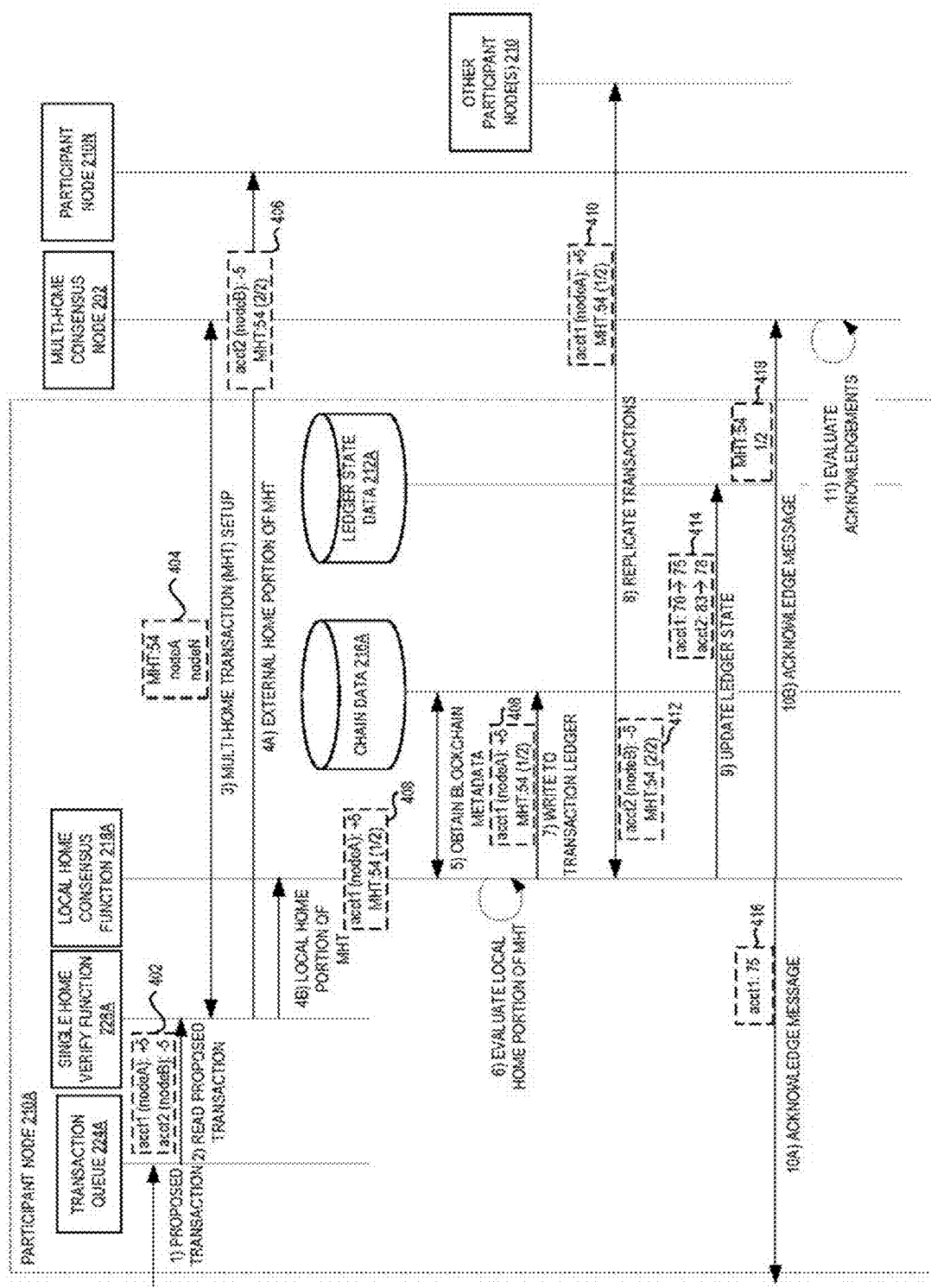
FIG. 4A depicts example interactions for a receiving participant node to process a multi-home transaction, in accordance with embodiments of the present disclosure.

With reference to FIG. 4A, illustrative interactions will be described for a receiving participant node (e.g., a participant node 210A) coordinating with a multi-home consensus node 202 and other participant node(s) 210 to process a multi-home transaction for ensuring efficiency, consistency, and reliability of a blockchain implemented via trusted cloud resource primitives. The interactions of FIG. 4A may occur, for example, when a participant node 210A receives from a user, another participant node, or another entity a proposed transaction (e.g., a write to the blockchain). Although some functions are described as being performed from the perspective of participant node 210A, it will be understood that any one or any combination of the participant nodes 210 may perform similar functions.

At (1), a proposed transaction is written to a transaction queue 224A. In contrast to the proposed transaction discussed with reference to FIG. 3, the proposed transaction of FIG. 4A may involve modifications to data owned by multiple participant nodes. For example, the proposed transaction may involve transferring assets between accounts managed by different nodes or updating records that span multiple nodes. In some cases, the proposed transaction may involve modification to data owned by the participant node 210A and the participant node 210N (also referred to herein as the multi-home transaction (MHT) participant node 210N). Although the example provided includes only two participant nodes 210, it will be understood that an MHT may include more or all of the participant nodes 210.

As noted above, the proposed transaction may include one or more modifications to the distributed ledger, such as changing one or more field values or key-value pairs within a data set, including for example addition, modification, or deletion of such values. In some embodiments, the proposed transaction may include conditional modifications, such that a modification to a value is conditional on, for example, other values within the ledger. Moreover, in some cases, the condition (e.g., the read set or the data items to be read) may be different from the update (e.g., the write set or the data item(s) to be modified or written). For example, assigning a unique primary key to a newly added row or file may result in a multi-home transaction because it has "global" scope, even though the item being added might be owned by a single participant node. In this particular example, the read set may be all items (because of the uniqueness constraint) while the write set may be confined to a single node (the owner).

In further embodiments, the proposed transaction may include references to off-chain or chain adjacent data, such as a location of data within an object store 111 desired to be shared among participants to the blockchain. The proposed transaction may further include transaction metadata, such as a party proposing the transaction and information enabling the transaction to be authenticated, such as a digital signature of the party proposing the transaction (e.g., generated from a private key of the party proposing the transaction, and verifiable via a corresponding public key).

To facilitate understanding, FIG. 4A includes a non-limiting example of a multi-home transaction 402 in which a first account (acct1) owned by participant node 210A (nodeA) is to increase by five and a second account (acct2) owned by participant node 210N (nodeN) is to decrease by a corresponding amount of five. Such a multi-home transaction may represent a transaction between two parties.

At (2), the single-home verify function 228A may read the proposed transaction (e.g., mulit-home transaction 402) from the transaction queue 224A. For example, the single-home verify function 228A may fetch information or details about the proposed transaction, such as what modifications to be made to the distributed ledger. Based on the information about the proposed transaction, the single-home verify function 228A may also identify the proposed transaction as a multi-home transaction that involves modifying data owned by the participant node 210A and the participant node 210N. Before proceeding with the proposed transaction, the single-home verify function 228A may perform initial checks on the proposed transaction to confirm, for example, that the proposed transaction adheres to the basic requirements of the blockchain's schema and includes relevant fields for completing the proposed transaction.

Responsive to identifying the proposed transaction as a multi-home transaction that involves modifying data owned by the participant node 210A and the participant node 210N, at (3), the single-home verify function 228A may coordinate with the multi-home consensus node 202 to setup a multi-home transaction. The single-home verify function 228A may send a request to the multi-home consensus node 202 for setting up a multi-home transaction. In some embodiments, the single-home verify function 228A may notify the multi-home consensus node 202 that the proposed transaction is a multi-home transaction and provide information (e.g., data to be modified based on the proposed transaction, the nodes involved in the proposed transaction, and any preconditions that must be met for proceeding the proposed transaction) about the proposed transaction to the multi-home consensus node 202. In some cases, the information provided to the multi-home consensus node 202 may be limited. For example, the information may include (only) the identities of the participant nodes 210 involved in the transaction. In this way, the multi-home consensus node 202 may not receive or store information regarding the content of the transactions processed by the participant nodes 210. For example, with reference to the multi-home transaction 402, the request from the single-home verify function 228A may include (only) the identities of the involved participant nodes 210 (e.g., nodeA, nodeN) and/or may include the details of the transaction itself (e.g., acct1 +5, acct2 −5).

Based on the request and/or information about the proposed transaction, the multi-home consensus node 202 may assign an identifier and/or order the proposed transaction to be processed in a particular sequence. For example, the multi-home consensus node 202 may determine the sequence in which the proposed transaction should be processed by involved nodes relative to other transactions, including relative to other multi-home transactions. Accordingly, the multi-home consensus node 202 may provide or establish a partial ordering of multi-home transactions relative to each other (or at least relative to other multi-home transactions involving the same participant node). The multi-home consensus node 202 may assign the proposed transaction to a transaction container (not shown in FIG. 4A) to monitor, track, or manage the proposed transaction. After assigning and identifier and/or ordering the proposed transaction and/or assigning the proposed transaction to the transaction container, the multi-home consensus node 202 may send order transaction information to the participant node 210A (e.g., the single-home verify function 228A) and/or a notification to the participant node 210A that the proposed transaction can continue. In some cases, the identifier may be used as the ordering (e.g., by assigning sequential values).

As described herein, in some cases, the multi-home consensus node 202 may serialize or apply a partial ordering based on the participant nodes 210 involved in the multi-home transaction. For example, multi-home transactions that involve participant node 210A may be serialized (or partial ordered) relative to each other but parallelized relative to multi-home transactions that involve participant node 210N (and that do not involve participant node 210A). Similarly, multi-home transactions that involve participant node 210N may be serialized relative to each other. Multi-home transactions that involve participant node 210A and participant node 210N may be serialized relative to multi-home transactions that involve participant node 210A or participant node 210N.

In the multi-home transaction 402 example illustrated in FIG. 4A, the information 404 received from the multi-home consensus node 202 includes an identifier (or order) for the multi-home transaction (54) and an identity of the nodes involved (nodeA (nA), nodeN (nN)). However, it will be understood more, less, or different information or data may be received. For example, the information 404 may (only) include the identifier (or order) for the multi-home transaction 402.

In response to receiving the information or notification from the multi-home consensus node 202, the single-home verify function 228A may process the proposed transaction by dividing the proposed transaction into a local home portion and an external home portion. In some embodiments, the local home portion may be the segment of the proposed transaction (e.g., the multi-home transaction) that pertains to data owned by the participant node 210A. As such, the local home portion may be processed (e.g., owned) by the participant node 210A locally without further consensus from other nodes. The external home portion may be the segment of the proposed transaction that involves data owned by the participant node 210N or another participant node 210. As such, the external home portion may include modifications or operations that need to be performed by the participant node 210N to complete the transaction.

At (4A), the single-home verify function 228A may send the external home portion of the proposed transaction to the participant node 210N. As described herein, in some cases, the multi-home consensus node 202 may coordinate communications between the participant node 210A and the participant node 210N and send the external home portion of the proposed transaction to the participant node 210N. In either case, the participant node 210N may evaluate the external home portion and process the external home portion, similar to the manner in which the participant node 210A processes and executes the local home portion of the multi-home transaction and/or local home transactions and/or similar to the processing of a single-home transaction as described herein with reference FIG. 3. For example, although not shown in FIG. 4A, the participant node 210N may verify the proposed transaction's validity, check whether preconditions are met, and/or confirm that the external home portion of the proposed transaction complies with the blockchain's rules and policies. The participant node 210N may also confirm that the external home portion (only) includes modifications to data that is owned by the participant node 210N (e.g., that the external home portion is not itself a multi-home transaction). In some cases, the participant node 210N may process the external home portion according to the ordering prescribed by the multi-home consensus node 202. Moreover, as described herein, when processing the external home portion of the multi-home transaction according to the order, the participant node 210N may determine that one or more other single-home transactions or portions of a multiple-home transaction are to be processed before processing the external home portion of the multi-home transaction.

In some cases, the external home portion may include an indication that the external home portion is part of a multi-home transaction. For example, the external home portion may include a multi-home transaction ID or other instruction that identifies the external home portion as part of a multi-home transaction. Responsive to the multi-home transaction ID and/or instruction, the participant node 210N may (e.g., upon completing the execution of the external home portion) send an acknowledgement to the multi-home consensus node 202 and/or the participant node 210A that the external home portion has been completed. In this way, the multi-home consensus node 202 and/or the participant node 210A can monitor the completion of all portions of the multi-home transaction. With reference to the multi-home transaction 402 example, the external home portion 406 includes the identity of the node that is to execute the transaction (nodeN), the details of the portion of the transaction to be executed by the participant node 210N (acct2 −5), the multi-home transaction identifier (54), and the number of portions of the multi-home transaction and which particular portion of the multiple portions the external portion corresponds to (2 of 2 or 2/2). However, it will be understood that fewer, more, or different information may be included in the external home portion 406.

At (4B), the single-home verify function 228A may send the local home portion of the proposed transaction to the local home consensus function for processing, similar to (3) of FIG. 3. In some cases, the participant node 210A may process the internal home portion according to the ordering prescribed by the multi-home consensus node 202. With reference to the multi-home transaction 402 example, the internal home portion 408 includes the identity of the node that is to execute the transaction (nodeA), the details of the portion of the transaction to be executed by the participant node 210A (acct1 +5), the multi-home transaction identifier (54), and the number of portions of the multi-home transaction and which particular portion of the multiple portions the external portion corresponds to (2 of 2 or 2/2). However, it will be understood that fewer, more, or different information may be included in the internal home portion 408.

At (5), the local home consensus function may obtain blockchain metadata for processing the local home portion of the proposed transaction, similar to (4) of FIG. 3. As noted above, for example, the local home consensus function 218A may confirm whether the participant node 210A is the owner of the data involved in the local home portion of the proposed transaction. In some embodiments, the local home consensus function 218A may obtain blockchain metadata indicative of data ownership (e.g., ownership metadata) and use the ownership metadata associated with the data to determine if the participant node 210A is the owner or has the authority to modify the data.

At (6), the local home consensus function 218A may evaluate the local home portion of the proposed transaction based on the obtained blockchain metadata to verify, for example, that the proposed transaction is valid and does not violate any rules, policies, and/or data integrity requirements associated with the distributed ledger represented by the blockchain, similar to (5) of FIG. 3. More specifically, the local home consensus function 218A may evaluate that the proposed transaction is valid by checking that the transaction is well-formed, adheres to the blockchain's schema, and/or does not violate any predefined rules or policies (e.g., the local home portion of the proposed transaction does not result in negative balances or other invalid states in the ledger).

With the proposed transaction evaluated (e.g., checked for authorization, any preconditions, and compliance with the blockchain's rules and policies), the participant node 210A may record the transaction. At (7), the local home consensus function 218A may write the local home portion of the transaction to the chain data 216A of the participant node 210A, similar to (6) of FIG. 3. In some embodiments, the local home consensus function 218A may ensure that the content of the local home portion of the proposed transaction is written to the chain data 216A atomically. For example, the local home consensus function 218A may ensure that the local home portion of the proposed transaction is either fully applied to the chain data 216A or not applied to the chain data 216A at all. As such, the local home consensus function 218A may prevent partial updates to the chain data 216A that could lead to data inconsistencies. With reference to the multi-home transaction 402 example, the internal home portion 408 may be stored with the chain data 216A.

As part of writing or recording the transaction to the chain data 216A, the local home consensus function 218A may enforce an ordering of the transaction with regard to other multi-home transactions processed/executed by the participant node 210A (in accordance with the ordering provided by the multi-home consensus node 202). For example, the participant node 210A may order the transactions based on time received, time processed, or some other ordering (e.g., the ordering assigned to the multi-home transaction by the multi-home consensus node 202). As described herein, in some cases, the multi-home consensus node 202 may order a multi-home transaction based on the participant nodes 210 involved in the multi-home transaction such that multi-home transactions that involve the same node are performed or executed serially. In certain cases, the ordering assigned by the multi-home consensus node 202 may allow for the concurrent performance or execution of multi-home transactions involving mutually exclusive sets of participant nodes 210. As a non-limiting example, the multi-home consensus node 202 may order (all) transactions involving participant node 210A according to a first ordering, and order multi-home transactions involving participant node 210N that do not involve participant node 210A according to a second ordering. Accordingly, each participant node 210A may enforce a partial ordering of the multi-home transactions of which they are a part (in accordance with the ordering assigned by the multi-home consensus node 202).

At (8), the local home consensus function 218A may send a replication of the local home portion of the multi-home transaction (e.g., as a replicated transaction), similar to (9) of FIG. 3, to the participant node 210N and to other participant node(s) 210 that do not own data that were modified by the multi-home transaction (but that have relevant privileges/permissions to receive the replicated transaction). As such, the modifications made based on (e.g., responsive to) the local home portion of the multi-home transaction can be propagated or processed asynchronously by the participant node 210N and other participant node(s) 210 that do not own the data and/or are not directly involved in the multi-home transaction. As described herein, the participant node 210N may await for replications of all portions of the multi-home transaction before proceeding to modify the ledger state data 212A.

In some embodiments, the local home consensus function 218A may generate a replication message for replicating the local home portion of the multi-home transaction on other participant node(s) 210. The replication message can include information or details about the proposed transaction (e.g., the replicated transaction), such as the multi-home transaction ID (assigned by the multi-home consensus node 202), the proposed modifications, and/or any other metadata related to the multi-home transaction (e.g., number of portions of the multi-home transaction, identity of the portion of the multi-home transaction relative to other portions of the same multi-home transaction, etc.). As described herein, the message may include the ordering for the multi-home transaction (e.g., as part of the transaction ID or separately).

With reference to the multi-home transaction 402 example, the replication message 410 includes the content of the internal home portion 408. However, it may be understood that the replication message 410 may include fewer, more, or different information. For example, the replication message 410 may include a digital signature of the participant node 210A, which may be used by the other participant nodes 210 to authenticate the replication message 410, etc.

Although not illustrated in FIG. 4A and similar to (10)-(14) of FIG. 3, after receiving the replication message from the local home consensus function 218A, the participant node 210N and the other participant node(s) 210, respectively, may store the replicated transaction in respective replication queues 226, fetch information about the proposed transaction, and/or evaluate the proposed transaction for replication. For example, the participant node 210N and the other participant node(s) 210 may individually evaluate the replicated transaction to verify that the replicated transaction is valid and/or complies with the blockchain's rules, similar to (12) of FIG. 3. If the replicated transaction is evaluated and verified to be valid, the participant node 210N and the other participant node(s) 210 can write the replicated transaction to their respective chain data 216 and/or ledger state data 212, similar to (13) and (14) of FIG. 3. As described herein, the participant nodes 210 may evaluate and process the replicated transaction according to the ordering assigned by the multi-home consensus node 202. In this way, the participant nodes 210 can process the replicated transactions in a consistent manner.

In addition to sending replicated transaction(s) to other participant node(s) 210, the local home consensus function 218A may receive replicated transaction(s) from other participant node(s) 210, including a replicated transaction of the external home portion of the multi-home transaction from the participant node 210N. After receiving the replicated transaction of the external home portion of the multi-home transaction from the participant node 210N, the participant node 210A may process the replicated transaction similar to what is described herein at least with reference to (10)-(14) of FIG. 3. This bidirectional nature of transaction replication can ensure that each participant node 210 (e.g., participant nodes 210 involved in the multi-home transaction and participant nodes 210 not involved in the multi-home transaction that have the relevant permissions/privileges to be notified of the replicated transaction) in the blockchain system 200 can receive updates about transactions such that the participant nodes 210 can maintain consistency of the distributed ledger across all participant nodes 210 of the blockchain system 200.

With reference to the multi-home transaction 402 example, the replication message 412 corresponds to and includes the content of the external home portion 406. However, it may be understood that the replication message 412 may include fewer, more, or different information. For example, the replication message 412 may include a digital signature of the participant node 210N, which may be used by the participant node 210A to authenticate the replication message 412, etc.

At (9), the local home consensus function 218A may update the ledger state data 212A and/or execute the local home portion of the multi-home transaction, similar to (7) of FIG. 3. In some cases, such as in response to a read-only query or transaction, executing the transaction may involve reading data from the chain data 216A based on the local world state of the participant node 210 and collecting the relevant data into a resultant payload.

In certain cases, such as in response to a local home portion of a multi-home transactions that is a read/write transaction, the local home consensus function 218A may modify or update the local world state via the ledger state data 212A. For example, the local home consensus function 218A may identify changes or updates for the ledger state data 212A in the transaction and modify the ledger state data 212A in accordance with the identified changes or updates. For example, the local home consensus function 218A may update corresponding data items in the ledger state data 212A to reflect new values or states identified in, or resulting from the processing of, the local home portion of the multi-home transaction. After performing read or write operations, the local home consensus function 218A may return a result of the transaction.

In some cases, the local home consensus function 218A may ensure updates or modifications (e.g., writes) to the ledger state data 212A are performed atomically. As noted above, the ledger state data 212A may represent a materialized view of the current state of the local instance of the distributed ledger. As described herein, the different participant nodes 210 may have different states for the ledger given the asynchronous update of the ledger by the different participant nodes 210.

In some cases, such as where a multi-home transaction involves corresponding debits and credits (e.g., the increase to one party's account with a corresponding decrease to another party's account), or modifications to data owned by different participant nodes 210, the participant nodes 210A may delay updating the ledger state data 212A with the local portion of the multi-home transaction until it receives replicated transactions corresponding to some or all other portions of the (same) multi-home transaction. With reference to the illustrated example, the participant node 210A may wait to update acct1 until it receives a replicated transaction from participant node 210N that participant node 210N has stored the external portion of the multi-home transaction to its respective chain data 216N. In some such cases, once the participant node 210A receives some or all of the portions of the multi-home transaction, it can proceed to update the ledger state data 212A.

In some embodiments, the blockchain system 200 may utilize a barrier sync (e.g., a barrier synchronization used during to coordinate multi-home transactions such that all involved participant nodes 210 can be synchronized to a certain degree without excluding asynchronous operations before proceeding with further operations. The barrier sync can advantageously preserve serializability among multi-home transactions that may write and read data owned by different participant nodes 210 (e.g., make sure a multi-home transaction that writes data owned by multiple participant nodes 210 is completed before a multi-home transaction that reads data owned by the multiple participant nodes 210 is initiated). For example, a barrier sync can be put in place when one or more multi-home transactions are initiated. When a participant node 210 reaches the barrier sync, it may wait for all other involved participant nodes 210 to reach the barrier sync. When all involved participant nodes 210 have reached the barrier sync, the involved participant nodes 210 may exchange relevant data, verify consistency, and ensure that they have a consistent view after a current transaction (e.g., writes data owned by different participant nodes) is processed and before proceeding with a next transaction (e.g., reads data owned by different participant nodes 210). Accordingly, the barrier synch may enable a participant node 210A to apply all the related updates from a multi-home transaction (e.g., the different portions of the multi-home transaction) at once to its local world state (e.g., ledger state data 212A), and in an order that is consistent with single-home and multi-home partial ordering instructions. With reference to the multi-home transaction 402 example, the participant node 210A may use the barrier sync to concurrently perform the update 414 to acct1 from 70 to 75 and to acct2 from 83 to 78 in accordance with the internal home portion 408 and the external home portion 406/replicated message 412, respectively.

As part of modifying or updating the chain data 212A according to the local home portion of the multi-home transaction, the local home consensus function 218A may enforce an ordering of the transaction with regard to other multi-home transactions processed/executed by the participant node 210A (in accordance with the ordering provided by the multi-home consensus node 202). Accordingly, each participant node 210 may enforce partial orderings of the portion of a multi-home transaction of which they are a part (in accordance with the ordering assigned by the multi-home consensus node 202).

At (10A), the local home consensus function 218A may generate an acknowledgement message and send the acknowledgement message to a requesting device or participant node 210. The acknowledgement message may include information or details about the transaction, such as a transaction ID, the status of the proposed transaction (e.g., "completed successfully"), and metadata (e.g., multi-home transaction identifier, number of portions of the multi-home transaction, identity of the portion of the multi-home transaction relative to other portions of the same multi-home transaction, etc.). The acknowledgement message may notify a recipient that the participant node 210A has completed at least its portion of the multi-home transaction. In some cases, the acknowledgment receipt can include the results of the multi-home transaction (e.g., a receipt that assets were transferred, etc.). In certain cases, such as where the participant node 210A receives acknowledgement from the participant node 210N that the participant node 210N (and any other participant nodes 210) completed the external home portion of the multi-home transaction, the participant node 210A may communicate an acknowledgement to the requesting device that the multi-home transaction is complete (including the local home portion and the external home portion(s)). In some cases, the information communicated to the requesting device in the acknowledgement message may depend on the permissions of the requesting device and/or participant node 210A that processed/executed the multi-home transaction. For example, the acknowledgment message may include the results (or more information) of the local home portion of the multi-home transaction, such as the resulting ledger state for the data owned/managed by the participant node 210A or data to which the requesting device has permissions, but may not receive results of the external home portion (or limited information such as a confirmation that the transaction was completed).

With reference to the multi-home transaction 402 example, the acknowledgement message 416 includes the status of the account that that is owned/managed by the participant node 210A (account1: 75), but does not include information regarding the status of the account that is not owned/managed by participant node 210A (account2). In this way, the requesting device may receive confirmation of the results that relate to the information owned/managed by the participant node 210A but does not receive information regarding accounts or data that are not owned/managed by the participant node 210A. However, it will be understood that the acknowledgement message 416 may include, fewer, more, or different information. For example, the acknowledgement message 416 may include the status of account1 and/or account2, the multi-home transaction identifier, supporting data (e.g., digital signatures), timestamps, etc. At (8B), the local home consensus function 218A may generate and transmit an acknowledge message to the multi-home consensus node 202. The acknowledge message to the multi-home consensus node 202 may be the same or similar to the acknowledge message referenced in step (8A) or it may be different. In some cases, the participant node 210A may notify the multi-home consensus node 202 that at least the local home portion of the multi-home transaction has been completed by the participant node 210A. The acknowledgement message may include information or details about the completed transaction, such as the transaction ID, the status of the transaction (e.g., "completed successfully,"), and/or metadata (e.g., multi-home transaction identifier, number of portions of the multi-home transaction, identity of the portion of the multi-home transaction relative to other portions of the same multi-home transaction, etc.). In some case, the acknowledgment message may include sufficient information for the multi-home consensus node 202 to monitor the status of the multi-home transaction by the involved participant nodes 210 and determine when the multi-home transaction has been executed by all relevant participant nodes 210. For example, the acknowledgement message may include the transaction identifier, the number of portions of the multi-home transaction, identity of the completed portion (the portion being acknowledged) of the multi-home transaction relative to the other portions, and/or the identity of the participant node 210A that performed/executed the relevant portion of the multi-home transaction. In this way, the multi-home consensus node 202 can track which participant nodes have completed which portions of the multi-home transaction and/or which portions of the multi-home transaction are completed.

In certain cases, such as where the participant node 210A receives acknowledgement(s) from the participant node 210N (and any other participant nodes 210) that the participant node 210N (and any other participant nodes 210) completed the external home portion of the multi-home transaction, the participant node 210A may communicate the acknowledgement to the multi-home transaction and/or may indicate to the multi-home consensus node 202 that the multi-home transaction is complete (including the local home portion and the external home portion(s)).

With reference to the multi-home transaction 402 example, the acknowledgement message 418 includes the transaction identifier (54), the number of portions of the multi-home transaction 402 (2), and the identity of the portion that was performed/executed by the participant node 210A (1 or first portion). In this way, the multi-home consensus node 202 can track which portions of the multi-home transaction have been completed. However, it will be understood that the acknowledgement message 418 may include fewer, more, or different information. For example, the acknowledgement message 418 may include (or based on the source of the acknowledgement message 418, the multi-home consensus node 402 may determine) the identity of the participant node 210 that executed/performed the relevant portion of the multi-home transaction (nodeA).

At (11), the multi-home consensus node 202 can collect the acknowledgements from the participant node 210A and/or the participant node 210N. In this way, the multi-home consensus node 202 can monitor the progress of the multi-home transaction. In some cases, the multi-home consensus node 202 may verify that the proposed transaction has been processed successfully (e.g., no discrepancies or errors associated with processing the transaction by the participant node 210A and the participant node 210N). The multi-home consensus node 202 may further update its own records to record that the relevant portion(s) of the proposed transaction has been completed. In certain cases, upon determining that the multi-home transaction completed successfully, the multi-home consensus node 202 may terminate the transaction container generated by the multi-home consensus node 202 as part of processing the multi-home transaction. As such, the multi-home consensus node 202 can finalize the multi-home transaction for maintaining integrity, consistency, and reliability of the blockchain system 200. In some cases, responsive to a determination, by the multi-home consensus 202, that the multi-home transaction completed successfully, the multi-home consensus node 202 may unlock any relevant read/write locks on other multi-home transactions and/or indicate a successful completion of the multi-home transaction.

Although FIG. 4A illustrates a multi-home transaction that writes data to a distributed ledger, it should be noted that at least some of the steps described with reference to FIG. 4A can be leveraged to read (e.g., serializable read) data from the distributed ledger. For example, at (1), (2), and (3) of FIG. 4A can be performed before using the local home consensus function 218A to accomplish a serializable read from the chain data 216A. As may be appreciated, serializable read can prevent data anomalies (e.g., dirty reads) based on techniques such as locking, timestamp ordering, and/or concurrency control. More specifically, in addition to processing a proposed transaction that writes data owned by different nodes of the blockchain system 200, the participant node 210A may process a proposed transaction that reads data owned by different participant nodes 210 of the blockchain system 200. For example, after processing the proposed transaction that reads data owned by the participant node 210A and the other participant node 210N based on (1), (2) and (3) of FIG. 4A, the participant node 210A may read relevant data from its local instance of a distributed ledger. Concurrent and/or sequential to reading relevant data (e.g., first data) from its local instance of the distributed ledger, the participant node 210A may send a "foreign read" portion of the proposed transaction to the other participant node 210N. In response to receiving the "foreign read" portion of the proposed transaction, the other participant node 210N may read second data from a second local instance of the distributed ledger on the other participant node 210N. The other participant node 210N may further return the result of the read of the second data to the participant node 210A. In some embodiments, the participant node 210A may at least aggregate the first data and the second data to generate a read result associated with the proposed transaction that can be returned to a user (e.g., client computing devices 102) or a participant node of the blockchain system 200.

Fewer, more, or different steps may be used herein with reference to the processing of a multi-home transaction. Moreover, the steps may be rearranged in a different order or performed concurrently. For example, the participant node 210A may concurrently process multi-home transactions (e.g., (1)-(9)) and replicated transactions (e.g., (10)). As another non-limiting example, the participant node 210A may concurrently (7) write transaction to the ledger and (11) update the ledger state based on the transactions. For example, in certain cases, the participant node 210A may proceed update/modify the ledger state before receiving corresponding replicate transactions from the other nodes that are part of the multi-home transaction. Similarly, the participant node 210A may concurrently (4B) begin processing the local home portion of the multi-home transaction and (4A) communicate the external home portion of the multi-home transaction to another participant node 210, and concurrently (9A) and (9B) send acknowledgements to different entities.

Example Transactions

FIG. 4B shows example single-home transactions (similar to the single-home transaction of FIG. 3) and multi-home transactions (similar to the multi-home transaction of FIG. 4A) that will be used to illustrate how nodes (e.g., the participant node 210A and other participant nodes 210) in the blockchain system 200 can process transactions asynchronously. The example single-home and multi-home transactions can include the participant node 210A (e.g., node A), one of other participant nodes 210 (e.g., node B), and another of the other participant nodes 210 (e.g., node C).

FIG. 4B shows nine transactions that include six single-home transaction (e.g., transaction #1, transaction #2, transaction #3, transaction #7, transaction #8, and transaction #9) and three multi-home transaction (e.g., transaction #4, transaction #5, and transaction #6). The owner node of transaction #1 and transaction #9 is node A, which owns data item 123 that is to be updated for a fourth time (e.g., 123.4) and a fifth time (e.g., 123.5). The owner node of transaction #2 and transaction #7 is node B, which owns data item 456 that is to be updated for a seventh time (e.g., 456.7) and an eighth time (e.g., 456.8). The owner node of transaction #3 and transaction #8 is node C, which owns data item 987 that is to be updated for a fourth time (e.g., 987.4) and a fifth time (e.g., 987.5). The owner nodes of transaction #4 include node A and node B, where node A owns data item 454 that is to be updated and node B owns data item 787 that is to be updated according to transaction #4. The owner nodes of transaction #5 include node B and node C, where node B owns data item 999 that is to be updated and node C owns data item 888 that is to be updated according to transaction #5. The owner nodes of transaction #6 include node A and node C, where node A owns data item 444 that is to be updated and node C owns data item 555 that is to be updated according to transaction #6.

From the perspective of node A, transactions #1 and #9 can be a single-home local transaction and can be processed by node A as described herein, for example at least with reference to FIG. 3 (e.g., (1)-(9)). In contrast, transactions #2, #3, #7, and #8 can be replicated transactions and can be processed by node A as described herein, for example at least with reference to FIG. 3 (e.g., (10)-(14) receiving and processing replicated transactions).

In some embodiments, node A processes the data update 123.4 (transaction #1) before processing the data update 123.5 (transaction #9) according to the order assigned to these transactions by node A. For example, before the data update 123.4 is processed, the data item 123 may have value XYZ. The data update 123.4 (transaction #1) may delete the last character from the data item 123 (i.e., 'Z'), and the date update 123.5 may append 6 to the end of data item 123. By processing the data update 123.4 before the data update 123.5, the data item 123 will have a value XY6 after node A processes transaction #9. As such, partial ordering associated with processing the data item 123 can be maintained such that the result (e.g., the value XY6) of transaction #1 is correct and/or consistent across nodes. Node A may also asynchronously send transaction #1 to node B and node C as a replicated transaction as described herein, for example at least with reference to FIG. 3 (e.g., (9)). Accordingly, the node A, node B, and node C may process the transaction #1 and transaction #9 asynchronously while maintaining the partial order provided by node A to ensure consistent results.

To process replicated transactions (e.g., #2 and #7, #3 and #8) received from node B and node C, respectively, node A can process the data update 456.7 before processing the data update 456.8 (according to the partial ordering assigned by node B), and process the data update 987.4 before processing the data update 987.5 (according to the partial ordering assigned by node B). As such, partial ordering associated with processing the data item 456 and 987 can be maintained such that the results of transactions #2 and #7 and transactions #3 and #8 are correct and/or consistent across nodes.

Similarly, node B can process transactions #2 and #7 (e.g., a single-home local transaction to node B) by implementing the data update 456.7 (transaction #2) before implementing the data update 456.8 (transaction #7) according to the partial ordering assigned by node B. Moreover, node B can process replicated transactions #1 and #9 by implementing the data update 123.4 before implementing the data update 123.5 according to the order assigned by node A, and process transactions #3 and #8 by implementing the data update 987.4 before implementing the data update 987.5 according to the order assigned by node C. The node B may also send transactions #2 and #7 to node A and node C as replicated transactions as described herein, for example, at least with reference to FIG. 3 (e.g., (9) replicate transaction) such that node B, node A, and node C may process the transactions #2 and #7 asynchronously while maintaining the partial order provided by node B to ensure consistent results.

Similarly, node C can process transactions #3 and #8 (e.g., a single-home local transaction to node C) by implementing the data update 987.4 before implementing the data update 987.5 according to the partial ordering assigned by node C. Moreover, node C can process transactions #1 and #9 (e.g., replicated transactions from node A) by implementing the data update 123.4 before implementing the data update 123.5 according to the partial ordering assigned by node A, and process transactions #2 and #7 according to the partial ordering assigned by node B. The node C may also send transactions #3 and #8 to node A and node B as replicated transactions as described herein, for example, at least with reference to FIG. 3 (e.g., (9) replicate transaction) such that node C, node A, and node B may process the transactions #3 and #8 asynchronously while maintaining the partial order provided by node C to ensure consistent results.

In some embodiments, node A, node B, and node C maintain partial orderings respectively associated with processing the data item 123, the data item 456, and the data item 987 without maintaining total orderings associated with processing the data item 123, the data item 456, and the data item 987. For example, node A can process transactions #1, #2, #3, #7, #8, and #9 in the order of data update 123.4 (transaction #1), data update 456.7 (transaction #2), data update 123.5 (transaction #9), data update 987.4 (transaction #3), data update 987.5 (transaction #8), and data update 456.8 (transaction #7). Node B can process transactions #1, #2, #3, #7, #8, and #9 in the order of data update 456.7 (transaction #2), data update 123.4 (transaction #1), data update 987.4 (transaction #3), data update 987.5 (transaction #8), data update 123.5 (transaction #9), and data update 456.8 (transaction #7). Node C can process transactions #1, #2, #3, #7, #8, and #9 in the order of data update data update 987.4 (transaction #3), data update 987.5 (transaction #8), 123.4 (transaction #1), data update 456.7 (transaction #2), data update 123.5 (transaction #9), and data update 456.8 (transaction #7). As such, node A, node B, and node C can process transactions that affect the same data items (or are owned by the same node) in a specific sequence (e.g., processing data update 123.4 (transaction #1) before processing data update 123.5 (transaction #9)), but can process transactions that affect different data items in various orders (e.g., processing data updates associated with data item 123 before and/or after data updates associated with data item 987 and/or data item 456).

In some embodiments, node A can process transaction #4 (e.g., a multi-home transaction that modifies data owned both by node A and node B) as described herein, for example, at least with reference to FIG. 4A. For example, node A can process the data update A (454) of the transaction #4 as described herein at least with reference to FIG. 4A), and process the data update B (787) of the transaction #4 (e.g., updating or modifying data item 787 owned by node B) as a replicated transaction received from node B as described herein, for example, at least with reference to FIG. 4A (e.g., (4A) communicating external home portion of multi-home transaction and (10) receiving replicated transactions) and FIG. 3 (e.g., (10)-(14) receiving and processing replicated transactions). For example, node A can update the chain data 216A and the ledger state data 212A according to the data update A (454) (local home portion of the multi-home transaction), and send the data update B (787) to node B (external home portion of the multi-home transaction). Node A can replicate the data update A (454) to node B and node C as a replicated transaction as described herein, for example, at least with reference to FIG. 4A (e.g., (10)) such that node B and node C can process the data update A (454) of transaction #4. Similarly, node A can receive the data update B (787) from the node B (which processed the data update B (787) similar to the way in which node A processed the data update A (454)) as a replicated transaction as described herein, for example, at least with reference to FIG. 4A (e.g., (10) receiving replicated transactions) and FIG. 3 (e.g., (10)-(14) receiving and processing replicated transactions).

Node A can similarly process transaction #6 by processing the data update A (444) as a local home portion of a multi-home transaction, as described herein, and processing the data update C (555) as an external home portion of a multi-home transaction, as described herein. Node A can further send the data update A (444) of transaction #6 as a replicated transaction to node B and node C, as described herein, and receive (and process) data update C (555) from node C as a replicated transaction, as described herein.

Node B and node C can process transaction #5 similar to how node A and node B process transaction #4. For example, as described herein, node B can process the data update B (999) as a local home portion of a multi-home transactions and process data update C (888) as an external home portion of a multi-home transaction. Node C may process the data update C (888) as a local home portion of a multi-home transaction and/or as a single-home transaction as described herein. Conversely, if node C receives transaction #5 (rather than node B), node C may process the data update C (888) as a local home portion of a multi-home transactions and process data update B (999) as an external home portion of a multi-home transaction. In some such cases, node B may process the data update B (999) as a local home portion of a multi-home transaction and/or as a single-home transaction as described herein.

In some embodiments, node A, node B, and node C can process transaction #4, transaction #5, and transaction #6 synchronously, semi-synchronously, or asynchronously based on an order provided by the multi-home consensus node 202. For example, as described herein, as part of setting up a multi-home transaction, the participant node 210A (or other participant node 210 as the case may be) may communicate with the multi-home consensus node 202. The multi-home consensus node 202 may provide a multi-home transaction ID for the multi-home transaction. The participant node 210A may wait to begin a particular multi-home transaction until all preceding multi-home transactions are completed, until all preceding multi-home transactions that include at least a portion that is owned by the participant node 210A (e.g., multi-home transactions that will read/write data from the participant node 210A) are completed, until the multi-home consensus node 202 unlocks the participant node 210A for processing multi-home transactions, or according to some other ordering prescribed by the multi-home consensus node 202.

For example, node A can process its portion of transaction #4 (data update A (454)) before or after node B processes its portion of transaction #4 (data update B (787)) and/or before node C process the replicated transactions from transaction #4. Similarly, node A may process transactions #4 and #6 asynchronously with respect to transaction #5 given that node A is not affected by (e.g., does not own any of the data referenced or used by) the transaction #5.

In some cases, node A may process the multi-home transactions in the order provided by the multi-home consensus node 202. For example, the multi-home consensus node 202 may indicate that the multi-home transactions are to be processed in the following order: transaction #4, transaction #5, transaction #6. Moreover, as transaction #4 involves node A and node B, the multi-home consensus node 202 may indicate that these two nodes may not participate any other multi-home transactions until they complete transaction #4. In some such cases, node B would not be allowed to process its portions of transaction #5 until it completes its portions of transaction #4. In some such cases, upon completing its portion of a multi-home transaction, the multi-home consensus node 202 may indicate to the node B that it may begin processing the next multi-home transaction that affects it (e.g., inform node B that it can begin processing transaction #5 after it has completed processing transaction #4).

In certain cases, the multi-home consensus node 202 may indicate that transactions that involve node A or node B cannot be processed by any node until node A and node B complete transaction #4. In some such cases, node C would be disallowed from processing transaction #4 despite transaction #4 not involving node C given that transaction #4 and transaction #5 involves node B. In some such cases, once node B completes processing transaction #4, the multi-home consensus node 202 may indicate to node C (and node B) that they can begin processing transaction #4. In certain cases, the indication to pause or proceed may be included in the setting up of the multi-home transaction and/or via additional communications from the multi-home consensus node 202 to the respective participant nodes 210. In some cases, the participant node 210A may process the multi-home transactions asynchronously without regard to processing done by the other nodes.

End-Block Command

Figure 5A:
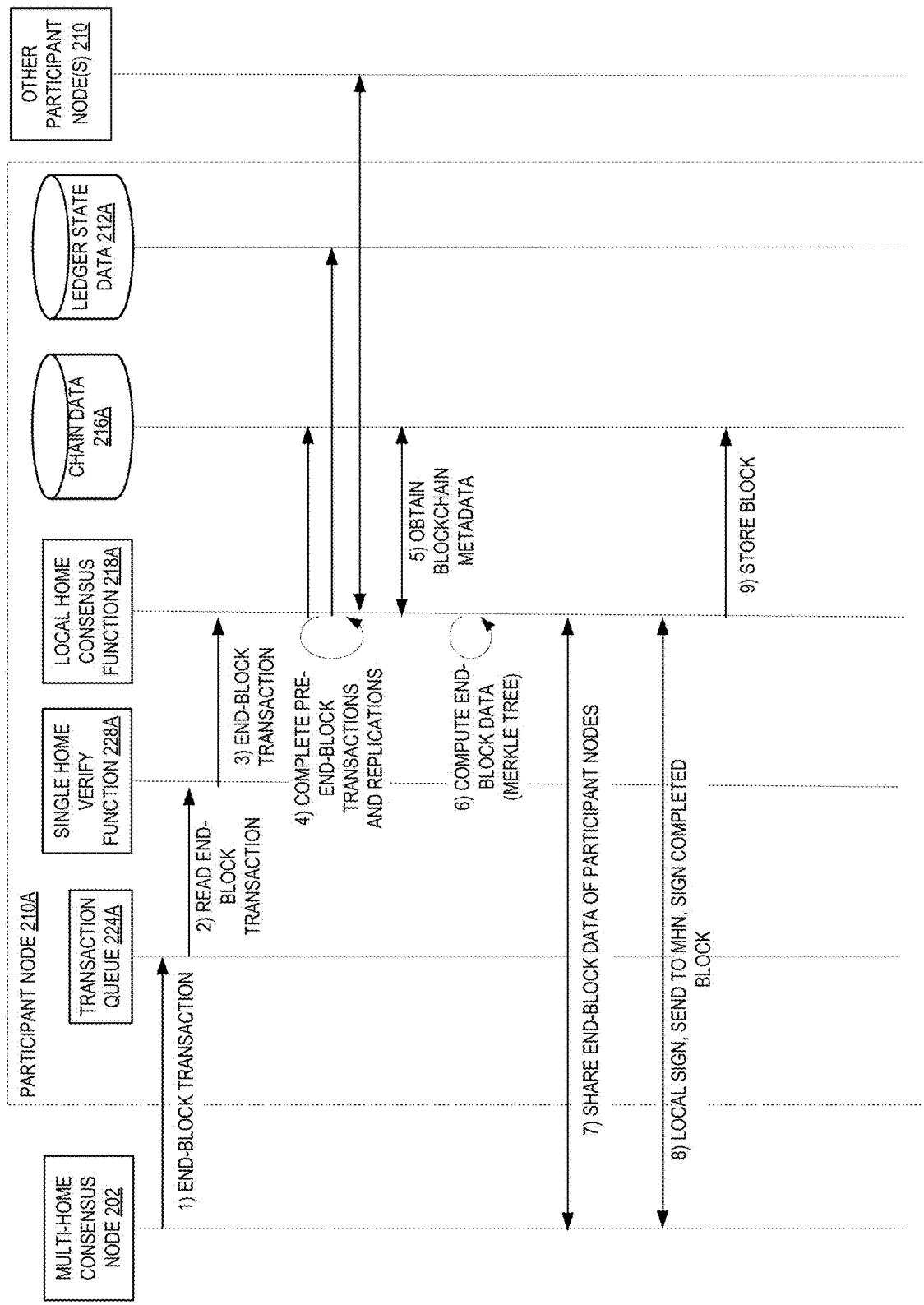
FIG. 5A depicts example interactions for a participant node to process an end-block command to add a block to the blockchain system, in accordance with embodiments of the present disclosure.

With reference to FIG. 5A, illustrative interactions will be described for a participant node 210A of a blockchain to process an end-block command to add a block to a blockchain. Although FIG. 5A describes various interactions and processes of participant node 210A, it will be understood that the end-block command may be communicated to all participant nodes 210 such that each participant node 210 engages in a data flow similar to what is shown in FIG. 5A. The interactions of FIG. 5A may occur responsive to various triggering events, such as the blockchain system 200 processing a certain number of transactions, a passing of a specific time interval since the last block was created, or other predefined conditions.

At (1), the participant node 210A receives an end-block command from the multi-home consensus node 202. For example, the transaction queue 224A may receive the end-block command, signaling to the participant node 210A that the participant node 210A should complete outstanding transactions and prepare to create a new block for the blockchain. As noted above, the multi-home consensus node 202 may generate the end-block command responsive to various triggering events, such as the pass of a specific time interval. Additionally and/or optionally, the multi-home consensus node 202 may generate the end-block command spontaneously to prompt the participant node 210A to initiate an end-block or block creation process at flexible timing. The end-block command may also cause the participant node 210A to transition from processing transactions to block finalization, and include transactions processed by one or more nodes but not yet incorporated into a block in a new block that is to be created. As described herein, as part of the end-block command, the participant nodes 210 may converge their respective local states of the distributed ledger. As such, at the end of processing the end-block command, the local states of the distributed ledgers of the different participant nodes 210 may be consistent.

At (2), the single-home verify function 228A can read the end-block command from the transaction queue 224A. For example, the single-home verify function 228A may retrieve the end-block command from the transaction queue 224A for the participant node 210A to begin the process of finalizing the current transactions and creating a new block. In some cases, the single-home verify function 228A can verify the end-block command similar to other transactions received by the participant node 210A, as described herein at least with reference to (2) of FIG. 3 and (2) of FIG. 4A. For example, as part of reading the end-block command, the single-home verify function 228A may determine that the end-block command is to be treated as a single-home transaction (or local home portion of a multi-home transaction) for purposes of processing and execution. Accordingly, the single-home verify function 228A may not break up the end-block command and communicate it to other participant nodes 210.

The end-block command may contain information and instructions that can be used by the participant node 210A to complete current transactions (e.g., transactions that started before the end-block command is received). In some embodiments, the single-home verify function 228A may read the end-block command to prepare the participant node for subsequent steps (e.g., completing transactions in the transactions queue or transactions that are otherwise incomplete, also referred to herein as pre-end-block commands, and replicated transactions), computing end-block data (e.g., Merkle tree), and/or obtaining blockchain metadata for creating a new block. In certain cases, the end-block command may include instructions for how to create the end-block data (e.g., the manner and order by which hashes are to be generated to generate the Merkle tree, etc.).

At (3), the single-home verify function 228A may communicate the end-block command to the local home consensus function 218A for further processing.

At (4), the local home consensus function 218A may complete transactions and replications (e.g., replicated transactions) received before the participant node 210A received the end-block command from the multi-home consensus node 202 (or transactions/replications identified for processing/execution before processing the end-block command) and that are not yet completed. The "pre-end-block transactions" may include transactions that modify data owned by the participant node 210A, while the "pre-end-block replications" may modify data not owned by the participant node 210A and may be received from other participant node(s) 210A. By completing pre-end-block transactions and pre-end-block replications, the local home consensus function 218A may ensure that transactions and replicated transactions received or identified for processing before receiving or processing the end-block command are completed and can be included in a new block that is to be created.

As described herein, at least with reference to (4)-(14) of FIG. 3, the local home consensus function 218A may update the chain data 216A and ledger state data 212A as it processes and executes the pre-end-block transactions and pre-end-block replications. As described herein, in some cases, by processing and executing the pre-end-block transactions and pre-end-block replications, the participant nodes 210 may converge the state of their respective ledgers to a consistent state such that the ledger state data 212 of the different participant nodes 210 match or are consistent.

At (5), the local home consensus function 218A may obtain blockchain metadata from the chain data 216A. In some cases, the local home consensus function 218A waits until all pre-end-block transactions and pre-end-block replications are completed before obtaining the blockchain metadata. The blockchain metadata may be associated with the transactions that are to be part of the "new" block of the blockchain (also referred to as the block's transactions). The transactions for the "new" block may include some or all of the transactions that the blockchain system 200 has processed since the last block was created and may include some or all single-home transactions owned by any of the participant nodes 210 and/or multi-home transactions processed by any of the participant nodes 210.

The blockchain metadata may provide additional context and information about the block's transactions, such as transaction IDs (including an order or partial order), identity of the nodes that own the transactions, timestamps, and/or other information relevant to the creation of the block. In some embodiments, the blockchain metadata may include information about each of the block's transactions. The blockchain metadata may enable the local home consensus function 218A to accurately record and/or validate the block's transactions before being included or integrated into a block of the blockchain. Additionally and/or optionally, the local home consensus function 218A may verify the integrity and authenticity of the block's transactions based on the blockchain metadata that can include cryptographic signatures and/or hashes. As such, the local home consensus function 218A may confirm that the block's transactions have not been tampered with and/or are valid. As described herein, as different participant nodes 210 may have different permissions and/or privileges, the list of the block's transactions at each participant node 210 may differ. For example, if the participant node 210N does not have permissions to view the transactions owned by participant node 210A, the list of block's transactions made by the participant node 210N may differ from the list of block's transactions made by the participant node 210A. Despite the differences, the blockchain system 200 may verify the transactions as part of creating the block as will be described herein.

At (6), the local home consensus function 218A may compute end-block data. In some embodiments, the end-block data computed by the local home consensus function 218A can include a Merkle tree.

As may be appreciated, a Merke tree is a data structure that may provide a compact and secure way to verify the integrity and authenticity of the transactions included in the block of the blockchain. The Merkle tree may allow for efficient verification of individual transactions without needing to examine each transaction, the entire block or the entire blockchain. In some embodiments, the local home consensus function 218A may calculate the Merkle tree by hashing individual transactions or a group of transactions (e.g., hashing multiple single-home transactions, hashing multiple local home portions of a multi-home transaction) and then hashing the resulting hashes together in a hierarchical manner according to a specific order until a single root hash (e.g., a Merkle root) is obtained.

Each leaf node of the Merkle tree may represent a hash of an individual transaction or group of transactions, and each non-leaf node may represent the hash of its child nodes. As described herein, in some cases, a leaf node in a Merkle tree of one participant node may correspond to a non-leaf node in the Merkle tree of another participant node, such as but not limited to, when one participant node seeks to obfuscate transaction information from another participant node by sending the value (e.g., a hash value) of one of its non-leaf nodes to the other node instead of sending transaction information, and the other participant node includes the received value in a leaf node of its Merkle tree.

A Merkle root (e.g., a global hash) can be a single hash value obtained at the top of the Merkle tree and may represent a cryptographic summary of all transactions included in a block. In some cases, once calculated, the Merkle tree (or Merkle root) can be stored in the chain data 216A or chain data 212A of the participant node 210A for future verification and/or auditing purposes. It should be noted that each of other nodes (e.g., other participant node(s) 210 and/or the multi-home consensus node 202) may also calculate a Merkle tree in the same or similar way as the participant node 210A (e.g., by hashing individual or groups of transactions and then hashing the resulting hashes together in the hierarchical manner according to a specified order). As such, assuming the block's transactions are processed appropriately by each node (e.g., according to the partial orderings), the Merkle trees calculated by different participant nodes should be the same. By sharing Merkle trees with each other, for example, the participant node 210A may then compare the Merkle tree calculated by itself with a Merkle tree calculated by other participant node(s) 210 to verify that the participant node 210A and the other participant node(s) 210 include the same transactions and replicated transactions for the same block of the blockchain.

Merkle Tree Example

Figure 5B:
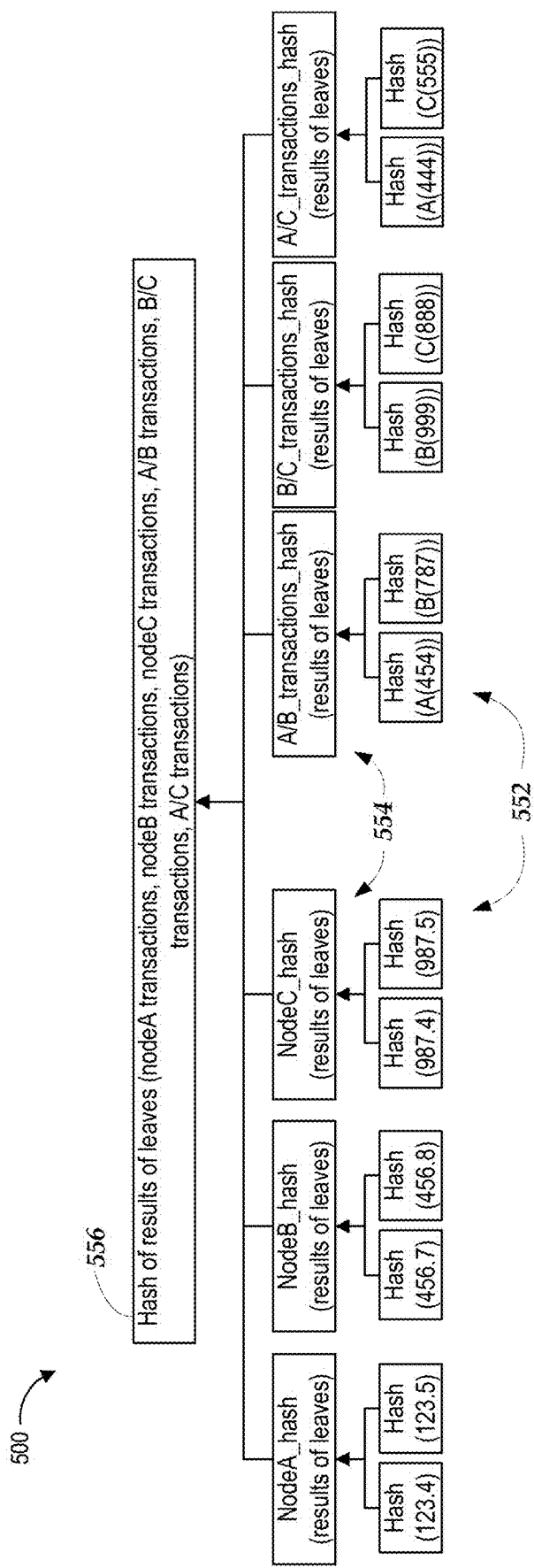
FIG. 5B depicts an example Merkle tree.

FIG. 5B is a block diagram illustrating an example Merkle tree generated based on the transactions described in FIG. 4B. With reference to the example transactions described above with reference to FIG. 4B, the participant nodes 210 can determine that transactions #1, #2, #3, #4, #5, #6, #7, #8, and #9 are to be included in the new block and compute respective Merkle trees based on transactions #1, #2, #3, #4, #5, #6, #7, #8, and #9.

As noted above, node A, node B, and node C can follow various total orderings when processing transactions (but may use the same partial orderings for transactions owned by the respective participant nodes 210 and the same partial order for multi-home transactions overall or at least the same order for multi-home transactions affecting the same respective participant node 210). In some embodiments, node A, node B, and node C may follow the same or similar order or manner to calculate Merkle trees using hash functions/algorithms such that Merkle trees calculated by node A, node B, and node C may be identical, thereby allowing node A, node B, and node C to verify that transaction #1, transaction #2, transaction #3, transaction #4, transaction #5, transaction #6, transaction #7, transaction #8, and transaction #9 have been processed consistently among node A, node B, and node C.

In the illustrated example of FIG. 5B, the first leaves of the Merkle tree 500 are generated using hashes of individual transactions 552 corresponding to different nodes. For example, node A may calculate hashes based on (e.g., using) the data update 123.4 and the data update 123.5, respectively. In some cases, the hash function may use the transaction or content of the transaction itself (e.g., the content of transaction #1 and transaction #9, respectively), or the hash function may use the result of the transaction (e.g., XY for data update 123.4 and XY6 for data update 123.5). In like manner the node A can calculate hashes based on data update 456.7, 456.8, 987.4, and 987.5.

In the illustrated example, node A calculates hashes for groups of transactions 554 using the hashes generated from the individual transactions 552. For example, node A uses the hash values generated from Hash (123.4) and Hash (123.5) to determine the hash value for NodeA_hash. In some cases, the node A may use the hashes from all of the data updates corresponding to node A to generate the hash value for NodeA_hash. In like manner, the node A can generate the hash value for NodeB_hash using the hash values from Hash (456.7) and Hash (456.8), and generate the hash value for NodeC_hash using the hash values from Hash (987.4) and Hash (987.5).

When generating a hash for a group of transactions 554 or a group of hashes, node A may use the partial ordering prescribed by the node for which the hash will be generated. For example, to generate the NodeA_hash, the node A (or some other node) may order the transactions of node A according to the order designated or assigned by node A. Similarly, to generate the NodeB_hash or NodeC_hash, the node A (or some other node) may order the transactions of node B or node C, respectively, according to the order designated or assigned by node B or node C, respectively. By using the partial ordering assigned by the node to which the transactions belong, the nodes can generate consistent Merkle trees regardless of the total ordering of transactions or the order by which a particular node asynchronously received replicated transactions from other nodes.

With regard to multi-home transactions, node A may calculate hashes for individual portions of multi-home transactions separate from single-home transactions. For example, in the illustrated example, node A calculates individual hashes for data updates A (454), B (787), B (999), C (888), A (444), and C (555) and uses the hash values as the leaves of the Merkle tree. In certain cases, node A may calculate individual hash values for each multi-home transaction. For example, node A may use data update A (454) and data update B (787) to calculate one hash for transaction #4 and so on.

In the illustrated example, node A calculates some of the hashes for a group of transactions 554 using the hash values generated from the initial leaves of the multi-home transactions for each unique set of nodes. For example, the node A uses the hash values of Hash (A (454)) and Hash (B (787)) to calculate a hash for node A and node B transactions (A/B_transactions_hash). In some cases, the node A may use the hashes from all of the multi-home transactions corresponding to node A and node B to generate the hash value for A/B_transactions_hash. Similarly, the node A may use the hash values of Hash (B (999)) and Hash (C (888)) to calculate a hash for node B and node C transactions (B/C_transactions_hash), and use the hash values of Hash (A (444)) and Hash (C (555)) to calculate a hash for node A and node C transactions (A/C_transactions_hash).

When generating a hash for a group of multi-home transactions or a group of hashes of multi-home transactions, node A (or some other node) may use the partial ordering prescribed by the multi-home consensus node 202. For example, to generate the A/B_transactions_hash, B/C_transactions_hash, or A/C_transactions_hash, the node A (or some other node) may order the A/B multi-home transactions (transactions involving node A and node B), B/C multi-home transactions, and A/C multi-home transactions, respectively, according to the order designated or assigned by the multi-home consensus node 202. Similarly, to generate a hash of all multi-home transactions together, the node A (or some other node) may order the multi-home transactions according to the order designated or assigned by the multi-home consensus node 202. By using the partial ordering assigned by the multi-home consensus node 202, the nodes can generate consistent Merkle trees regardless of the total ordering of transactions or the order by which a particular node asynchronously received replicated transactions from other nodes.

Although shown as being calculated separately, it will be understood that, in some cases, portions of multi-home transactions can be used to generate the hash values for the individual nodes. For examples, portions of multi-home transactions that affect (or are at home at) node A may be included with the node A transactions (e.g., data update A (454) and data update A (444) may be included with data update 123.4 and data update 123.5 for purposes of generating NodeA_hash), portions of multi-home transactions that affect (or are at home at) node B may be included with the node B transactions (e.g., data update B (787) and data update B (999) may be included with data update 456.7 and data update 456.8 for purposes of generating NodeB_hash), and portions of multi-home transactions that affect (or at home at) node C may be included with the node C transactions (e.g., data update C (888) and data update C (555) may be included with data update 987.4 and data update 987.5 for purposes of generating NodeC_hash).

The non-leaves of the Merkle tree 500 (or hashes for groups of transactions 554) may be used to calculate additional non-leaves, as desired. In the illustrated example the non-leaves are used to calculate the root hash 556. For example, the hash values of NodeA_hash, NodeB_hash, NodeC_hash, A/B_transactions_hash, B/C_transactions_hash, and A/C_transactions_hash are used by a hash function to calculate the root hash. When generating additional non-leaves or the root hash 556, the node A (or some other node) may use a predefined order (e.g., the order determined by the multi-home consensus node 202 and sent in the end-block command). For example, to generate an additional non-leaf for all transactions associated with node A, node A may use the hash generated from its single-home transactions (NodeA_hash) followed by the hash of multi-home transactions that include it (e.g., A/B_transactions_hash followed by A/C_transactions_hash). By using a predetermined order, the nodes may generate consistent non-leaves. Similarly, node A (or another node) may generate the root hash using the single-home function hashes first followed by the multi-home hashes in the following order: NodeA_hash, NodeB_hash, NodeC_hash, A/B_transactions_hash, B/C_transactions_hash, and A/C_transactions_hash. By using a predetermined order, the nodes may generate consistent root hashes 556.

As described herein, by hashing results of transactions and then hashing the resulting hashes in the same or similar manner and order, the Merkle trees calculated by node A, node B, and node C may be identical. By sharing Merkle trees calculated with each other, node A, node B, and node C can confirm that Merkle trees calculated are identical to verify that transactions are processed consistently across nodes, thereby preserving the reliability and resiliency of the distributed ledger represented by the blockchain.

Moreover, by calculating the various leaves, non-leaves, and root hash 556 in the same way, the different nodes (node A, node B, and node C) can verify whether each node processed the same transactions using the same partial ordering (irrespective of the total ordering). For example, if the root hash 556 generated by node A does not match the root hash 556 generated by node B, the nodes can determine that different transactions were processed by the different nodes or the same transactions were processed using a different partial ordering. Moreover, the nodes can use the non-leaves and/or leaves to identify what caused the difference in the root hashes 556.

In some cases, rather than calculating a hash for each transaction, node A may calculate one hash for some or all of the single-home transactions of a particular node that are to be included in the block. For example, node A may order some or all of the transactions corresponding to a node, such as node B (e.g., according to the partial ordering dictated by node B) to calculate a hash for that node. With reference to FIG. 5B, for node B transactions, node A may calculate a hash based on the combination of the data update 456.7 and 456.8 (in that order). Such a hash may be generated using the transaction or content of the transaction itself and/or the results of the transactions, as described herein. In such a scenario, the NodeA_hash, NodeB_hash, Node_C hash may represent the first leaves of the Merkle tree. By calculating a hash for multiple or all transactions of a node (e.g., node B) that are to be included in a block, node A can reduce the total number of hashes calculated for transactions corresponding to node B.

Similarly, in some cases, the node A may calculate a hash value for multi-home transactions corresponding to the same set of nodes using some or all of the multi-home transactions for those nodes without calculating interim hash values. For example, the node A may use the some or all of the multi-home transactions that affect node A and B (including data update A (454) and data update B (787)) to calculate a hash value for A/B_transactions_hash. In like manner, the node A may calculate the B/C_transactions_hash and/or the A/C_transactions_hash. In such a scenario, the A/B_transactions_hash, B/C_transactions_hash, and A/C_transactions_hash may represent the first leaves of the Merkle tree 500. In calculating the A/B_transactions_hash, B/C_transactions_hash, and A/C_transactions_hash, the node A may use the ordering prescribed by the multi-home consensus node 202. In this way, the hashes may be consistently generated by any of the nodes that has the relevant data. In such a scenario, the A/B_transactions_hash, B/C_transactions_hash, and A/C_transactions_hash may represent the first leaves of the Merkle tree. By calculating one hash value for multiple or all multi-home transactions for a unique combination nodes (e.g., node A and node B multi-home transactions) that are to be included in a block, node A can reduce the total number of hashes calculated for multi-home transactions that affect nodes A and B.

Unshared Transactions

As described herein, a node may send replicated transactions to another node such that the other node updates its local chain data 216 and local ledger state data 212 using the replicated transactions. For example, node B may send transaction #2 (e.g., data update 456.7) and transaction #7 (e.g., data update 456.8) to node A and/or node C as replicated transactions so that node A and/or node C update their respective local chain data and local ledger state data with the information from the replicated transactions. The replicated transactions may include information about values of the data item 456 before and/or after the data item 456 is modified according to the replicated transactions.

In certain cases, a node may not have all of the information about other nodes and their respective transactions. For example, node C and node A may not have the appropriate privileges or permissions to know about the changes to data item 456 of node B. In some such cases, rather than providing information about values of the data item 456 in the replicated transaction, node B may hash the data update 456.7 and/or the data update 456.8 (or the results) to generate respective hash values and send the respective hash values to node A and/or node C (e.g., as part of or as the replicated transaction) such that node A and/or node C may still calculate Merkle trees using the hash values. Advantageously, providing a hash value to other nodes, instead of the transaction details, may allow a node to withhold or obfuscate information about certain data items.

In certain cases, node B may send nodes A and C redacted information about the transaction rather than all of the transaction and/or a hash value. For example, node B may send nodes A and C the transaction ID for the transaction and a hash of the (original) transaction but not the content of the transaction. The transaction ID (or other transaction parameter or redacted portion of the transaction) may be used by the nodes A and C to log or monitor the transaction and the hash may be used to generate consistent Merkle trees.

In some cases, the node B may send multiple hashes (and/or redacted transaction information). The first hash may correspond to redacted content of the transaction that is communicated to nodes A and C and the second hash may correspond to the transaction as a whole (e.g., complete transaction). In some such cases, the second hash may be used by the second computing node to generate consistent Merkle trees (e.g., as part of an end-block command or routine) and the first hash may be used by the nodes A and C to generate local Merkle trees to facilitate the immutability of the local blocks.

In some cases, a node may not have privileges or permissions to know whether another node has made any changes to a particular data item or multiple data items. For example, node A and node C may not have permissions or privileges to know about any modifications data item 456 (or other data items) of node B. In some such cases, node B may not communicate replicated transactions to the nodes that do not have the relevant privileges and/or permissions for the data item (e.g., node A and node C). To enable node A and node C to calculate respective Merkle trees, node B may, as part of an end-block command, communicate its hash of all of its changes (e.g., NodeB_hash) to node A and node C (e.g., directly or via the multi-home consensus node 202). Node A and node C may then use the hash generated by node B (NodeB_hash) to calculate respective Merkle trees without having any information regarding the transactions processed, or affecting data owned, by node B (e.g., the quantity of transactions, data items that were modified, changes made to data items, etc.).

In some such cases, the Merkle tree generated by node B may differ from the Merkle trees generated by nodes A and C. Specifically, the Merkle trees of node A and node C may include a leaf that corresponds to a value received from node B (the "node B transactions leaf") but may not include leaves for individual (or groups of) node B transactions. The value of the node B transactions leaf may correspond to one or multiple transactions of node B. In some cases, the value in the node B transaction leaf may correspond to a value in a non-leaf of the node B Merkle tree, a hash value (e.g., generated using one or more node B transactions), or a random number (e.g., in the case node B had zero transactions or otherwise obfuscates the information shared with nodes A and C).

In certain cases, the node B transactions leaf in the Merkle trees of node A and node C may correspond to a non-leaf in the Merkle tree of node B. For example, certain leaves of the node B Merkle tree may correspond to individual transactions of node B, which may be combined or used together to generate a non-leaf in node B. The generated non-leaf, its value, or some other representation of the non-leaf may be shared with nodes A and B and used as the node B transactions leaf of the Merkle tree of nodes A and C. Accordingly, the Merkle tree of node B may include additional levels for node B transactions relative to the Merkle trees of nodes A and C. Notwithstanding the differences between Merkle trees or additional levels for node B transactions in the node B Merkle tree, the node B transactions leaf of the Merkle tree of nodes A and C and the corresponding non-leaf in the node B Merkle tree may include the same value such that the respective root hashes of the node A Merkle tree, node B Merkle tree, and node C Merkle tree are the same. It will be understood that node A and node C may similarly obfuscate their transactions from the other nodes. Similarly, some nodes may not have permissions or privileges to know the details of a multi-home transaction between two other nodes. For example, node C may not have the permissions or privileges to know the details (e.g., what data items were modified or how) of multi-home transaction #4 between node A and node B (e.g., data update A (454) and data update B(787)). In some such cases, the nodes of the multi-home transaction (e.g., node A and node B) may, as the or as part of the replicated transaction, send hashes of their respective portions of the multi-home transaction (or a hash of the whole multi-home transaction) to the other nodes (e.g., node C). By sending hashes of the respective portions or the whole multi-home transaction, the nodes that were a party to the multi-home transaction may obfuscate what data was modified by the multi-home transaction but still notify the other nodes that a multi-home transaction between the two occurred.

In some cases, some nodes may not have permissions or privileges to know what multi-home transactions have taken place between nodes or whether any multi-home transactions have taken place between them. In some such cases, the nodes of a multi-home transaction may not send replicated transactions to the other (non-privileged/non-permissioned) nodes. However, to enable the other (non-privileged/non-permissioned) nodes to generate Merkle trees, in some cases, the nodes of the multi-home transaction (e.g., node A and node B) or the multi-home consensus node 202 may output some value to the other nodes during or as part of processing an end-block command. The value may be a hash of the transactions of which they were a part (e.g., A/B_transactions_hash), a mutually agreed upon value or the nodes may use a mutually agreed upon function to generate the same value. In this way, the nodes of the multi-home transaction may enable the other (non-privileged/non-permissioned) nodes to generate Merkle trees without providing information that would enable the other nodes to determine whether and how many transactions occurred between the nodes of the multi-home transaction(s). With reference to the nodes A, B, and C, in some cases, such as when there are no A/B transactions, nodes A and B (or the multi-home consensus node 202) can use a predetermined value or function to generate a value to share with node C, and used by node C to generate a Merkle root. In this way, nodes A and B can obfuscate that there were no A/B transactions from node C.

Similar to the differences between Merkle trees when one participant node obfuscates single-home transaction information by sharing a non-leaf node or non-leaf node value with another participant node, there may be additional differences between Merkle trees due to participant nodes that are part of a multi-home transaction obfuscating the multi-home transaction from other participant nodes. In some cases, the participant nodes that seek to obfuscate multi-home transaction information may do so by sharing a non-leaf node or non-leaf node value from their respective Merkle trees, or some other or mutually agreed upon value, with other participant nodes instead of sharing the multi-home transaction information. In certain cases, the participant nodes may share the non-leaf node or non-leaf node value with the other nodes directly and/or via the multi-home consensus node 202. In some cases, the multi-home consensus node 202 can determine which non-leaf nodes or values are to be shared with different nodes to enable them to generate consistent Merkle trees and share the relevant information.

With reference to the nodes A, B, and C example, node A and node B (or the multi-home consensus node 202) may share the value or content of the non-leaf node for A/B transactions with node C but may not share the corresponding leaf nodes. As such, the node C Merkle tree may include a leaf node that corresponds to (e.g., matches) the non-leaf node for A/B transactions. Node C and can use the contents of this A/B transactions leaf node to generate a Merkle root that matches the Merkle root of the node A and node B Merkle trees. In some such cases, the node A and node B Merkle trees may have additional levels than the node C Merkle tree. The additional levels may correspond to the respective local home portions of A/B multi-home transactions. Although described with reference to A/B transactions, it will be understood that any participant nodes of a multi-home transaction may similarly obfuscate multih-home transaction information from other participant nodes.
Example Merkle Tree Based on Unshared Transactions As participant nodes 210 may not have insight into all transactions processed by other participant nodes 210, in some cases, a participant node 210 may communicate with other participant nodes 210 and/or the multi-home consensus node 202 to generate a Merkle tree. For example, with reference again to FIG. 5B, in some embodiments, the participant node 210 (e.g., node A, node B, and node C) may calculate and create a Merkle tree based on the following steps concurrently and/or sequentially.

First, each node may calculate the hash associated with its local single-home transactions that involve only data owned and/or managed by the node itself (e.g., node A calculates NodeA_hash, node B calculates NodeB_hash, and node C calculates NodeC_hash). As described herein, as part of generating the hash of the single-home transactions, the node can order the transactions according to the partial ordering that it assigned the transactions and generate the hash value from the ordered single-home transactions.

Second, each node may share the hash(es) associated with its local single-home transaction with other nodes (e.g., node A shares NodeA_hash with node B and node C, node B shares NodeB_hash with node A and node C, and node C shares NodeC_hash with node A and node B). In some cases, each node may share the hashes generated in step one with the other nodes directly (e.g., using replication queues) or using the multi-home transaction node 202 (e.g., sending the generated hashes to the multi-home transaction node 202, where the multi-home transaction node 202 communicates the hashes to the other nodes).

Third, each node may calculate hashes for multi-home transactions that include data owned by that node (e.g., node A and node B individually calculate A/B_transactions_hash, node B and node C individually calculate B/C_transactions_hash, node A and node C individually calculate A/C_transactions_hash). As described herein, as part of generating the hash of the multi-home transactions, a node may order the multi-home transactions according to the partial ordering that the multi-home transaction node 202 assigned to the multi-home transactions and generate the hash value from the ordered multi-home transactions.

Fourth, each node may share the hashes generated in step three. In some cases, each node may share the hashes generated in step three with the other nodes directly (e.g., using replication queues) or using the multi-home transaction node 202 (e.g., sending the generated hashes to the multi-home transaction node 202, where the multi-home transaction node 202 communicates the hashes to the other nodes).

In some cases, each node shares the hashes generated in step three with all other nodes (e.g., node A and node B each share A/B_transactions_hash with each other and node C, node B and node C each share B/C_transactions_hash with each other and node A, node A and node C each share A/C_transactions_hash with each other and node B). In this way, each node may have a complete copy of all hashes generated by the other nodes and use the hashes to verify consistency (e.g., confirm that A/B_transactions_hash generated by node A matches A/B_transactions_hash generated by node B, etc.)

In certain cases, each node shares the hashes generated in step three (only) with other nodes that were not part of the multi-home transactions (e.g., node A and node B share A/B_transactions_hash with node C, node B and node C share B/C_transactions_hash with node A, node A and node C share A/C_transactions_hash with node B). In this way, the system may take advantage of the case where each node of a multi-home transaction generates a hash associated with that multi-home transaction, and therefore nodes of the same multi-home transaction already have the relevant data without sharing it and may reduce the amount of data transferred between nodes.

Fifth, each node may receive hashes associated with single-home transactions that involve data not owned by the node (e.g., hashes generated at step one). As described herein, each node may receive the hashes associated single-home transactions of other nodes from the other nodes and/or from the multi-home transaction node 202. (e.g., node A receives NodeB_hash and NodeC_hash, node B receives NodeA_hash and NodeC_hash, node C receives NodeA_hash from and NodeB_hash).

Sixth, each node receives hashes associated with multi-home transactions generated by other nodes (e.g., hashes generated at step three). As described herein, each node may receive the hashes associated multi-home transactions from the other nodes and/or from the multi-home transaction node 202.

In some cases, each node receives the hashes associated with multi-home transactions regardless of whether the receiving node participated in the relevant multi-home transactions (e.g., node A receives A/B_transactions_hash and B/C_transactions_hash generated by node B, and receives B/C_transactions_hash and A/C_transactions_hash generated by node C; node B receives A/B_transactions_hash and A/C_transactions_hash generated by node A, and receives B/C_transactions_hash and A/C_transactions_hash generated by node C; node C receives A/B_transactions_hash and A/C_transactions_hash generated by node A, and receives B/C_transactions_hash and A/B_transactions_hash generated by node B). In certain cases, each node receives hashes associated with multi-home transactions that do not involve data owned by the receiving node (e.g., node A receives B/C_transactions_hash generated by node B and generated by node C; node B receives A/C_transactions_hash generated by node A and generated by node C; node C receives A/B_transactions_hash generated by node A and generated by node B).

In certain cases, such as when the multi-home consensus node 202 is used to communicate the hashes between nodes, the multi-home consensus node 202 may communicate a single copy of the hashes associated with multi-home transactions to each node that was not a part of the multi-home transaction (e.g., node A receives one copy of B/C_transactions_hash generated by node B or node C; node B receives one copy of A/C_transactions_hash generated by node A or node C; node C receives one copy of A/B_transactions_hash generated by node A or node B). In some such cases, the multi-home consensus node 202 may verify the consistency of hashes received from different nodes. For example, the multi-home consensus node 202 may verify that the A/B_transactions_hash generated by node A matches the A/B_transactions_hash generated by node B, the B/C_transactions_hash generated by node B matches the B/C_transactions_hash generated by node C, and the A/C_transactions_hash generated by node A matches the A/C_transactions_hash generated by node C, etc.

Ninth, each node may use hashes of the first, third, fifth, and sixth steps to generate a Merkle tree and calculate a Merkle tree root. In some cases, each node may calculate multiple Merkle tree roots. For example, a node may calculate one Merkle tree root using data received (directly)

from the other nodes, and calculate another Merkle tree root using data received from the multi-home transaction node 202.

Merkle Tree Verification and Block Completion

Returning to FIG. 5A, at (7), the local home consensus function 218A may send the end-block data generated at the participant node 210A and receive end-block data generated by other participant nodes 210. As described herein, the end-block data may include a Merkle tree (e.g., a Merkle tree that is calculated based on steps described at (6)). In some embodiments, the participant node 210A and each of other participant node(s) 210 may send their generated Merkle tree to the multi-home consensus node 202, which in turn can communicate the Merkle trees between the different participant nodes 210. For example, in response to receiving a Merkle tree from the participant node 210A, the multi-home consensus node 202 may send the Merkle tree to other participant node(s) 210. In certain embodiments, each of the participant nodes 210 may share Merkle trees with each other without going through the multi-home consensus node 202 (e.g., via the replication queue).

The other participant node(s) 210 may use the Merkle tree calculated by the participant node 210A to verify that the participant node 210A and other participant node(s) 210 processed the same pre-end-block transactions and replicated transactions consistently. For example, participant node 210N may compare the Merkle tree (or Merkle tree root) that it generated with the Merkle tree (or Merkle tree root) generated by participant node 210A. Based on a match, the participant node 210N may verify that the two participant nodes 210 are including the same transactions (including single-home and multi-home transactions) in the same block of the blockchain. Moreover, by confirming that the Merkle trees (or Merkle tree roots) match, the participant node 210N may verify that the two participant nodes 210 used the same partial ordering of the blocks when calculating the various hash values Merkle tree. The participant node 210A and some or all other participant nodes 210 may perform a similar verification. In this way, the various participant nodes 210 may verify that each participant node 210 are using the same transactions for the block and partial ordering for generating the Merkle tree.

Although the illustrated example shows the sharing of end-block data via the multi-home consensus node 202, it will be understood that the end-block data may be shared in a number of ways. In some cases, the participant nodes 210 may share the end-block data directly with each other (e.g., without using the multi-home consensus node 202). For example, the participant nodes 210 may share the end-block data as one or more transactions (or replicated transactions) via the replication queue 224.

At (8), (e.g., after verifying the Merkle trees of the different nodes) the local home consensus function 218A may perform a local signing of the block and send a confirmation of the signed block to the multi-home consensus node 202 for completing a signing process and the block creation process. In some embodiments, the local signing of the block may include the local home consensus function 218A generating (e.g., using a cryptographic key) a digital signature for the block to provide cryptographic proof of the block's authenticity and integrity. For example, the local home consensus function 218A may generate a digital signature by applying a private key of a public-private key pair to any one or any combination of the Merkle tree root hash, an identifier for the block (e.g., block ID) of the proposed block, block height of the proposed block, the block ID/hash of the prior block, and/or timestamp. Fewer, more, or different parameters or properties of the proposed block or previous block and/or other cryptographic keys or mechanisms may be used to generate the digital signature for the proposed block.

After locally signing the block, the local home consensus function 218A may send confirmation of the signed block to the multi-home consensus node 202. The confirmation may include any one or any combination of the aforementioned digital signature, Merkle tree root hash, block ID of the proposed block, block height of the proposed block, and block ID/hash of the prior block, or other block parameters. The multi-home consensus node 202 may use the information from the confirmation to coordinate the completion of the signing process and the block creation process between nodes of the blockchain system 200.

In some embodiments, the multi-home consensus node 202 may collect confirmations from the participant node 210A and other participant node(s) 210 for verification. In some embodiments, the multi-home consensus node 202 verifies the digital signatures (e.g., by applying the public key corresponding to the private key to the digital signature and confirming the resulting content matches the block parameters that were sent in the confirmation) and confirms that the participant nodes agree on the content of the block. In some cases, to confirm that the participant nodes 210 agree, the multi-home consensus node 202 may confirm that the Merkle tree root hashes, block IDs and block heights of the proposed block and block IDs of the previous block, as received from the various participant nodes 210 match. In response to the verification and confirmation, the multi-home consensus node 202 may facilitate completion of the signing process and the block creation process for adding a new block to the blockchain system 200.

At (9), the local home consensus function 218A may store the new block and add the new block to the chain data 216A to finalize the block creation process. The local home consensus function 218A may confirm that the validations and signatures have been completed for adding the new block to the blockchain. By completing the block, the participant node 210A may make sure that the new block is fully validated, signed, and appropriate to be included in the blockchain system 200.

Fewer, more, or different steps may be used herein with reference to the processing of an end-block command. Moreover, the steps may be rearranged in a different order or performed concurrently. For example, the participant node 210A may concurrently (6) compute end-block data and (7) receive end-block data of other participant nodes 210, etc.

As described herein, although described with reference to participant node 210A, it will be understood that some or all of the participant nodes 210 of a blockchain system 200 may receive and process the end-block command in a similar way. As such, some or all of the participant nodes 210 of a blockchain system may generate and sign their own Merkle trees and sign the block to be added to their respective blockchains, etc. As described herein, while the different participant nodes 210 may use the same transactions (e.g., from their respective chain data 216) to generate their respective Merkle trees, the order of the transactions may be different. For example, as described herein, the asynchronous nature of the updates give rise to different participant nodes 210 processing transactions in different orders. In some such cases, while a total ordering may be different (e.g., the order of all transactions), the participant nodes 210 may maintain a consistent partial ordering with each other. As described herein, some or all participant nodes may assign or prescribe a particular order to single-home transactions that relate to data that they own, and some or all other participant nodes may follow that order when processing the replicated transactions that correspond to the single-home transaction. For example, participant node 210A may assign an order to the single-home transactions that it processes (e.g., single-home transactions that affect data that it owns) and each participant node may process the replicated transactions corresponding to the single-home transactions from participant node 210A in the same order. Similarly, the multiple-home consensus node 202 may assign a partial ordering to the multi-home transactions.

In view of the different total ordering between the participant nodes 210, when generating a Merkle tree, the participant nodes 210 may rely on the partial orderings to calculate hash values for individual or groups of transactions. For example, when calculating a hash value for multi-home transactions, a participant node 210 may order the transactions as prescribed by the multi-home consensus node 202. Similarly, when calculating the hash value for replicated transactions corresponding to single-home transactions of participant node 210A, participant node 210N may use the order prescribed by the participant nodes 210A and vice versa. By using the partial ordering to generate hash values and the Merkle trees, the participant nodes 210 may have a different total ordering of transactions while still generating the same Merkle tree and/or Merkle root. When generating an intermediate Merkle value or the Merkle root, the participant nodes 210 may similarly use a predetermined order. For example, to generate a Merkle root (or intermediate value), the participant nodes 210 may use an order prescribed by the multi-home consensus node 202 in the end-block command. In this way, the participant nodes 210 may generate the same Merkle root. As described herein, in some cases, the Merkle trees of the different participant nodes may not be identical due to one or more participant nodes not exposing transactions to other participant nodes (also referred to herein as a non-exposing participant node). In some such cases, the non-exposing participant nodes may send the other participant node a value that can be used by the other participant node to generate the same Merkle tree root. In some cases, as described herein, the value that is shared may correspond to a value found in one of the nodes (e.g., in a non-leaf node) of the Merkle tree of, or otherwise generated by, the non-exposing participant node.

Single-Home Transaction Flow

Figure 6:
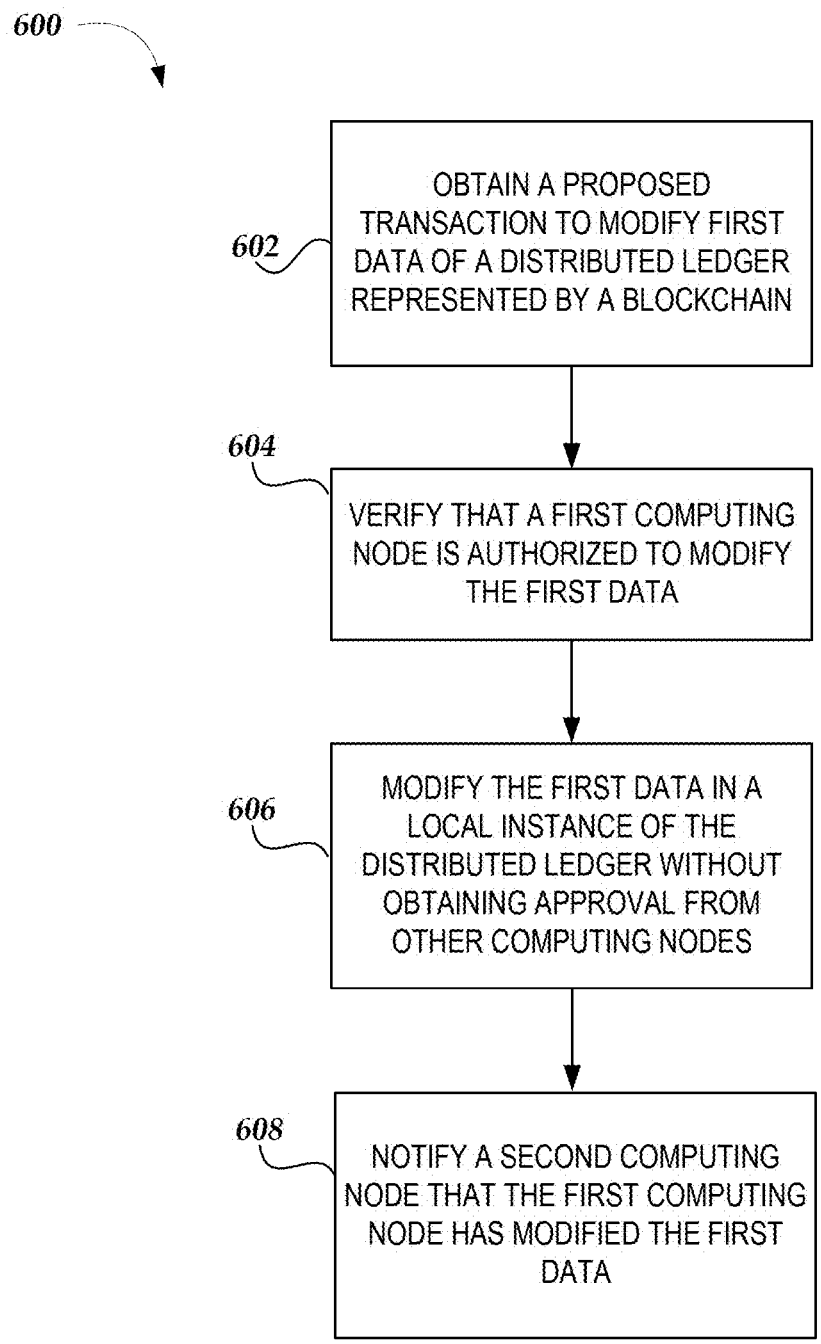
FIG. 6 depicts an illustrative routine for a participant node to process a single-home transaction involving data owned by the participant node, in accordance with embodiments of the present disclosure.

With reference to FIG. 6, an illustrative routine 600 will be described for asynchronously updating data associated with a blockchain in accordance with some embodiments of the present disclosure. The blocks of the routine 600 illustrate example implementations, and in various other implementations various blocks may be rearranged, optional, and/or omitted, and/or additional block may be added. The routine 600 can be implemented at a first computing node of a plurality of computing nodes implementing the blockchain. For example, the routine 600 may be implemented by the participant node 210 (e.g., via operation of the single-home verify function 228, the local home consensus function 218, and/or other components of the participant node 210) to asynchronously modify the chain data 216 in accordance with a single-home transaction that involves (only) data owned by the computing node, and notify other computing nodes about the modification.

At block 602, a first computing node (e.g., the participant node 210) obtains a proposed transaction. In some cases, the first computing node receives the proposed transaction from another computing node (e.g., another participant node 210) and/or from a client computing device. For example, another computing node may have received the proposed transaction, determined that it did not have the appropriate permissions/privileges to process/execute the proposed transaction, identified the first computing node as the owner of the first data or second data (e.g., with the appropriate permissions/privileges to process/execute the transaction) and, based on the identification, communicated the transaction to the first computing node.

The proposed transaction may include a modification to first data of a distributed ledger represented by the blockchain. The modification may include changing and updating the first data, including for example addition, modification, or deletion of the first data. In some embodiments, the modification can be conditional such that the modification to the first data is conditional on, for example, other values or data within the distributed ledger. The proposed transaction may further include transaction metadata, such as a party (e.g., a client computing device 102, a participant node of the blockchain system 200) proposing the transaction and information enabling the transaction to be authenticated, such as a digital signature of the party proposing the transaction (e.g., generated from a private key of the party proposing the transaction, and verifiable via a corresponding public key).

At block 604, the first computing node may verify that it is authorized to modify the first data. In some cases, the first computing node may determine whether the proposed transaction is a single-home transaction that only involves data owned by the first computing node. For example, the first computing node may verify, based on transaction metadata, that the proposed transaction (only) modifies the first data and the first data is owned by the first computing node (e.g., the first computing node controls access to or has permissions/privileges to modify the first data) such that the first computing node is authorized to modify the first data. In some embodiments, the first computing node may obtain blockchain metadata indicative of data ownership (e.g., ownership metadata) and use the ownership metadata associated with the first data to determine if the first computing node is the owner or has the authority to modify the first data.

In some embodiments, if the first computing node determines that the proposed transaction is a single-home transaction that modifies the first data owned by the first computing node, the first computing node may further process the proposed transaction. Although not illustrated in FIG. 6, in certain cases, such as when the first computing node determines that it does not have the relevant permission and/or privileges to modify the first data (e.g., does not own the first data), the first computing node may identify the owner of the first data and communicate the proposed transaction to the computing node that owns the first data.

At block 606, in response to verifying that the first computing node owns or is authorized to modify the first data, the first computing node may execute the transaction. As part of executing the transaction, the first computing node may modify the first data in a local instance of the distributed ledger in accordance with the transaction without obtaining approval from other computing nodes. For example, in response to the first computing node verifying that it owns or is authorized to modify the first data, the first computing node may update the chain data 216 to log the transaction and/or the change to be made to the distributed ledger in view of the transaction. In some cases, as part of logging the transaction or updating the chain data 216, the first computing node may assign an order to the transaction relative to other single-home transactions processed by the first computing node. In certain cases, the first computing node assigns the order once it has verified that the transaction is a single-home transaction that it will process. In some cases, the first computing node assigns the order upon receipt of the transaction.

In addition, the first computing node may further update ledger state in the ledger state data 212 based on the modification to the first data indicated by the transaction. As described herein, the first computing node may update the chain data 216 and/or modify the first data in the ledger state data 212 without obtaining approval from other computing nodes. In some cases, before updating the chain data 216 and/or modifying the ledger state data 212, the first computing node may activate a read/write lock on the data to ensure no other process or computing node will modify the data. Once the chain data 216 and/or ledger state data 212 is updated, the first computing node may release the lock. Advantageously, such local updates without receiving pre-approval from other nodes in a blockchain system can allow for efficient and quick updates to the blockchain without the overhead of consensus from other computing nodes.

At block 608, the first computing node may notify a second computing node that the first computing node has modified the first data. For example, the first computing node may communicate a notification to other computing nodes that the first computing node has modified the first data stored in the ledger state data 212 and/or the chain data 216 to enable the other computing nodes to replicate the transaction. In some embodiments, the notification may include the transaction (e.g., as a replicated transaction) and the first computing node may send the notification/replicated transaction asynchronously (e.g., during or after the participant node 210 has processed the proposed transaction and without awaiting approval from the other computing nodes) to the replication queue 226 of the other computing nodes. As such, the first computing node may ensure that the transaction is propagated to other computing nodes in the blockchain system for maintaining consistency and integrity of the distributed ledger. In some cases, when sending the transaction to a second computing node, the first computing node may include the ordering that it assigned to the transaction. In this way, the second computing node may determine the proper sequence for processing the transaction relative to other replicated transactions received from the first computing node. As described herein, this "partial ordering" of transactions may also be used by the first computing node and the second computing node for calculating Merkle trees as part of an end-block command.

Additionally and/or optionally, the first computing node may monitor status of replicating the proposed transaction to other computing nodes and/or handle any errors encountered while the other computing nodes to replicate the proposed transaction. For example, when errors occur, the first computing node may retry sending the proposed transaction to the replication queue 226 of the other computing nodes or logging the errors.

In some cases, prior to communicating the transaction as a replicated transaction to the second computing node, the first computing node may verify whether the second computing node has the relevant privileges and/or permission to receive the replicated transaction. For example, as described herein, in certain cases, the computing node may not want other nodes to know about the transaction or the details of the transaction. As such, different nodes may have different permissions or privileges relative to single-home transactions processed by another computing node. Based on those permissions and/or privileges, the other computing node may not receive any replicated transaction from the first computing node, may receive a redacted version of the replicated transaction (or transaction parameter) and/or may receive a hash value based on the replicated transaction (but not the details of the transaction itself). Accordingly, in the illustrated example, the first computing node may determine that the second computing node includes privileges or permissions that allow it to receive the replicated transaction. In certain cases, the first computing node may identify a third computing node and determine that the third computing node does not have the privileges and/or permissions to receive the replicated transaction. Based on that determination, the first computing node may determine not to send the replicated transaction to the third computing node.

Put another way, the first computing node may determine which, if any, other computing nodes are to receive the replicated transaction, a portion or parameter of the replicated transaction or some other indication of the multi-home transaction based on permissions and/or privileges of the different computing nodes. In some cases, the first computing node may limit which other computing nodes receive a copy of the replicated transaction, a portion of the replicated transaction (or transaction parameter), an indication of the replicated transaction (e.g., a hash value), or any combination thereof, based on the permissions/privileges of the respective computing nodes. Accordingly, one computing node may receive a copy of the modifications made based on the replicated transaction, while another may receive a redacted portion of the transaction, and another may receive a hash value generated from the replicated transaction (or corresponding modification), while another may receive no indication of the replicated transaction based on the respective permissions/privileges of the computing nodes. As described herein, the different information received by the different computing nodes may result in differences in how the different computing nodes calculate Merkle trees as part of an end-block command.

In some cases, the first computing node may communicate some (redacted) content from the transaction and a hash. While the (redacted) content from the transaction may be insufficient to regenerate the hash, it may provide useful information to the second computing node, such as a transaction ID. In certain cases, the first computing node may communicate multiple hashes to the second computing node. The first hash may correspond to (e.g., generated from) the redacted content (e.g., the content communicated to the second computing node) and the second hash may correspond to the transaction as a whole (e.g., generated from the complete, unredacted transaction). In some such cases, the second hash may be used by the second computing node to generate a Merkle tree that is consistent with the first computing node and the first hash may be used by the second computing node to generate a local Merkle tree to facilitate the immutability of the local blocks.

Fewer, more or different blocks may be included herein with the aforementioned blocks of routine 600. For example, any one or combination of blocks of routine 600 may be combined with any one or any combination of blocks in FIGS. 7-9. Moreover, the blocks of routine 600 may be performed in a variety of sequential orders or concurrently. For example, the first computing node may perform blocks 606 and 608 concurrently. Moreover, the first computing node may receive tens, hundreds, or thousands of transactions per second and perform the various steps of the routine 600 concurrently with respect to the different transactions.

In some cases, as described herein, the first computing node may receive replicated transactions from other nodes. As described, the replicated transactions from other nodes may be accompanied by a partial ordering, or ordering assigned to the replicated transaction by the computing node that owned the data that was the subject of the replicated transaction or by the multi-home consensus node 202. The first computing node may use the partial ordering to determine the order by which to process the transactions from a particular computing node. However, the first computing node may process transactions from different nodes in different ordering. Accordingly, the first computing node may use a partial ordering for replicated transactions received from individual nodes but process the replicated transactions from different nodes in any order (e.g., process the replicated transactions from the second computing node according to the partial ordering provided by the second computing node but process the replicated transactions from the second computing node before, after, or concurrently with the replicated transactions from a third computing node).

As part of processing the replicated transactions, the first computing node may record the replicated transaction (e.g., in the chain data 216) and/or modify the ledger state data 212 in accordance with the instructions of the replicated transaction. Moreover, the first computing node may send replicated transactions to other nodes and receive replicated transactions from the other nodes asynchronously. By processing replicated transactions asynchronously, the first computing node can increase the throughput and decrease the latency of the blockchain system.

Transaction Replication Flow

Figure 7:
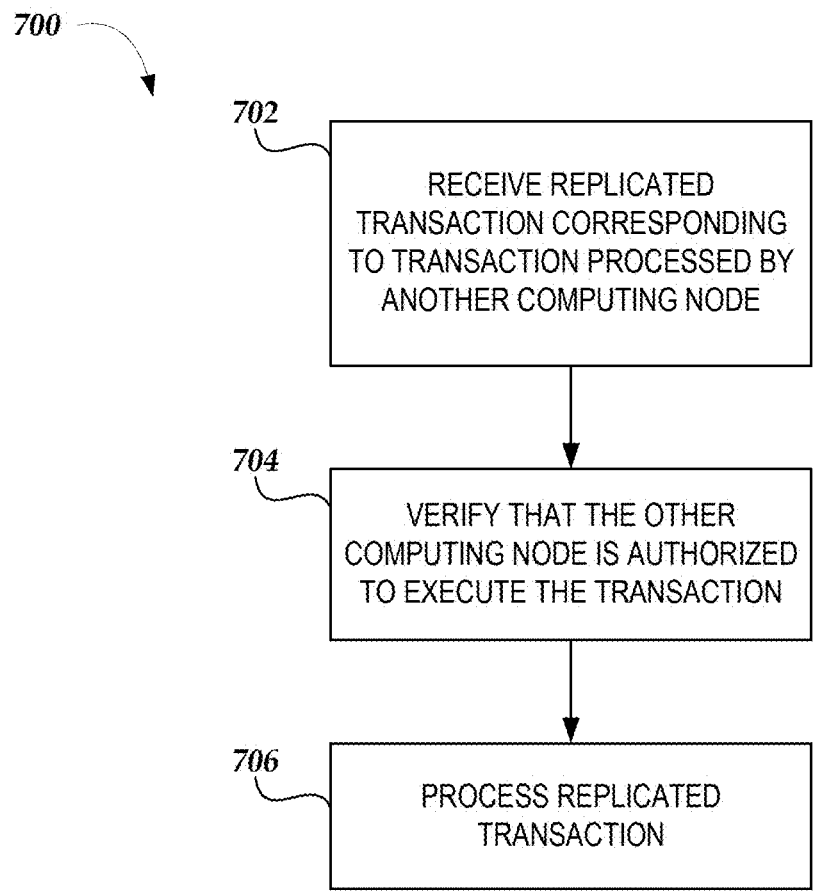
FIG. 7 depicts an illustrative routine for processing a replicated transaction by a participant node, in accordance with embodiments of the present disclosure.

With reference to FIG. 7, an illustrative routine 700 will be described for asynchronously updating data associated with a blockchain in accordance with some embodiments of the present disclosure. The blocks of the routine 700 illustrate example implementations, and in various other implementations various blocks may be rearranged, optional, and/or omitted, and/or additional block may be added. The routine 700 can be implemented at a first computing node of a plurality of computing nodes implementing the blockchain system. For example, the routine 700 can be implemented by the participant node 210 (e.g., via operation of the single-home verify function 228, the local home consensus function 218, and/or other components of the participant node 210) to asynchronously modify the chain data 216 in accordance with a replicated transaction that involves data owned by another computing node.

At block 702, a first computing node (e.g., the participant node 210) obtains a replicated transaction. As described herein, the first computing node may receive the replicated transaction from a second computing node (e.g., another participant node 210). For example, the second computing node may have received a transaction corresponding to the replicated transaction (that included a modification to first data on the second computing node's instance of the distributed ledger), determined that it was authorized to process/execute the transaction, processed/executed the transaction to modify the identified data on the instance of the distributed ledger at the second computing node, and communicated the replicated transaction to the first computing node as part of an asynchronous update, as described herein at least with reference to FIG. 6. In some cases, the replicated transaction corresponds to a single-home transaction processed by the second computing node.

In certain cases, the replicated transaction corresponds to a portion of a multi-home transaction processed by the second computing node. In some such cases, the first computing node may or may not have been included in the multi-home transaction. For example, the replicated transaction may correspond to an external home portion of the multi-home transaction and the first computing node may have executed a local home portion of the multi-home transaction (and sent the local home portion to the second computing node as a different replicated transaction). As another example, the replicated transaction may correspond to a first portion of the multi-home transaction executed, and a second portion of the multi-home transaction may have been executed by a third computing node. In some such cases, the first computing node may separately receive a replicated transaction corresponding to the portion of the multi-home transaction executed by the third computing node.

As described herein, the replicated transaction may include a modification to the first data on the instance of the distributed ledger at the first computing node (e.g., to replicate the modification that the second computing node made to its instance of the distributed ledger). The modification may include changing and updating the first data, including for example addition, modification, or deletion of the first data. The replicated transaction may further include transaction metadata, such as the identity of the second computing node that processed the corresponding transaction, a cryptographic signature of the second computing node verifying its identity to the first computing node, a transaction identifier, and an ordering for the replicated transaction.

As described herein, the ordering of the replicated transaction may correspond to a partial ordering that is to be observed by the first computing node when processing/executing replicated transactions from the second computing node. For example, the partial ordering may indicate the order in which the second computing node is to process replicated transactions from the second computing node. In this way, the first computing node can determine the proper sequence for processing the replicated transaction relative to other replicated transactions received from the second computing node. As described herein, this partial ordering of transactions may also be used by the first computing node and the second computing node for calculating Merkle trees as part of an end-block command.

At block 704, the first computing node may verify that the second computing node was authorized to modify the first data (and may verify whether the first computing node is authorized to process the replicated transaction). In some embodiments, the first computing node may obtain blockchain metadata indicative of data ownership (e.g., ownership metadata) and use the ownership metadata associated with the first data to determine if the second computing node is the owner or had the authority to modify the first data. In some embodiments, if the first computing node determines that the replicated transaction modifies first data owned by the second computing node, the first computing node may further process the replicated transaction. Although not illustrated in FIG. 7, in certain cases, such as when the first computing node determines that the second computing node did not have the relevant permission and/or privileges to modify the first data (e.g., does not own the first data), the first computing node may generate an error and terminate processing the replicated transaction. Similarly, if the first computing node determines that it does not have the relevant permission and/or privileges to process the replicated transaction, the first computing node may generate an error and terminate processing the replicated transaction.

At block 706, in response to verifying that the second computing node owns or was authorized to modify the first data, the first computing node may execute the replicated transaction. As part of executing the replicated transaction, the first computing node may update the chain data 216 to log the replicated transaction and/or the change to be made to the distributed ledger in view of the transaction.

In addition, the first computing node may, as part of executing the replicated transaction, update ledger state in the ledger state data 212 based on the modification to the first data indicated by the replicated transaction. As described herein, the first computing node may update the chain data 216 and/or modify the first data in the ledger state data 212 without obtaining approval from other computing nodes. As described herein, the first computing node may process/execute the replicated transaction according to the order indicated by the second computing node. In this way, the first computing node can maintain the order of replicated transactions in accordance with the second computing node to maintain consistent instances of the distributed ledger on the first computing node and the second computing node.

In some cases, before updating the chain data 216 and/or modifying the ledger state data 212, the first computing node may activate a read/write lock on the data to ensure no other process or computing node will modify the data. Once the chain data 216 and/or ledger state data 212 is updated, the first computing node may release the lock. Advantageously, such local updates without receiving pre-approval from other nodes in a blockchain system can allow for efficient and quick updates to the blockchain without the overhead of consensus from other computing nodes.

Fewer, more or different blocks may be included herein with the aforementioned blocks of routine 700. For example, any one or combination of blocks of routine 700 may be combined with any one or any combination of blocks in FIGS. 6, 8, and 9. Moreover, the first computing node may receive tens, hundreds, or thousands of replicated transactions per second and perform the various steps of the routine 700 concurrently with respect to the different replicated transactions.

As a non-limiting example, the first computing node may receive a second replicated transaction from a third computing node with a partial ordering from the third computing node. In some cases, the first computing node may maintain the partial ordering of the second replicated transaction relative to other replicated transactions received from the third computing node but may execute the second transaction without regard to its order relative to replicated transactions received from the second computing node. As such, the first computing node may maintain partial ordering of transactions from the same computing node but may use a different total ordering for transactions from different nodes.

As another non-limiting example, the first computing node may receive a second replicated transaction from the second computing node with an ordering from the second computing node. In some cases, the first computing node may execute the second replicated transaction prior to the first replicated transaction (or vice versa) based on the orderings of the replicated transactions.

Multi-Home Transaction Flow

Figure 8:
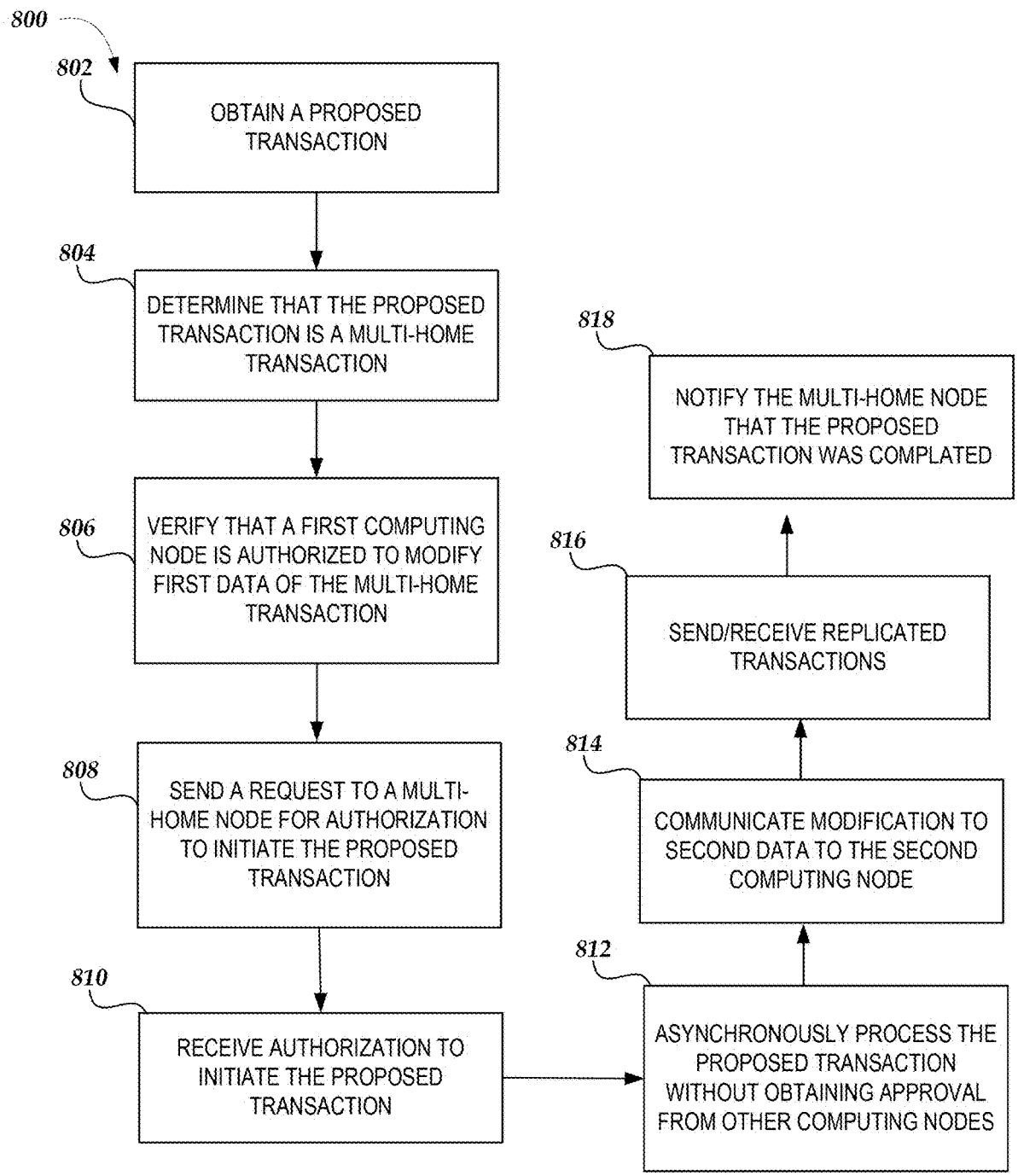
FIG. 8 depicts an illustrative routine for processing a multi-home transaction by a participant node receiving the multi-home transaction, in accordance with embodiments of the present disclosure.

With reference to FIG. 8, an illustrative routine 800 will be described for asynchronously updating data associated with a blockchain in accordance with a multi-home transaction that involves modifying data owned by more than one participant node 210 (e.g., participant node 210A and participant node 210N). The blocks of the routine 800 illustrate example implementations, and in various other implementations various blocks may be rearranged, optional, and/or omitted, and/or additional block may be added. The routine 800 can be implemented by a receiving participant node (e.g., a participant node 210A) coordinating with a multi-home consensus node 202 and the participant node 210N to process a multi-home transaction. Although described as being a two-node multi-home transaction, it will be understood that the multi-home transaction may involve more than two nodes.

At block 802, a first computing node (e.g., the participant node 210A) may obtain a proposed transaction. As described herein, the first computing node may receive the proposed transaction from a user (e.g., client computing devices 102), another participant node, or another computing device. For example, another participant node 210 may have received the proposed transaction, determined that it did not have the appropriate permissions/privileges to process/execute the proposed transaction, identified the first computing node as the owner of the first data or second (e.g., with the appropriate permissions/privileges to process/execute the transaction) and, based on the identification, communicated the transaction to the first computing node. In some embodiments, the proposed transaction may be stored in the transaction queue 224A of the first computing node (e.g., participant node 210A) for further access by other components (e.g., the single-home verify function 228A) of the first computing node.

At block 804, the first computing node may determine that the proposed transaction is a multi-home transaction (e.g., includes a first modification to first data of a first instance of a distributed ledger located at the first computing node (e.g., the ledger state data 212A and/or the chain data 216A) and a second modification to second data of a second instance of the distributed ledger stored on a second computing node (e.g., the ledger state data 212N and/or the chain data 216N of the participant node 210N). For example, the first data may be owned by the first computing node and the second data may be owned by the second computing node. Accordingly, the multi-home transaction may include instructions to modify first data of a local instance of a distributed ledger represented by a blockchain and stored on the first computing node and modify second data of a second instance of the distributed ledger stored on the second computing node.

At block 806, the first computing node may verify that the first computing node is authorized to modify the first data. For example, the first computing node may read the proposed transaction from the transaction queue 224 and fetch information or details about the proposed transaction, such as what modifications are to be made to the distributed ledger. The first computing node may verify that the first computing node is authorized to modify the first data based on a determination that the first data is owned by the first computing node. In some embodiments, before proceeding with the proposed transaction, the single-home verify function 228 may perform initial checks on the proposed transaction to confirm, for example, the proposed transaction adheres to the basic requirements of the schema of the blockchain system 200 and include the relevant fields for completing the proposed transaction. Although not illustrated in FIG. 8, in certain cases, such as when the first computing node determines that it does not have the relevant permission and/or privileges to modify the first data (e.g., does not own the first data), the first computing node may identify the owner of the first data and communicate the proposed transaction to the computing node that owns the first data.

At block 808, the first computing node may send a request to a multi-home node for authorization to initiate the proposed transaction. For example, after verifying that the proposed transaction is a multi-home transaction that involves modifying data owned by two computing nodes, the first computing node may coordinate with a multi-home consensus node 202 to setup a multi-home transaction.

In some embodiments, the first computing node may notify the multi-home consensus node 202 that the proposed transaction is a multi-home transaction and provide information (e.g., the first data and the second data to be modified based on the proposed transaction, the nodes involved in the proposed transaction, and any preconditions that must be met for proceeding the proposed transaction) about the proposed transaction to the multi-home consensus node 202. In some cases, the first computing node limits the amount of data shared with the multi-home consensus node 202. For example, the first computing node may communicate (only) the identity of the computing nodes involved in the multi-home transaction. In this way, the first computing node can reduce the amount of data that the multi-home consensus node 202 receives about any particular transaction. Accordingly, the multi-home consensus node 202 may know the computing nodes involved in a particular multi-home transaction but may not know the content of the modifications to be made by the computing nodes.

Based on the request and/or information about the proposed transaction, the multi-home consensus node 202 may order the proposed transaction to be processed in a particular sequence. For example, the multi-home consensus node 202 may assign a partial ordering to multi-home transactions. In some cases, the multi-home consensus node 202 may use the same partial ordering for all multi-home transactions. In certain cases, the multi-home consensus node 202 may use different partial orderings depending on the computing nodes involved. In some cases, the multi-home consensus node 202 may use different partial orderings that involve mutually exclusive sets of participant nodes. For example, in a four-participant node system, the multi-home consensus node 202 may use a first partial ordering for multi-home transactions involving only node A and node B and a second partial ordering for multi-home transactions involving only node C and node D. Such partial orderings may be ordered in any way relative to each other. However, a multi-home transaction involving node A, node B, and node C (e.g., nodes in both of the partial orderings) may be ordered subject to the first partial ordering and the second partial ordering an. Accordingly, in some cases, the multi-home consensus node 202 may determine the sequence in which the proposed transaction should be processed based on an identity of the nodes involved in the proposed multi-home transaction.

As described herein, the multi-home consensus node 202 may assign the proposed transaction to a transaction container to monitor, track, or manage the proposed transaction. After ordering the proposed transaction and/or assigning the proposed transaction to the transaction container, the multi-home consensus node 202 may send authorization (e.g., a notification to the first computing node that the proposed transaction can continue) and order transaction information to the first computing node. In some cases, upon completion of the multi-home transaction (e.g., completion of the routine 800), the transaction container can be destroyed by the multi-home transaction node 202.

At block 810, the first computing node may receive authorization to initiate the proposed transaction. As described herein, the first computing node may receive authorization from the multi-home consensus node 202 to initiate the proposed multi-home transaction. In some cases, the authorization may indicate the order by which the first computing node is to execute the multi-home transaction relative to (all) other multi-home transactions of the system and/or relative to other multi-home transactions involving the first computing node. By following the partial ordering, the first computing node can reduce the likelihood of errors from editing data in a wrong order or overwriting data that a previous transaction was set to use. Moreover, as described herein the first computing node may also have an order for other transactions/replicated transactions that it is processing. Accordingly, in some cases, the first computing node may, before processing its portion of the multi-home transaction, process one or more single-home transaction or other portions of multi-home transactions, before processing the aforementioned portion of the multi-home transaction.

In response to receiving the authorization, at block 812, the first computing node may asynchronously process the proposed transaction, for example, by modifying the first data in the local instance of the distributed ledger (e.g., stored in the chain data 216 and/or the ledger state data 212) without obtaining approval from other computing nodes, similar to block 606 of FIG. 6. As described herein before modifying the distributed ledger, the first computing node may lock the data for writing. Following the modification, the first computing device may unlock the data for writing.

At block 814, the first computing node may communicate at least the modification to the second data of the second instance of the distributed ledger (e.g., the external home portion of the multi-home transaction) to the second computing node to cause the second computing node to asynchronously modify the second data in accordance with the multi-home transaction. In some cases, in response to receiving the authorization from the multi-home consensus node 202, first computing node may send the external home portion of the multi-home transaction to the second computing node. As described herein, in communicating the external home portion of the multi-home transaction to the second computing node, the first computing node may include the partial ordering for the multi-home transaction received from the multi-home consensus node 202. As described herein, in some cases, the multi-home consensus node 202 may handle the authorizations for and communications of the external portions of a multi-home transaction. For example, the multi-home consensus node 202 may inform a particular participant node that it is authorized to perform a portion of a multi-home transaction and communicate the relevant portion to the particular participant node. In addition, the multi-home consensus node 202 may communicate ordering information for the multi-home transaction, a transaction identifier (which may implicitly indicate the ordering), etc. to the particular participant node.

Responsive to receiving the second modification, the second computing node may process and execute the second modification similar to the processing and execution of the first modification by the first computing node (e.g., similar to blocks 604 and 606 of FIG. 6). As described herein, the second computing node may process and execute the second modification according to the partial ordering received by the multi-home consensus node 202. Accordingly, the second computing node may modify the second data in accordance with its portions of the multi-home transaction.

In some cases, before communicating the second modification to the second computing node, the first computing node may verify that the second computing node is authorized to modify the second data stored on the second computing node. If it is not, the first computing node may cancel the multi-home transaction, notify a user, and/or attempt to identify the computing node of the plurality of computing nodes that is authorized to modify the second data. In some cases, the multi-home consensus node 202 may make this determination and either reject the transaction in response to the first computing node's request or fail to confirm the transaction's legitimacy to the second computing node, etc.

With respect to block 812 and block 814, it will be understood that the first computing node may process the multi-home transaction by dividing it into a local home portion that is to be processed by the first computing node and an external home portion that is to be processed by the second computing node. As described herein, the local home portion of the multi-home transaction may correspond to the modification of the first data owned by the first computing node. As such, the local home portion may be processed by the first computing node locally without consensus from other computing nodes. The external home portion of the multi-home transaction involves the second data owned by the second computing node. As such, the external home portion may include modifications or operations to be performed by the second computing node to complete the multi-home transaction.

In some embodiments, after dividing the proposed transaction into a local home portion and an external home portion, the first computing node may process the local home portion. Concurrently and/or sequentially, the first computing node may send the external home portion of the multi-home transaction to the second computing node. As described herein, in some cases, the first computing node may transmit the transaction to the multi-home consensus node 202, which may perform transaction distribution and assignment of work for multi-home transactions.

The second computing node may evaluate and process the external home portion (e.g., modify the second data of the second instance of the distributed ledger stored on the second computing node). For example, the second computing node may verify the validity of the external home portion, check whether preconditions are met, confirm that the external home portion complies with the blockchain's rules and policies, and modify the second data, etc., similar to the way in which the first computing node processes the local home portion of the muti-home transaction (block 812)

At block 816, the first computing node may generate a replicated transaction for replicating the local home portion of the multi-home transaction on other computing nodes. The replicated transaction can include information or details about the proposed transaction as described herein, such as the transaction ID, the modifications made, the partial ordering of the multi-home transaction (as assigned by the multi-home consensus node 202), the number of portions of the multi-home transaction, and the identity of the portion of the multi-home transaction that is being replicated and/or any other metadata related to the proposed transaction. After receiving the replicated transaction from the multi-home transaction, the other computing nodes (including the second computing node) may store the replicated transaction in its replication queue 226, fetch information about the replicated transaction, and/or evaluate the replicated transaction. If the replicated transaction is evaluated and verified to be valid, the other computing nodes can write the replicated transaction to their respective chain data 216 and/or ledger state data 212.

As described herein, the first computing node may determine which, if any, other computing nodes are to receive the replicated transaction, redacted version of the replicated transaction, or indication of the multi-home transaction (e.g., hash) based on permissions and/or privileges of the different computing nodes. In some cases, the first computing node may limit which other computing nodes receive a copy of the multi-home transaction, redacted copy, or an indication of the multi-home transaction (e.g., a hash value) based on the permissions/privileges of the respective computing nodes. Accordingly, one computing node may receive a copy of the modifications made based on the multi-home transaction, another may receive a redacted copy of transaction, another may receive one or more hash values generated from the (complete or redacted version of the) multi-home transaction (or modifications thereof), another may receive a redacted version or portion of the transaction and one or more hash values, while another may receive no indication of the multi-home transaction based on the respective permissions/privileges of the computing nodes. As described herein, the different information received by the different computing nodes may result in differences in how the different computing nodes calculate Merkle trees as part of an end-block command.

Moreover, the first computing node may receive replicated transaction(s) from other computing nodes, including the second computing node. For example, after the second computing node has completed its processing of the second modification of the multi-home transaction, the second computing node can send the second modification to the first computing node as a replicated transaction. As described herein, replicated transactions received from other computing nodes may include a partial ordering, particular to the computing node that sent the replicated transaction, to ensure transactions from the same computing node are processed in a particular order. After receiving replicated transactions from other computing nodes, the first computing node may process the replicated transaction similar to how other computing nodes process replicated transaction of the multi-home transaction received from the first computing node as discussed herein. The bidirectional nature of transaction replication can advantageously ensure that each node (nodes involved in the multi-home transaction and nodes not involved in the multi-home transaction) in the blockchain system 200 can receive updates about transactions such that the distributed ledger can maintain its consistency and/or accuracy across nodes in the blockchain system 200.

In some cases, processing the proposed transaction and/or modifying the first data in the local instance of the distributed ledger (block 812) may include adding the transaction to the chain data 216A for future inclusion in a block of the blockchain (but may not include modifying the ledger state data 212A). In certain cases, the first computing node may delay modifying the ledger state data 212A, based on the local home portion of the multi-home transaction, until the first computing node receives replicated transactions (block 816) from the other computing nodes involved in the multi-home transaction (e.g., confirmation that all involved computing nodes are ready to update their respective ledger state data 212). In some such cases, the first computing node may use a barrier sync to coordinate modifications to the ledger state data 212A due to the multi-home transaction. Once the first computing node has received replicated transactions corresponding to some or all portions of the multi-home transaction it can proceed to update the ledger state data 212A. In this way, the first computing node can reduce or eliminate the risk of errors due to inaccurate information in the ledger state data 212A and/or only partial updates being applied to the ledger state data 212A.

At block 818, the first computing node may notify the multi-home transaction node 202 that the first modification or local home portion of the multi-home transaction was completed. For example, the first computing node may generate and transmit an acknowledge message to the multi-home consensus node 202. As such, the multi-home consensus node 202 may be notified that the first computing node completed its portion of the multi-home transaction. Similarly, the multi-home consensus node 202 may receive a notification from the second computing node once the second computing node completes the second modification. By receiving the acknowledgements from the computing nodes involved in the multi-home transaction, the multi-home consensus node 202 may determine when the multi-home transaction is completed. Based on a determination that the multi-home transaction is completed, the multi-home consensus node 202 may indicate that additional multi-home transactions may be processed, etc. and/or authorize the first computing node, second computing node, or other computing nodes to process additional multi-home transactions.

In certain cases, the first computing node may track the completion of the multi-home transaction. For example, the first computing node may receive an indication (from the second computing node) that the second computing node modified the second data (e.g., completed the second modification). In some such cases, once the multi-home transaction is completed (e.g., the relevant computing nodes have completed their respective portions), the first computing node may communicate the completion to the multi-home consensus node. In some such cases, the multi-home consensus node 202 may not receive individual notifications from the various computing nodes involved in the multi-home transaction. Rather, the multi-home consensus node may await the acknowledgement from the first computing node to determine that the multi-home transaction is complete.

Fewer, more, or different blocks may be included in the routine 800. For example, any one or combination of blocks of routine 800 may be combined with any one or any combination of blocks in FIGS. 6, 7, and 9. As a non-limiting example of the ability to concurrently perform blocks of the routine 800, it will be understood that the first computing node may concurrently perform, or rearrange the order of, blocks 812-816, blocks 814-818, etc.

End-Block Command Flow

Figure 9:
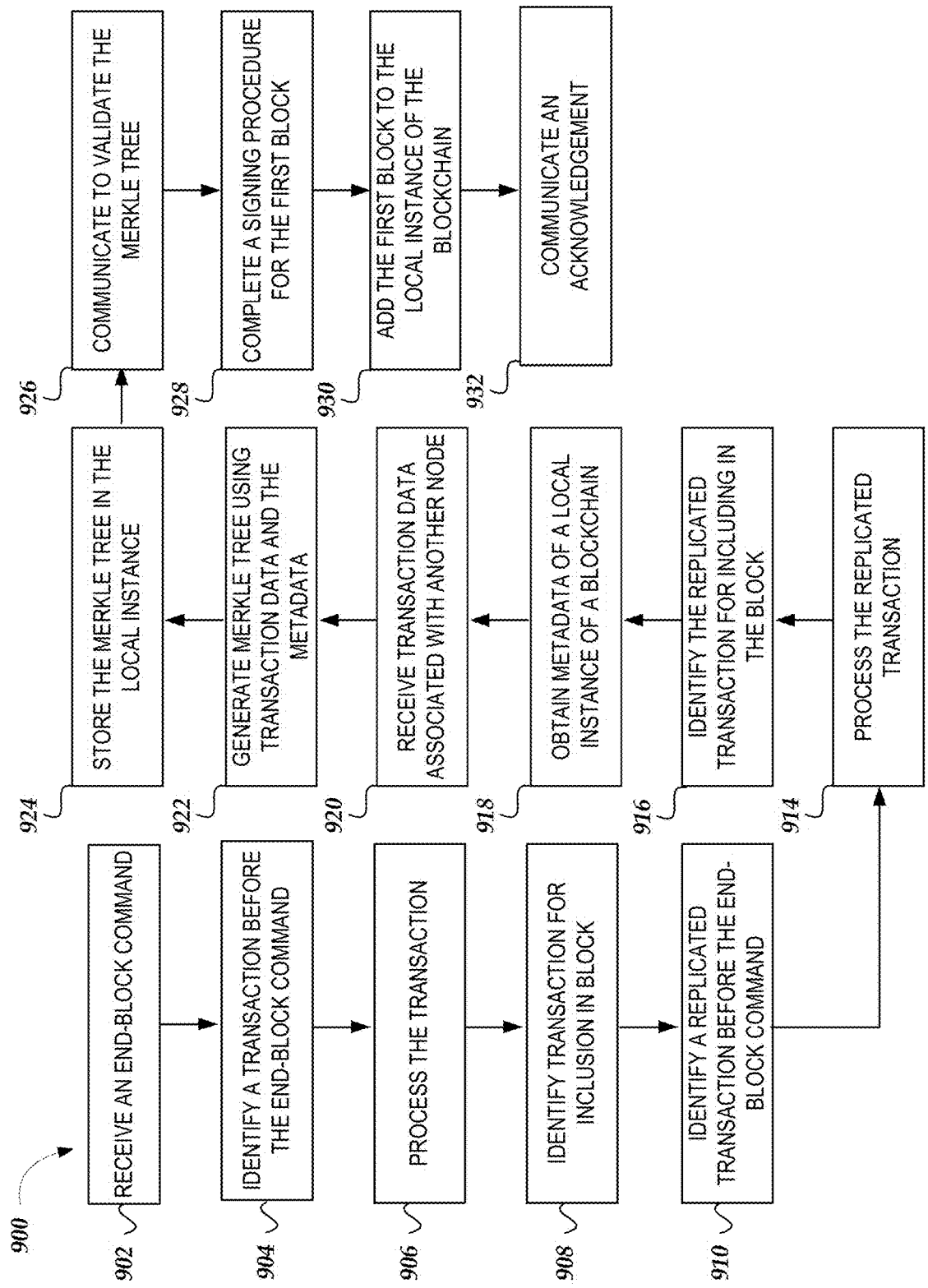
FIG. 9 depicts an illustrative routine for a participant node to process an end-block command for appending blocks to a blockchain, in accordance with embodiments of the present disclosure.

With reference to FIG. 9, an illustrative routine 900 will be described for adding a block to a blockchain in accordance with some embodiments of the present disclosure. The routine 900 can be implemented by a computing node of a plurality of computing nodes that implement the blockchain. The blocks of the routine 900 illustrate example implementations, and in various other implementations various blocks may be rearranged, optional, and/or omitted, and/or additional block may be added. The routine 900 can be implemented by a receiving participant node (e.g., a participant node 210) coordinating with a multi-home consensus node 202 and other participant node(s) 210 to process an end-block command to add a block to the blockchain for maintaining consistency, immutability, security, and/or irrefutability of the blockchain.

At block 902, a first computing node (e.g., participant node 210A) of a plurality of computing nodes of a blockchain system receives an end-block command to add a first block to a blockchain. In some embodiments, the first computing node can receive the end-block command from the multi-home consensus node 202. For example, as described herein, the multi-home consensus node 202 may determine when a block is to be added to a blockchain. Based on the determination to complete a block and add it to the blockchain, the multi-home consensus node can communicate the end-block command to the computing nodes of the blockchain system. The end-block command may be communicated to the computing nodes in a manner similar to other transactions (e.g., via the transaction queue 224). Accordingly, in certain cases, the end-block-command may also be considered an end-block transaction.

As described herein, the multi-home consensus node 202 may generate the end-block command responsive to various triggering events, such as the passing of a specific time interval. Additionally and/or optionally, the multi-home consensus node 202 may generate the end-block command spontaneously to prompt the participant node 210 to initiate an end-block or block creation process at a variable timing. In some cases, the end-block command may cause the first computing node to transition from processing transactions to block finalization, and include processed transactions into the block that is to be created.

At block 904, the first computing node may identify a transaction (a first transaction) received before the end-block command. As described herein, when the first computing node receives the end-block command it may have multiple transactions awaiting processing/execution (e.g., multiple transaction in the transaction queue 224 and/or in the process of being executed). Accordingly, in some cases, the first computing node may identify these "pre-end-block transactions."

At block 906, the first computing node may process (or continue processing) the first transaction. In some cases, the first computing node may process the first transaction similar to the processing of transactions described herein at least with reference to FIGS. 3, 4A, 6, and 8. For example, as part of processing the first transaction, the first computing node may update the local chain data 216 with information about the first transaction and update the local ledger state data 212 based on the first transaction. By processing and/or completing the first transaction, the first computing node may ensure that the first transaction, which was initiated/received before receiving the end-block command or otherwise identified to be included in the block, is processed/completed and can be included in the block of the blockchain that is being generated (e.g., the first block). For example, the first computing node may identify a local single-home transaction that was received (but not yet completed) by the participant node 210 before the participant node 210 received the end-block command from the multi-home consensus node 202 and process it.

At block 908, the first computing node may identify the first transaction for inclusion in the first block. For example, the first computing node may determine that all pre-end-of-block transactions are to be included in the first block. As another example, given that the information of the first transaction is included in the ledger state data 212 before the first block is finalized, the first computing node can determine that the first transaction is to be included in the first block. It will be understood that blocks 904-908 may be repeated for some or all of the pre-end-of-block transactions. Accordingly, some or all of the end-of-block transactions can be included in the first block.

At block 910, the first computing node may identify at least one replicated transaction (a first replicated transaction) received before receiving the end-block command, or otherwise identified for inclusion in the first block (also referred to herein as pre-end-of-block replications). For example, the first computing node may identify the first replicated transaction that was received before the end-block command is received from the replication queue 226.

At block 914, the first computing node may process the replicated transaction. In some cases, the first computing node may process the first replicated transaction similar to the processing of replicated transactions described herein at least with reference to FIGS. 3, 4A, 6, 7, and 8. For example, as part of processing the first replicated transaction, the first computing node may update the local chain data 216 with information about the first replicated transaction and update the local ledger state data 212 based on the first transaction. By processing and/or completing the first replicated transaction received from other computing nodes, the first computing node may ensure that the first replicated transaction is processed and/or completed and can be included in the first block that is to be generated.

At block 916, the first computing node may identify the replicated transaction for inclusion in the first block (e.g., in the local instance of the blockchain). For example, as noted above, the first computing node may ensure that the replicated transaction is included in the first block to the blockchain in the first instance (e.g., the local instance of the blockchain stored in the first computing node) of the blockchain. In some embodiments, the first computing node may determine that all pre-end-of-block replications are to be included in the first block. As another example, given that the information of the first replicated transaction is included in the ledger state data 212 before the first block is finalized, the first computing node can determine that the first replicated transaction is to be included in the first block.

It will be understood that blocks 904-908 may be repeated for some or all of the pre-end-of-block replications. Accordingly, some or all of the end-of-block transactions can be included in the first block. Moreover, it will be understood that blocks 910, 912, and 914 can be performed concurrently or sequentially to blocks 904, 906, and 908.

At block 918, the first computing node may obtain metadata of the local instance of the distributed ledger and/or blockchain. As described herein, each participant node 210 may include a local instance of the distributed ledger and/or blockchain that reflects the transactions and replicated transactions processed by the participant node 210, including the transactions and replicated transaction that have been processed since the last block of the blockchain was created (also referred to herein as the previous block).

In some cases, to generate the next block (also referred to herein as the first block) for the blockchain, the first computing node identifies some or all of the transactions and replicated transactions that it has processed since the last block was generated, including the pre-end-of-block transactions and pre-end-of-block replications. Accordingly, once the pre-end-of-block transactions and pre-end-of-block replications are completed, the first computing node can gather the relevant data (or remaining relevant data) to generate the next block for the blockchain.

In some cases, the metadata obtained from the local instance of the blockchain includes information regarding the transactions (including local home portions of multi-home transactions and/or complete multi-home transaction) and replicated transactions processed by the first computing node. Such metadata may include, but is not limited to, transaction IDs, partial ordering, timestamps, modifications made pursuant to the transactions, or other information that the first computing node may use to generate a Merkle tree.

Accordingly, the blockchain metadata may enable the first computing node to accurately record and/or validate the transactions/replicated transactions to be included in the first block of the blockchain. In some cases, the first computing node may verify the integrity and authenticity of the transactions/replicated transactions using the blockchain metadata, for example, using cryptographic signatures and/or hashes, etc. As such, the first computing node may confirm that the transactions/replicated transactions to be included in the first block have not been tampered with and/or are valid.

At block 920, the first computing node may receive transaction data associated with another computing node. As described herein, the first computing node may receive the transaction data associated with the another computing node from the another computing node and/or from the multi-home consensus node 202.

The transaction data associated with the another computing node may include metadata corresponding to transactions/replicated transactions processed by the another computing node on its local instance of the distributed ledger/blockchain, hashes of transactions, hashes of groups of transactions (e.g., in the event the first computing node does not have permissions/privileges to see the details of transactions processed by the other computing node), and/or a Merkle tree generated by the other computing node. As described herein, the transaction data associated with another computing node and the metadata obtained at block 918 may be used by the first computing node to generate a Merkle tree and/or to validate a Merkle tree. Moreover, although described herein as receiving transaction data associated with another computing node, it will be understood that the first computing node may receive transaction data associated with some or all of the computing nodes of the blockchain system. Accordingly, the first computing node may use the transaction data from some or all of the computing nodes of the blockchain system to validate the transactions for inclusion in the first block and verify that the various computing nodes are including the same transactions using the same partial ordering in their respective blocks of their respective instances of the blockchain.

At block 922, the first computing node may generate a Merkle tree using the transaction data received at block 920 and the metadata obtained at block 918. For example, the first computing node may generate the Merkle tree using the received transaction data associated with the other computing nodes and the obtained metadata of the first instance of the blockchain. As described herein at least with reference to FIGS. 5A and 5B, the Merkle tree may allow for efficient validation that the different computing nodes are including the same transactions (including replicated transactions) in the same block and using the same partial ordering. As described herein, the first computing node may calculate the Merkle tree by hashing individual transactions (e.g., hashing individual single-home transactions), groups of transactions (e.g., some or all single-home transactions processed by the first computing node, some or all multi-home transactions that included the first computing node, etc.), groups of ordered transactions (ordered according to the partial order assigned by the node that owns the transactions) and then hashing the resulting hashes together in a hierarchical manner according to a predetermined order until a single root hash (e.g., a Merkle root) is obtained. In some cases, the order of transactions or order of hashes used may be based on the partial ordering set forth by the respective computing nodes (e.g., single-home transactions of the first computing node ordered based on the order prescribed by the first computing node, single-home transactions of the second computing node ordered based on the order prescribed by the second computing node, etc., and multi-home transactions ordered based on the order prescribed by the multi-home consensus node 202).

Each leaf node of the Merkle tree may represent a hash of an individual transaction or ordered group of transactions (or a value received from another participant node or multi-home consensus node 202, such as when one participant node seeks to obfuscate transaction information from another participant node), and each non-leaf node may represent the hash of its child nodes. The Merkle root (e.g., a global hash) may be a single hash value obtained at the top of the Merkle tree and may represent a cryptographic summary of all transactions included in a block.

It will be understood that each of other nodes of the blockchain system (e.g., other computing nodes and/or the multi-home consensus node 202) may also calculate a Merkle tree in the same way as the first computing. As such, assuming the transactions/replicated transactions are processed appropriately by each node, the Merkle trees calculated by the different computing nodes should be the same and can be used for verification and validation purposes.

At block 924, the first computing node may store the Merkle tree in a local instance (e.g., the first instance) of the blockchain. For example, once calculating or generating the Merkle tree, the first computing node may store the Merkle tree in the local chain data 216 and/or local ledger state data 212 of the first computing node for future verification and/or auditing purposes.

At block 926, the first computing node may communicate with other nodes to validate the Merkle tree. For example, the first computing node and the other computing nodes may share calculated Merkle trees with each other. In some cases, the computing nodes may share the Merkle trees directly (e.g., via the replication queues 226) or via the multi-home consensus node 202. The first computing node may then compare the Merkle tree calculated by itself with a Merkle tree calculated by other computing nodes to verify that the first computing node and other computing nodes processed the same transactions consistently and accurately.

At block 928, the first computing node may complete a signing procedure for the first block. For example, the first computing node may complete the signing procedure for the first block in order to add the first block to a local instance (e.g., stored in the first computing node) of the blockchain. For example, the first computing node may sign the first block using a digital cryptographic signature, and send a confirmation of the signed block (also referred to herein as a block-signed confirmation) to the multi-home consensus node 202 for completing a signing process and the block creation process. In some embodiments, the local signing of the block may include the first computing node generating (e.g., using a cryptographic key) a digital signature for the block to provide cryptographic proof of the block's authenticity and integrity. As described herein, the first computing node may generate the digital signature using any one or any combination of using the Merkle root hash, block ID, block height, previous block ID, timestamp, and a cryptographic key, etc. After locally signing the block, the first computing node may send a confirmation of the signed block to the multi-home consensus node 202. For example, the first computing node may transmit the digital signature and/or other data (e.g., any one or any combination of using the Merkle root hash, block ID, block height, previous block ID, timestamp) related to the first block to the multi-home consensus node 202 for completing the signing process and the block creation process.

The multi-home consensus node 202 may coordinate the other computing nodes signing the block-signed confirmation from the first computing node and the first computing node signing the block-signed confirmations from the other computing nodes. In some embodiments, the multi-home consensus node 202 may collect block-signed confirmations from the first computing node and other computing nodes for verification. For example, the multi-home consensus node 202 may check that the digital signatures are valid (e.g., by applying a public key to decrypt the content of the signature and comparing the result with the content, such as the Merkle tree root, timestamp, block ID, block height, etc., received from the first computing node) and/or that the first computing node and other computing nodes agree on parameters or properties of the first block (e.g., confirm that the computing nodes generated matching Merkle tree roots and have matching block ID and block heights for the first block).

In response to the verification and confirmation, the multi-home consensus node 202 may facilitate completion of the signing process and the block creation process for adding the first block to the blockchain system 200. Facilitating completion may involve sending the block-signed confirmations from all nodes to all other nodes for digital signature, such that all nodes sign the block-signed confirmations generated from every other node, and receiving fully signed confirmations from all the nodes (e.g., block-signed confirmations that have been signed by every node). In this way, the blockchain system 200 may establish that all nodes know that all nodes know the first block was fully agreed upon.

At block 930, the first computing node may add the first block to the local instance of the blockchain. For example, the first computing node may add the first block to the first instance (e.g., stored in the chain data 216 of the participant node 210) of the blockchain. More specifically, the first computing node may complete the signing procedure and add the first block to the chain data 216 to finalize the block creation process. In some cases, transactions related to the signing process or other elements of the end-block process may be included in subsequent blocks.

At block 932, the first computing node may communicate an acknowledgement of completion to the consensus node 202. In some embodiments, the first computing node can confirm to the multi-home consensus node 202 that the validations and signatures have been completed for adding the first block to the blockchain. By completing the block, the first computing node may ensure that the first block is fully validated, signed, and appropriate to be included in the blockchain system 200. Although described herein as being performed by the first computing node, it will be understood that, in some cases, some or all of the computing nodes of a blockchain system may perform the same or similar steps concurrent to the first computing node. Accordingly, some or all computing nodes of a blockchain system can verify the accuracy of each other's work as part of adding a block to the blockchain.

It will be understood that some or all of the computing nodes of a blockchain system may concurrently perform routine 900. In some cases, as the total order of transactions of the respective computing nodes are different, the blocks of the blockchain may differ in their total ordering of the transactions. However, as described herein, despite the different total order of transactions, the computing nodes may rely on the same partial orderings to ensure the same blocks are included in the same block and were processed according to the same partial order.

As described herein, in some cases, as the computing nodes of the blockchain execute routine 900, they may converge their respective instances of the distributed ledger to a consistent "world state." For example, as part of completing the pre-end-of-block transactions and pre-end-of-block replications, the different computing nodes can arrive at a consistent state for the distributed ledger. Once the block is finalized or as it is being finalized, the computing nodes may again begin to process transactions asynchronously. As such the instances of the distributed ledgers may again begin to diverge (until the routine 900 is implemented again as part of the creation of a new block).

Merkle Tree Generating Flow

Figure 10:
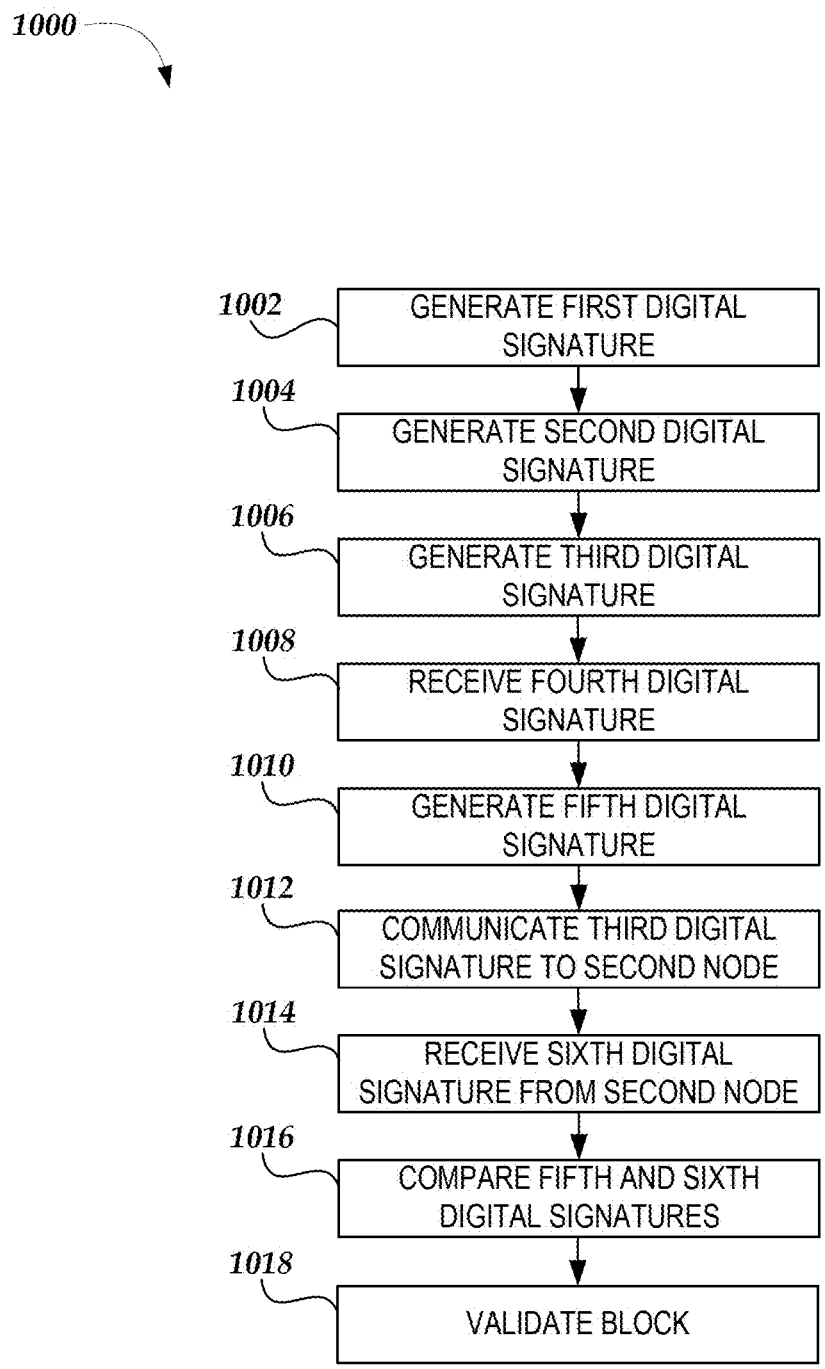
FIG. 10 depicts an illustrative routine for a participant node to generate a Merkle tree, in accordance with embodiments of the present disclosure.

FIG. 10, is a flow diagram illustrating an example routine 1000 for validating a Merkle tree. In some cases, the routine 1000 can be implemented in conjunction with storing a block to a blockchain as described herein at least with reference to FIGS. 5A, 5B, and 9. The routine 1000 can be implemented by a computing node of a plurality of computing nodes that implement a blockchain. The blocks of the routine 1000 illustrate example implementations, and in various other implementations various blocks may be rearranged, optional, and/or omitted, and/or additional block may be added. The routine 1000 can be implemented by a participant node 210 or other computing system (e.g., computing node) to generate and/or validate a Merkle tree.

At block 1002, a first computing node (e.g., a participant node 210) generates a first digital signature. As described herein, the first digital signature may be based on (e.g., generated from or using) a first transaction. The first transaction may be a single-home transaction that is owned/processed by the first computing node and/or a multi-home transaction that includes a local home portion that is owned/processed by the first computing node. In certain cases, the first computing node may generate the first digital signature using a hash function applied to some or all of the content of the first transaction, or other function that can generate a unique identifier from the content of the first transaction.

At block 1004, the first computing node generates a second digital signature. The second digital signature can be generated in a manner similar to the generation of the first digital signature as described in block 1002, albeit using a different transaction that is owned/processed by the first computing node. Similar to the first transaction, the second transaction may be a single-home transaction and/or a multi home transaction that includes a local home portion that is owned/processed by the first computing node.

At block 1006, the first computing node generates a third digital signature. The third digital signature can be generated based on (e.g., directly or indirectly) the first digital signature and the second digital signature. For example, the third digital signature may be generated directly from the first digital signature and the second digital signature by hashing a combination of the first digital signature and the second digital signature. Accordingly, the third digital signature can be dependent on the first digital signature and the second digital signature.

In certain cases, the third digital signature can be generated from the first digital signature and the second digital signature, such as by using digital signatures derived from the first digital signature and the second digital signature. For example one or more intermediary digital signatures may be generated directly using the first digital signature and/or the second digital signature. The third digital signature may be generated from an intermediary digital signature that is itself generated using the first digital signature and/or the second digital signature, or from an intermediary digital signature that is itself generated from another intermediary digital signature. Accordingly the third digital signature may be generated directly from the first digital signature and the second digital signature (e.g., by hashing a combination of the first digital signature and the second digital signature) or generated indirectly from the first digital signature and the second digital signature (e.g., by hashing one or more intermediary digital signatures, at least one of which is generated by hashing the first digital signature and/or the second digital signature).

In some cases, the third digital signature can represent a set of single-home transactions (e.g., generated from the digital signatures of a set of single-home transactions) that are owned or processed by the first computing node. In certain cases, the set of single-home transactions may include some or all of the single-home transactions owned or processed by the first computing node since a previous (last) block was added to the blockchain. In some cases, the third digital signature can represent a set of multi-home transactions (e.g., generated from the digital signatures of a set of multi-home transactions) that include a local home portion that is owned or processed by the first computing node. In certain cases, the set of multi-home transactions may include some or all of the multi-home transactions that include a local home portion owned or processed by the first computing node since a previous block was added to the blockchain. In some cases, the third digital signature can represent a set of multi-home transactions and/or single-home transactions.

As described herein, in some cases, a computing node may want to obfuscate the details of one or more transactions from another computing node. As described herein, the first computing node may use the third digital signature to obfuscate the set of transactions (single-home and/or multi-home) from another computing node (e.g., by communicating the third digital signature to the other computing node without communicating the details or content of the underlying transactions, thereby enabling the other computing node to generate a consistent Merkle tree). Accordingly, the second computing node may be unable to determine the number or content of transactions used by the first computing node to generate the third digital signature.

At block 1008, the first computing node receives a fourth digital signature from a second computing node. The fourth digital signature can be generated by the second computing node in a manner similar to which the first computing node generates the third digital signature. Accordingly, the fourth digital signature can represent a set of one or more transactions (single-home transaction, multi-home transaction, or combination thereof) processed or owned by the second computing node. In certain cases, the fourth digital signature may represent some or all single-home transactions and/or multi-home transactions that the second computing node has processed since the previous block of the blockchain (e.g., single-home transactions and/or multi-home transactions with a local portion owned and/or processed by the second computing node). As described herein, the first computing node may receive the fourth digital signature but may not receive the transactions to which the fourth digital signature corresponds. Accordingly, the first computing node may be unable to determine the number or content of transactions used by the second computing node to generate the fourth digital signature.

Although referred to as receiving a fourth digital signature, it will be understood that the first computing node may receive multiple (fourth) digital signatures representing different sets of transactions owned and/or processed by the second computing node. For example, the first computing node may receive one or more digital signatures representing one or more sets of single-home transactions owned and/or processed by the second computing node and/or one or more digital signatures representing one or more different sets of multi-home transactions that include a local home portion owned and/or processed by the second computing node (e.g., one or more sets that involve the second computing node and one or more different sets of other nodes but do not include the first computing node), etc.

At block 1010, the first computing node generates a fifth digital signature. The fifth digital signature may be based on the third digital signature and the fourth digital signature similar to the manner in which the third digital signature is based on the first digital signature and the second digital signature. Accordingly, the fifth digital signature may be generated directly from the third digital signature and the fourth digital signature (e.g., by applying a hash to a combination of one or both of the third digital signature and the fourth digital signature) or may be generated indirectly from the third digital signature and the fourth digital signature (e.g., by applying a hash to one or more intermediary digital signatures, at least one of which is generated directly from the third digital signature and/or the fourth digital signature). Accordingly, the fifth digital signature can be dependent on the first digital signature, the second digital signature, the third digital signature, and the fourth digital signature. As described herein, the fifth digital signature may be generated without access to the transactions used to generate the fourth digital signature by the second computing node. In some cases, the fifth digital signature can correspond to a root hash of a Merkle tree and/or may represent some or all the transactions that have been processed by the processing nodes of a distributed ledger system since a previous block was added to the blockchain.

Although referred to as the fifth digital signature, it will be understood that the fifth digital signature may be based on many (e.g., tens, hundreds or more) digital signatures. For example, as illustrated in FIG. 5B, a first computing node may generate hashes for some or each single-home transaction and some or each multi-home transaction that includes a local home portion that is owned or processed by the first computing node. These transaction-level hashes may be used to generate hashes representing some or all single-home transactions owned or processed by the first computing node and some or all multi-home transaction that includes a local home portion that is owned or processed by the first computing node, respectively. Similarly, the first computing node may receive hashes corresponding to single-home transactions owned or processed by each other computing node of the system, respectively, and hashes corresponding to multi-home transactions that do not include a local home portion that is owned or processed by the first computing node, respectively (but are owned by other computing nodes of the system). Some or all of the generated hashes and/or received hashes may be used (directly or indirectly) to generate the fifth digital signature (e.g., as the root of a Merkle tree).

At block 1012, the first computing node communicates the third digital signature to the second computing node. As described herein, as the third digital signature may represent a set of transactions, the first computing node may use it to obfuscate the details of the set of transactions from another computing node. Accordingly, the first computing node may communicate the third digital signature to the second computing node without communicating the underlying transactions or their content to the second computing node. In this way, the second computing node may not have access to the first transaction, the second transaction, or any other transaction used (directly or indirectly) to generate the third digital signature.

Although referred to as sharing the third digital signature, it will be understood that the first computing node may communicate multiple (third) digital signatures representing different sets of transactions to the third computing node. For example, the first computing node may send one or more digital signatures representing one or more sets of single-home transactions to the second computing node and/or one or more digital signatures representing one or more different sets of multi-home transactions to the second computing node (e.g., one or more sets that involve the first computing node and one or more different sets of other nodes but do not include the second computing node), etc.

As described herein, the second computing node may use the third digital signature to generate a sixth digital signature. The sixth digital signature can be generated by the second computing node in a manner similar to which the first computing node generates the fifth digital signature as described herein with reference to block 1010. Accordingly, the sixth digital signature may correspond to a root hash of a Merkle tree generated by the second computing node and/or may correspond to some or all of the transactions processed by any of the computing nodes of the system since a previous (e.g., the last) block was added to the blockchain. In some cases, the fifth digital signature and sixth digital signature can be generated using a common or same process. For example, the process may indicate an order for generating the digital signatures and the order of dependencies for the digital signatures. By following the same process and/or order, the first and second computing nodes can increase the likelihood that the fifth digital signature and sixth digital signature will match.

At block 1014, the first computing node receives the sixth digital signature from the second computing node. As described herein, as part of an end-block command the computing nodes can share their digital signatures (e.g., root hashes). Accordingly, the first computing node may also send the fifth digital signature to the second computing node so that the second computing node can verify the fifth digital signature.

At block 1016, the first computing node compares the fifth and sixth digital signatures. As described herein, the first computing node can compare the values of the digital signatures to see if they match. Non-matching digital signature can indicate that different processing nodes have different transactions or that data was modified. As such, if the fifth and sixth digital signatures do not match, an error can be generated. If there is an error, additional digital signatures can be compared (e.g., from the leaf nodes or intermediary nodes of the Merkle tree) to identify the location where the data is different.

At block 1018, the first computing node validates a block based on the comparison of the fifth digital signature and the sixth digital signature. As described herein, matching digital signatures can indicate that the digital signatures were generated using the same data in the same order (e.g., the order of the data or digital signatures when it was used to generate the digital signature was the same). Moreover, matching digital signatures can indicate that the transactions to be included on the blockchain are the same. As described herein, given the asynchronous nature of the system the order of the transactions in the block may be different (but the order in which they are used to create the digital signature may be the same).

Fewer, more, or different blocks may be used in the routine 1000. For example, the routine 1000 may further include the digitally signing the generated Merkle tree (e.g., using a cryptographic key), signing the block that is to be stored on the blockchain and saving the block to the blockchain, etc. In certain cases, the digital signatures communicated between nodes may not be generated from transactions. For example, if a computing node has not processed any single-home transactions or multi-home transactions with another computing node, it may share a predefined number or generated number as the digital signature (e.g., as the third digital signature and/or fourth digital signature). By sharing a predefined or generated number that is not generated using the content of transactions, the computing node that shares the predefined or generated number may avoid providing information to another computing node that would enable the other computing node to determine that there were no single-home transactions processed and/or no multi-home transactions between a particular set of computing nodes.

As another example, the first computing node may share its third digital signature with some or all of the computing nodes of the system. The other computing nodes may use the third digital signature to generate their own (root) digital signatures. Similarly, other nodes may share one or more digital signatures that they generate based on single-home transactions that they own/process and/or multi-home transactions that include a local home portion that they own/process, and the first computing node may use the received digital signatures (directly or indirectly) to generate the fifth digital signature (e.g., the root digital signature). Moreover, the first computing node and other computing nodes may exchange the digital signatures without sharing the content of the underlying transactions. Accordingly, the other computing nodes may generate their (root) digital signatures without access to the first transaction, the second, or other transactions used to generate the third digital signature, the transactions used to generate the fourth digital signature (by the second computing node), etc. Likewise, the first computing node may generate the fifth digital signature without access to the transactions owned/processed by the other computing nodes.

Accordingly, as a non-limiting example and with reference to a third computing node, the third computing node can generate a seventh digital signature corresponding to a set of transactions that it does not want to share with (or wants to obfuscate from) the first computing node and send the seventh digital signature to the first computing node. The first computing node may use the seventh digital signature (directly or indirectly) to generate the fifth digital signature (without access to the transactions used to generate the seventh digital signature). Similarly, the first computing node may share the third digital signature or some other digital signature that represents a set of transaction that it does not want to share with the third computing node (the set of which may be different from the set that is not shared with the second computing node). The third computing node may use the third digital signature (or whichever digital signature the first computing node shares) to generate an eighth digital signature (e.g., its own root digital signature).

The first computing node can share the fifth digital signature with the third computing node to enable the third computing node to validate the fifth digital signature (by comparing the two digital signatures) and the third computing node can share the eighth digital signature with the first computing node to enable the first computing node to validate the eighth digital signature (by comparing the two digital signatures) as part of a block signing process.

Validating External Data

The systems and processes described herein may also be used to validate the content of files in a hierarchical file structure that uses linked data files to track the content/location of the data. As a non-limiting, Apache Iceberg uses multiple layers of files to manage the location and content of underlying data. Specifically, an Iceberg catalog references (e.g., includes a link or pointer to) a metadata file, which in turn references (e.g., includes a link or pointer to) one or more manifest lists, each of which may reference (e.g., includes a link or pointer to) one or more manifest files, each of which may reference (e.g., includes a link or pointer to) one or more data files in which data is stored. In certain cases, the metadata files, manifest lists, manifest files, and data files are configured to be immutable once they are added to the file structure.

In some cases, to validate the underlying data of a hierarchical file structure in which one file includes references to other files (and so on except for the bottom-level files), the system may generate a digital signature corresponding to the top-level file for inclusion in a block of a blockchain. To generate the digital signature for the top-level file (e.g., the metadata file in Iceberg or the Iceberg catalog file), the system may retrieve the top-level file, and then recursively obtain/store/buffer the data in the file and follow any links/pointers to sub-files. Once there are no more links (e.g., the system has reached the bottom file layer), the system can generate digital signatures of the individual files such that the system generates a digital signature for the bottom file layer, any intermediate level files, and the top level file.

In some cases, the system may generate the digital signature for a particular file (also referred to as a target file) using a hash of the content of the target file and the digital signatures of the files for which the target file has a link/pointer (e.g., the directly subordinate files or children files). For example, the system may hash the content of the target file and the digital signatures of the children files to generate the digital signature (e.g., a cryptographic hash) for the target file. For the bottom-level files, the system may generate the digital signature based (only) on the content of the target file and/or without any digital signatures of children files (e.g., because the bottom-level files do not include links to additional files and/or do not have any children files).

As the digital signatures of the intermediate files are dependent upon the digital signatures of the children files, the digital signature for the top-level file may be dependent on the digital signatures (and content) of all the files from which it depends (e.g., the files that it has links to, the files that its children files link to, and so on). Accordingly, the digital signature for the top-level file may be similar to a root hash for a Merkle tree and may be used to validate the immutability of the content of the file structure (e.g., confirm that no changes have been made). To facilitate this validation, a link to the top-level file and the digital signature for the top-level file may be stored in the blockchain.

To validate the content of the file structure, the system may follow the link stored in the blockchain, generate a digital signature for the top-level file in the same way that the original digital signature was generated (e.g., traversing the file structure and generating digital signatures for the different data files, where digital signatures for intermediate files are dependent on the digital signatures of child files), and compare the generated digital signature with the digital signature that was stored on the blockchain. If the digital signatures match, the system can determine that the corresponding data has not been altered.

Example Computing System

Figure 11:
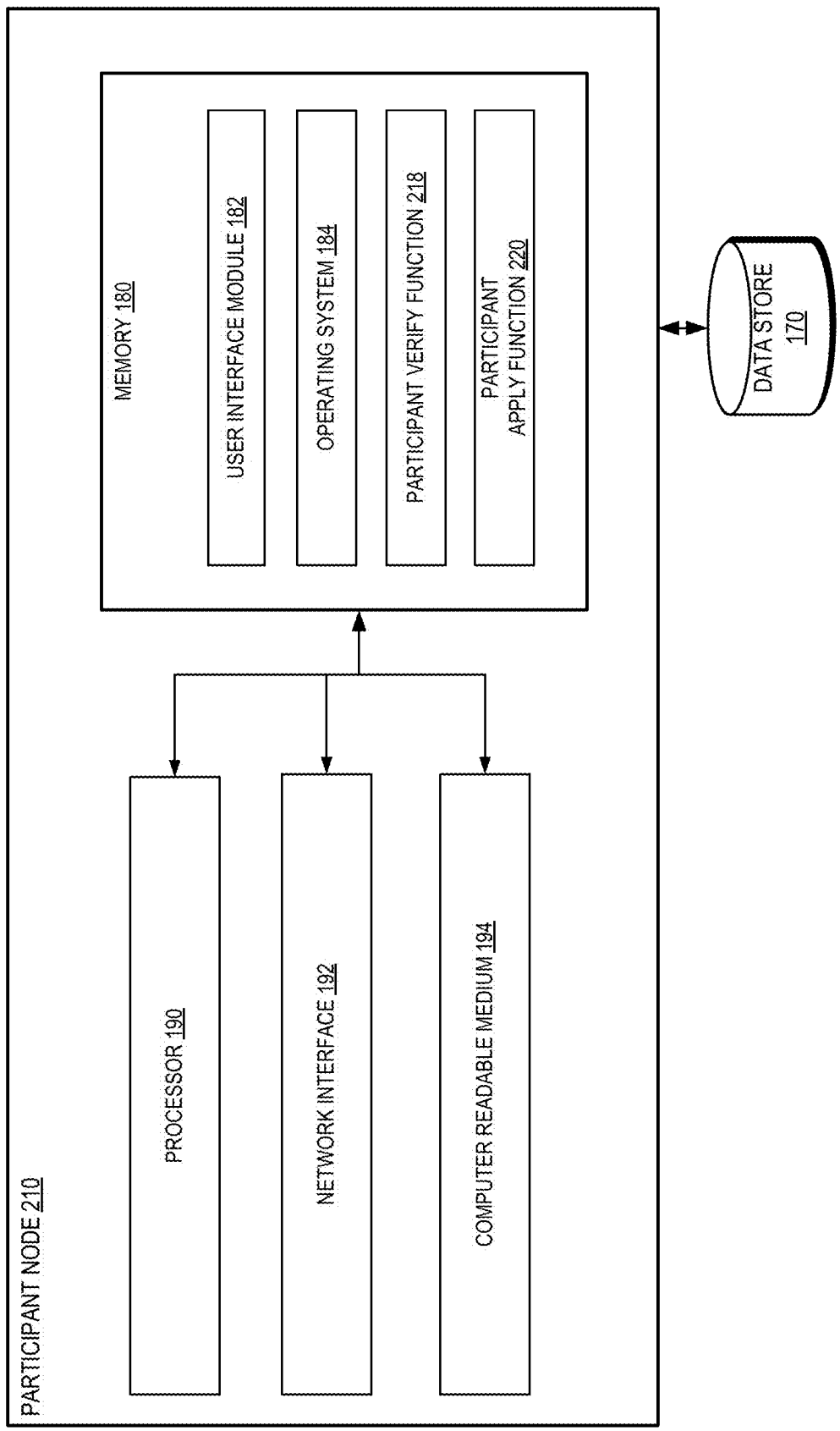
FIG. 11 depicts an example architecture of a computing system that can be used to perform one or more of the techniques described herein.

FIG. 11 depicts an example architecture of a computing system (e.g., participant node 210, multi-home consensus node 202, and/or computing node) that can be used to perform one or more of the techniques described herein or illustrated in FIGS. 1-9. The general architecture of the participant node 210 depicted in FIG. 11 includes an arrangement of computer hardware and software modules that may be used to implement one or more aspects of the present disclosure. The participant node 210 may include many more (or fewer) elements than those shown in FIG. 11. It is not necessary, however, that all of these elements be shown in order to provide an enabling disclosure. As illustrated, the participant node 210 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of participant node 210. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include participant verify function 218 and a participant apply function 220 to conduct blockchain operations as noted above. While not shown in FIG. 11, the memory 180 may additionally or alternatively include functions of a consensus node 202, such as a consensus verify function 206 and a consensus apply function 208. These modules, individually or in combination, may implement aspects of the disclosure discussed above. As noted above, the participant node 210 may be implemented by or under control of a trusted cloud provider providing verified immutability and execution of various blockchain functions, and particularly of the functions of the consensus node 202. In this way, implementation of blockchain functions on the consensus node 202 may be trusted by participants of the blockchain, even if such participants lack trust among one another.

While modules of FIG. 11 are shown as part of a participant node 210, in other embodiments, all or a portion of these modules may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the participant node 210. In some instances, a participant node 210 may be implemented as one or more virtualized devices, such as one or more virtual machines 117 on the compute servers 115. Moreover, as noted above, a participant node 210 may be implemented in whole or part as a distributed computing system including a collection of devices that collectively implement the functions discussed herein. When implemented as part of a cloud provider network 120, the account-level resources associated with a participant node 210 may be associated with a particular account under control, e.g., of an entity participating in a blockchain. Alternatively, account-level resources associated with a participant node 210 may be associated with a cloud provider, or with a third-party service provider operating to provide blockchains on behalf of end users. In some instances, different account-level resources associated with a participant node 210 may be associated with different accounts. For example, storage resources (e.g., chain data 216 and chain adjacent data 214) may be associated with an account of an end user, while compute resources (e.g., the participant verify function 218 and participant apply function 220) may be associated with a cloud provider, or with a third-party service provider. While FIG. 11 is depicted as a participant node 210, a similar device may be used to implement other elements of FIGS. 1-2. For example, a device having a similar configuration may be used to implement a consensus node 202.

Example Clauses

Various example embodiments of the disclosure can be described by the following clauses:

Clause 1. A computer-implemented method to asynchronously update data associated with a blockchain, the computer-implemented method comprising:
    obtaining, by a first computing node of a plurality of computing nodes implementing the blockchain, a proposed transaction to the blockchain, the proposed transaction including a modification to first data of a distributed ledger represented by the blockchain;
    verifying that the first computing node is authorized to modify the first data;
    in response to verifying that the first computing node is authorized to modify the first data, modifying the first data in a first instance of the distributed ledger in accordance with the proposed transaction without obtaining approval from other computing nodes of the plurality of computing nodes; and
    communicating a notification to a second computing node of the plurality of computing nodes that the first computing node has modified the first data, wherein responsive to receiving the notification, the second computing node asynchronously modifies a second instance of the distributed ledger.

Clause 2. The computer-implemented method of Clause 1, further comprising:
    determining that the proposed transaction is a part of a multi-node transaction.

Clause 3. The computer-implemented method of Clause 2, wherein the notification comprises a hash of the modification.

Clause 4. The computer-implemented method of Clause 2, further comprising:
    in response to determining that the proposed transaction is the part of the multi-node transaction and prior to modifying the first data in the first instance of the distributed ledger in accordance with the proposed transaction,
identifying at least one other transaction queued to access the first instance of the distributed ledger;
completing the at least one other transaction; and
locking the first data in the first instance of the distributed ledger from one or more other modifications.

Clause 5. The computer-implemented method of Clause 4, further comprising:
upon completion of modifying the first data in the first instance of the distributed ledger in accordance with the proposed transaction, unlocking the first data in the first instance of the distributed ledger for the one or more other modifications.

Clause 6. The computer-implemented method of Clause 1, wherein the first computing node obtains the proposed transaction from the second computing node.

Clause 7. The computer-implemented method of Clause 1, further comprising:
determining that the second computing node is authorized to receive the notification,
wherein communicating the notification to the second computing node that the first computing node has modified the first data comprises communicating the notification to the second computing node that the first computing node has modified the first data responsive to determining that the second computing node is authorized to receive the notification.

Clause 8. The computer-implemented method of Clause 7, wherein to asynchronously modify the second instance of the distributed ledger, the second computing node asynchronously modifies the first data in the second instance of the distributed ledger based on an order assigned by the first computing node.

Clause 9. The computer-implemented method of Clause 1, further comprising:
determining that a third computing node is not authorized to receive the notification regarding the modification to the first data; and
responsive to determining that the third computing node is not authorized to receive the notification regarding the modification to the first data, withhold the notification from the third computing node.

Clause 10. The computer-implemented method of Clause 1, further comprising:
receiving, from the second computing node, a plurality of replicated transactions, the plurality of replicated transactions corresponding to a plurality of modifications made to the second instance of the distributed ledger by the second computing node,
wherein the plurality of replicated transactions includes an order.

Clause 11. The computer-implemented method of Clause 10, further comprising:
for at least a first replicated transaction of the plurality of replicated transactions, responsive to receiving the first replicated transaction, confirming that the second computing node was authorized to make a corresponding modification to the second instance of the distributed ledger.

Clause 12. The computer-implemented method of Clause 11, further comprising:
responsive to confirming that the second computing node was authorized to make the corresponding modification to the second instance of the distributed ledger, updating the first instance of the distributed ledger based on the order and the corresponding modification.

Clause 13. The computer-implemented method of Clause 1, further comprising:
receiving, from the second computing node, a first plurality of replicated transactions, the first plurality of replicated transactions corresponding to a first plurality of modifications made to the second instance of the distributed ledger by the second computing node, wherein the first plurality of replicated transactions includes a first order; and
receiving, from a third computing node, a second plurality of replicated transactions, the second plurality of replicated transactions corresponding to a second plurality of modifications to a third instance of the distributed ledger on the third computing node, wherein the second plurality of replicated transactions includes a second order.

Clause 14. The computer-implemented method of Clause 13, further comprising:
updating the first instance of the distributed ledger based on the first order and the first plurality of replicated transactions; and
updating the first instance of the distributed ledger based on the second order and the second plurality of replicated transactions.

Clause 15. A computing system comprising:
a data store of a hosted computing environment, the data store storing computer-executable code hosted by the hosted computing environment, wherein the hosted computing environment verifies immutability of the computer-executable code; and
one or more processors of the hosted computing environment configured to execute the computer-executable code, wherein execution of the computer-executable code by the one or more processors causes the computing system, acting as a first computing node a plurality of computing nodes implementing a blockchain, to:
obtain, by the first computing node of the plurality of computing nodes implementing the blockchain, a proposed transaction to the blockchain, the proposed transaction including a modification to first data of a distributed ledger represented by the blockchain;
verify that the first computing node is authorized to modify the first data;
in response to verifying that the first computing node is authorized to modify the first data, modify the first data in a first instance of the distributed ledger in accordance with the proposed transaction without obtaining approval from other computing nodes of the plurality of computing nodes; and
communicate a notification to a second computing node of the plurality of computing nodes that the first computing node has modified the first data, wherein responsive to receiving the notification, the second computing node asynchronously modifies a second instance of the distributed ledger.

Clause 16. The computing system of Clause 15, wherein the execution of the computer-executable code further causes the computing system to:
determine that the second computing node is authorized to receive the notification,
wherein communicating the notification to the second computing node that the first computing node has modified the first data comprises communicating the notification to the second computing node that the first computing node has modified the first data responsive to determining that the second computing node is authorized to receive the notification.

Clause 17. The computing system of Clause 15, wherein the execution of the computer-executable code further causes the computing system to:
  receive, from the second computing node, a first plurality of replicated transactions, the first plurality of replicated transactions corresponding to a first plurality of modifications made to the second instance of the distributed ledger by the second computing node, wherein the first plurality of replicated transactions includes a first order; and
  receive, from a third computing node, a second plurality of replicated transactions, the second plurality of replicated transactions corresponding to a second plurality of modifications to a third instance of the distributed ledger on the third computing node, wherein the second plurality of replicated transactions includes a second order.

Clause 18. The computing system of Clause 17, wherein the execution of the computer-executable code further causes the computing system to:
  update the first instance of the distributed ledger based on the first order and the first plurality of replicated transactions; and
  update the first instance of the distributed ledger based on the second order and the second plurality of replicated transactions.

Clause 19. One or more non-transitory computer-readable media comprising computer-executable code hosted by a hosted computing environment, wherein the hosted computing environment verifies immutability of the computer-executable code, and wherein the computer-executable code, when executed by one or more processors of the hosted computing environment acting as a first computing node of a plurality of computing nodes implementing a blockchain, causes the hosted computing environment to:
  obtain, by the first computing node of the plurality of computing nodes implementing the blockchain, a proposed transaction to the blockchain, the proposed transaction including a modification to first data of a distributed ledger represented by the blockchain;
  verify that the first computing node is authorized to modify the first data;
  in response to verifying that the first computing node is authorized to modify the first data, modify the first data in a first instance of the distributed ledger in accordance with the proposed transaction without obtaining approval from other computing nodes of the plurality of computing nodes; and
  communicate a notification to a second computing node of the plurality of computing nodes that the first computing node has modified the first data, wherein responsive to receiving the notification, the second computing node asynchronously modifies a second instance of the distributed ledger.

Clause 20. The one or more non-transitory computer-readable media of Clause 19, wherein the computer-executable code, when executed by the one or more processors of the hosted computing environment acting as the first computing node of the plurality of computing nodes, further causes the hosted computing environment to:
  determine that the proposed transaction is a part of a multi-node transaction;
  in response to determining that the proposed transaction is the part of the multi-node transaction and prior to modifying the first data in the first instance of the distributed ledger in accordance with the proposed transaction,
  identify at least one other transaction queued to access the first instance of the distributed ledger;
  complete the at least one other transaction; and
  lock the first data in the first instance of the distributed ledger from one or more other modifications.

Various additional example embodiments of the disclosure can be described by the following additional clauses:

Clause 1. A computer-implemented method to asynchronously update data associated with a distributed ledger, the computer-implemented method comprising:
  obtaining, at a first computing node of a plurality of computing nodes of a blockchain system, a replicated transaction,
    wherein the replicated transaction indicates a modification to first data in a first instance of the distributed ledger at the first computing node,
    wherein the replicated transaction corresponds to a first transaction received by a second computing node of the plurality of computing nodes and used by the second computing node to modify the first data in a second instance of the distributed ledger at the second computing node,
    wherein the replicated transaction indicates an order for executing the replicated transaction relative to other replicated transactions corresponding to the second computing node;
  verifying that the second computing node was authorized to modify the first data in the second instance of the distributed ledger; and
  based on determination that the second computing node was authorized to modify the first data in the second instance of the distributed ledger, modifying the first instance of the distributed ledger according to the order of the replicated transaction relative to the other replicated transactions corresponding to the second computing node.

Clause 2. The computer-implemented method of Clause 1, further comprising:
  verifying that the first computing node is authorized to modify the first data in the first instance of the distributed ledger, wherein modifying the first instance of the distributed ledger according to the order of the replicated transaction comprises modifying the first data in the first instance of the distributed ledger according to the order of the replicated transaction responsive to verifying that the first computing node is authorized to modify the first data in the first instance.

Clause 3. The computer-implemented method of Clause 1, wherein the replicated transaction comprises a hash generated using the first transaction, wherein modifying the first instance of the distributed ledger comprises storing the hash as part of the distributed ledger.

Clause 4. The computer-implemented method of Clause 1, wherein the replicated transaction is communicated to at least a third computing node, and wherein responsive to receipt of the replicated transaction, the third computing node modifies the first data in a third instance of the distributed ledger at the third computing node.

Clause 5. The computer-implemented method of Clause 1, wherein the replicated transaction is a first replicated transaction and the order is a first order, the computer-implemented method further comprising:
  obtaining, at the first computing node, a second replicated transaction, wherein the second replicated transaction indicates a modification to second data in the first instance of the distributed ledger, wherein the second replicated transaction corresponds to a second transaction received by a third computing node of the plurality of computing nodes and used by the third computing node to modify the second data in a third instance of the distributed ledger at the third computing node, wherein the second replicated transaction indicates a second order for executing the second replicated transaction relative to other second replicated transactions corresponding to the third computing node;

verifying that the third computing node was authorized to modify the second data in the third instance of the distributed ledger; and based on determination that the third computing node was authorized to modify the second data in the third instance of the distributed ledger, modifying the second data in the first instance of the distributed ledger according to the second order of the second replicated transaction relative to the other second replicated transactions corresponding to the third computing node.

Clause 6. The computer-implemented method of Clause 5, wherein the first order and the second order are different.

Clause 7. The computer-implemented method of Clause 1, wherein the first transaction is a multi-node transaction, and wherein the replicated transaction corresponds to a first portion of the multi-node transaction, the computer-implemented method further comprising:

receiving, at the first computing node, a second replicated transaction, wherein the second replicated transaction indicates a modification to second data in the first instance of the distributed ledger, wherein the second replicated transaction corresponds to a second portion of the multi-node transaction received by a third computing node of the plurality of computing nodes and used by the third computing node to modify the second data in a third instance of the distributed ledger at the third computing node, wherein the second replicated transaction indicates the order for executing the second replicated transaction;

verifying that the third computing node was authorized to modify the second data in the third instance of the distributed ledger; and based on determination that the third computing node was authorized to modify the second data in the third instance of the distributed ledger, modifying the second data in the first instance of the distributed ledger according to the order of the second replicated transaction relative to the other replicated transactions corresponding to the third computing node.

Clause 8. The computer-implemented method of Clause 1, wherein the first transaction is a multi-node transaction, and wherein the replicated transaction corresponds to a first portion of the multi-node transaction, the computer-implemented method further comprising:

receiving, from the second computing node, a second portion of the multi-node transaction, the second portion of the multi-node transaction including a modification to second data in the first instance of the distributed ledger;

verifying that the first computing node is authorized to modify the second data; and in response to verifying that the first computing node is authorized to modify the second data, modifying the second data in the first instance of the distributed ledger in accordance with the second portion of the multi-node transaction without obtaining approval from other computing nodes of the plurality of computing nodes.

Clause 9. The computer-implemented method of Clause 8, further comprising:

communicating a notification to the second computing node of the plurality of computing nodes that the first computing node has modified the second data, wherein responsive to receiving the notification, the second computing node asynchronously modifies the second instance of the distributed ledger.

Clause 10. A computing system comprising:

a data store of a hosted computing environment, the data store storing computer-executable code hosted by the hosted computing environment, wherein the hosted computing environment verifies immutability of the computer-executable code; and one or more processors of the hosted computing environment configured to execute the computer-executable code, wherein execution of the computer-executable code by the one or more processors causes the computing system, acting as a first computing node a plurality of computing nodes implementing a blockchain, to:

obtain, at the first computing node of the plurality of computing nodes of a blockchain system, a replicated transaction, wherein the replicated transaction indicates a modification to first data in a first instance of a distributed ledger represented by the blockchain at the first computing node, wherein the replicated transaction corresponds to a first transaction received by a second computing node of the plurality of computing nodes and used by the second computing node to modify the first data in a second instance of the distributed ledger at the second computing node, wherein the replicated transaction indicates an order for executing the replicated transaction relative to other replicated transactions corresponding to the second computing node;

verify that the second computing node was authorized to modify the first data in the second instance of the distributed ledger; and based on determination that the second computing node was authorized to modify the first data in the second instance of the distributed ledger, modify the first instance of the distributed ledger according to the order of the replicated transaction relative to the other replicated transactions corresponding to the second computing node.

Clause 11. The computing system of Clause 10, wherein the execution of the computer-executable code further causes the computing system to:

verify that the first computing node is authorized to modify the first data in the first instance of the distributed ledger, wherein modifying the first instance of the distributed ledger according to the order of the replicated transaction comprises modifying the first data in the first instance of the distributed ledger according to the order of the replicated transaction responsive to verifying that the first computing node is authorized to modify the first data in the first instance.

Clause 12. The computing system of Clause 10, wherein the replicated transaction is a first replicated transaction and the order is a first order, and wherein the execution of the computer-executable code further causes the computing system to:
  obtain, at the first computing node, a second replicated transaction,
    wherein the second replicated transaction indicates a modification to second data in the first instance of the distributed ledger,
    wherein the second replicated transaction corresponds to a second transaction received by a third computing node of the plurality of computing nodes and used by the third computing node to modify the second data in a third instance of the distributed ledger at the third computing node,
    wherein the second replicated transaction indicates a second order for executing the second replicated transaction relative to other second replicated transactions corresponding to the third computing node;
  verify that the third computing node was authorized to modify the second data in the third instance of the distributed ledger; and
  based on determination that the third computing node was authorized to modify the second data in the third instance of the distributed ledger, modify the second data in the first instance of the distributed ledger according to the second order of the second replicated transaction relative to the other second replicated transactions corresponding to the third computing node.

Clause 13. The computing system of Clause 10, wherein the first transaction is a multi-node transaction, wherein the replicated transaction corresponds to a first portion of the multi-node transaction, and wherein the execution of the computer-executable code further causes the computing system to:
  receive, at the first computing node, a second replicated transaction,
    wherein the second replicated transaction indicates a modification to second data in the first instance of the distributed ledger,
    wherein the second replicated transaction corresponds to a second portion of the multi-node transaction received by a third computing node of the plurality of computing nodes and used by the third computing node to modify the second data in a third instance of the distributed ledger at the third computing node,
    wherein the second replicated transaction indicates the order for executing the second replicated transaction;
  verify that the third computing node was authorized to modify the second data in the third instance of the distributed ledger; and
  based on determination that the third computing node was authorized to modify the second data in the third instance of the distributed ledger, modify the second data in the first instance of the distributed ledger according to the order of the second replicated transaction relative to the other replicated transactions corresponding to the third computing node.

Clause 14. The computing system of Clause 10, wherein the first transaction is a multi-node transaction, and wherein the replicated transaction corresponds to a first portion of the multi-node transaction, and wherein the execution of the computer-executable code further causes the computing system to:
  receive, from the second computing node, a second portion of the multi-node transaction, the second portion of the multi-node transaction including a modification to second data in the first instance of the distributed ledger;
  verify that the first computing node is authorized to modify the second data; and
  in response to verifying that the first computing node is authorized to modify the second data, modify the second data in the first instance of the distributed ledger in accordance with the second portion of the multi-node transaction without obtaining approval from other computing nodes of the plurality of computing nodes.

Clause 15. The computing system of Clause 14, wherein the execution of the computer-executable code further causes the computing system to:
  communicate a notification to the second computing node of the plurality of computing nodes that the first computing node has modified the second data, wherein responsive to receiving the notification, the second computing node asynchronously modifies the second instance of the distributed ledger.

Clause 16. One or more non-transitory computer-readable media comprising computer-executable code hosted by a hosted computing environment, wherein the hosted computing environment verifies immutability of the computer-executable code, and wherein the computer-executable code, when executed by one or more processors of the hosted computing environment acting as a first computing node of a plurality of computing nodes implementing a blockchain, causes the hosted computing environment to:
  obtain, at the first computing node of the plurality of computing nodes of a blockchain system, a replicated transaction,
    wherein the replicated transaction indicates a modification to first data in a first instance of a distributed ledger represented by the blockchain at the first computing node,
    wherein the replicated transaction corresponds to a first transaction received by a second computing node of the plurality of computing nodes and used by the second computing node to modify the first data in a second instance of the distributed ledger at the second computing node,
    wherein the replicated transaction indicates an order for executing the replicated transaction relative to other replicated transactions corresponding to the second computing node;
  verify that the second computing node was authorized to modify the first data in the second instance of the distributed ledger; and
  based on determination that the second computing node was authorized to modify the first data in the second instance of the distributed ledger, modify the first instance of the distributed ledger according to the order of the replicated transaction relative to the other replicated transactions corresponding to the second computing node.

Clause 17. The one or more non-transitory computer-readable media of Clause 16, wherein the computer-executable code, when executed by the one or more processors of the hosted computing environment acting as the first computing node of the plurality of computing nodes, further causes the hosted computing environment to:
  verify that the first computing node is authorized to modify the first data in the first instance of the distributed ledger, wherein modifying the first instance of the distributed ledger according to the order of the replicated transaction comprises modifying the first data in the first instance of the distributed ledger according to the order of the replicated transaction responsive to verifying that the first computing node is authorized to modify the first data in the first instance.

Clause 18. The one or more non-transitory computer-readable media of Clause 16, wherein the replicated transaction is a first replicated transaction and the order is a first order, and wherein the computer-executable code, when executed by the one or more processors of the hosted computing environment acting as the first computing node of the plurality of computing nodes, further causes the hosted computing environment to:
  obtain, at the first computing node, a second replicated transaction,
    wherein the second replicated transaction indicates a modification to second data in the first instance of the distributed ledger,
    wherein the second replicated transaction corresponds to a second transaction received by a third computing node of the plurality of computing nodes and used by the third computing node to modify the second data in a third instance of the distributed ledger at the third computing node,
    wherein the second replicated transaction indicates a second order for executing the second replicated transaction relative to other second replicated transactions corresponding to the third computing node;
  verify that the third computing node was authorized to modify the second data in the third instance of the distributed ledger; and
  based on determination that the third computing node was authorized to modify the second data in the third instance of the distributed ledger, modify the second data in the first instance of the distributed ledger according to the second order of the second replicated transaction relative to the other second replicated transactions corresponding to the third computing node.

Clause 19. The one or more non-transitory computer-readable media of Clause 16, wherein the first transaction is a multi-node transaction, wherein the replicated transaction corresponds to a first portion of the multi-node transaction, and wherein the computer-executable code, when executed by the one or more processors of the hosted computing environment acting as the first computing node of the plurality of computing nodes, further causes the hosted computing environment to:
  receive, from the second computing node, a second portion of the multi-node transaction, the second portion of the multi-node transaction including a modification to second data in the first instance of the distributed ledger;
  verify that the first computing node is authorized to modify the second data; and
  in response to verifying that the first computing node is authorized to modify the second data, modify the second data in the first instance of the distributed ledger in accordance with the second portion of the multi-node transaction without obtaining approval from other computing nodes of the plurality of computing nodes.

Clause 20. The one or more non-transitory computer-readable media of Clause 19, wherein the computer-executable code, when executed by the one or more processors of the hosted computing environment acting as the first computing node of the plurality of computing nodes, further causes the hosted computing environment to:
  communicate a notification to the second computing node of the plurality of computing nodes that the first computing node has modified the second data, wherein responsive to receiving the notification, the second computing node asynchronously modifies the second instance of the distributed ledger.

Various example embodiments of the disclosure can be described by the following clauses Clause 1. A computer-implemented method to asynchronously update data associated with a blockchain, the computer-implemented method comprising:
  obtaining, by a first computing node of a plurality of computing nodes, a proposed transaction for the blockchain;
  determining that the proposed transaction includes a first modification to first data in a first instance of a distributed ledger and stored on the first computing node and a second modification to second data in a second instance of the distributed ledger stored on a second computing node;
  verifying that the first computing node is authorized to modify the first data;
  sending a request to a multi-home node for authorization to initiate the proposed transaction;
  receiving authorization to initiate the proposed transaction;
  in response to receiving the authorization:
    modifying the first data in the first instance of the distributed ledger without obtaining approval from other computing nodes of the plurality of computing nodes, and
    asynchronously communicating at least the second modification to the second data in the second instance of the distributed ledger to the second computing node, wherein the second computing node asynchronously modifies the second data in the second instance of the distributed ledger in accordance with at least the second modification without obtaining approval from other computing nodes of the plurality of computing nodes; and
    notifying the multi-home node that the first modification was completed, wherein the second computing node notifies the multi-home node that the second modification was completed.

Clause 2. The computer-implemented method of Clause 1, further comprising:
  asynchronously communicating, to the second computing node, a first notification that the first computing node modified the first data.

Clause 3. The computer-implemented method of Clause 2, wherein the first notification includes the first modification.

Clause 4. The computer-implemented method of Clause 2, wherein the second computing node uses the first notification to asynchronously update the first data in the second instance of the distributed ledger.

Clause 5. The computer-implemented method of Clause 1, further comprising: asynchronously transmitting, to a third computing node, a first notification that the first computing node modified the first data.

Clause 6. The computer-implemented method of Clause 5, wherein the third computing node uses the first notification to asynchronously update the first data in a third instance of the distributed ledger.

Clause 7. The computer-implemented method of Clause 6, wherein the third computing node uses a second notification received from the second computing node to asynchronously update the second data in the third instance of the distributed ledger represented.

Clause 8. The computer-implemented method of Clause 5, wherein the first notification includes a hash generated using at least the first modification to the first data.

Clause 9. The computer-implemented method of Clause 1, further comprising:
  determining that a third computing node is not authorized to receive a notification regarding the first modification; and
  responsive to determining that the third computing node is not authorized to receive the notification about the first modification, withhold the notification from the third computing node.

Clause 10. The computer-implemented method of Clause 1, wherein the proposed transaction is obtained from the second computing node, a third computing node, or a user.

Clause 11. The computer-implemented method of Clause 1, further comprising:
  prior to modifying the first data in the first instance of the distributed ledger and communicating at least the second modification to the second computing node,
    identifying, based on an ordering received from the multi-home node, at least one other transaction queued to access the first instance of the distributed ledger; and
    completing the at least one other transaction.

Clause 12. The computer-implemented method of Clause 11, wherein the at least one other transaction involves at least one of the first computing node or the second computing node.

Clause 13. The computer-implemented method of Clause 1, further comprising:
  receiving, from the second computing node, a notification that the second computing node modified the second data; and
  responsive to receiving the notification, modifying the second data in the first instance of the distributed ledger.

Clause 14. A computing system comprising:
  a data store of a hosted computing environment, the data store storing computer-executable code hosted by the hosted computing environment, wherein the hosted computing environment verifies immutability of the computer-executable code; and
  one or more processors of the hosted computing environment configured to execute the computer-executable code, wherein execution of the computer-executable code by the one or more processors causes the computing system, acting as a first computing node a plurality of computing nodes implementing a blockchain, to:
    obtain, by the first computing node of the plurality of computing nodes, a proposed transaction for the blockchain;
    determine that the proposed transaction includes a first modification to first data in a first instance of a distributed ledger and stored on the first computing node and a second modification to second data in a second instance of the distributed ledger stored on a second computing node;
    verify that the first computing node is authorized to modify the first data;
    send a request to a multi-home node for authorization to initiate the proposed transaction;
    receive authorization to initiate the proposed transaction;
    in response to receiving the authorization:
      modify the first data in the first instance of the distributed ledger without obtaining approval from other computing nodes of the plurality of computing nodes, and
      asynchronously communicate at least the second modification to the second data in the second instance of the distributed ledger to the second computing node, wherein the second computing node asynchronously modifies the second data in the second instance of the distributed ledger in accordance with at least the second modification without obtaining approval from other computing nodes of the plurality of computing nodes; and
    notify the multi-home node that the first modification was completed, wherein the second computing node notifies the multi-home node that the second modification was completed.

Clause 15. The computing system of Clause 14, wherein the execution of the computer-executable code further causes the computing system to:
  determine that a third computing node is not authorized to receive a notification regarding the first modification; and
  responsive to determining that the third computing node is not authorized to receive the notification about the first modification, withhold the notification from the third computing node.

Clause 16. The computing system of Clause 14, wherein the execution of the computer-executable code further causes the computing system to:
  prior to modifying the first data in the first instance of the distributed ledger and communicating at least the second modification to the second computing node,
    identify, based on an ordering received from the multi-home node, at least one other transaction queued to access the first instance of the distributed ledger; and
    complete the at least one other transaction.

Clause 17. The computing system of Clause 14, wherein the execution of the computer-executable code further causes the computing system to:
  receive, from the second computing node, a notification that the second computing node modified the second data; and
  responsive to receiving the notification, modify the second data in the first instance of the distributed ledger.

Clause 18. One or more non-transitory computer-readable media comprising computer-executable code hosted by a hosted computing environment, wherein the hosted computing environment verifies immutability of the computer-executable code, and wherein the computer-executable code, when executed by one or more processors of the hosted computing environment acting as a first computing node of a plurality of computing nodes implementing a blockchain, causes the hosted computing environment to:
  obtain, by the first computing node of the plurality of computing nodes, a proposed transaction for the blockchain;
  determine that the proposed transaction includes a first modification to first data in a first instance of a distributed ledger and stored on the first computing node and a second modification to second data in a second instance of the distributed ledger stored on a second computing node;
  verify that the first computing node is authorized to modify the first data;
  send a request to a multi-home node for authorization to initiate the proposed transaction;

receive authorization to initiate the proposed transaction;
in response to receiving the authorization:
modify the first data in the first instance of the distributed ledger without obtaining approval from other computing nodes of the plurality of computing nodes, and
asynchronously communicate at least the second modification to the second data in the second instance of the distributed ledger to the second computing node, wherein the second computing node asynchronously modifies the second data in the second instance of the distributed ledger in accordance with at least the second modification without obtaining approval from other computing nodes of the plurality of computing nodes; and
notify the multi-home node that the first modification was completed, wherein the second computing node notifies the multi-home node that the second modification was completed.

Clause 19. The one or more non-transitory computer-readable media of Clause 18, wherein the computer-executable code, when executed by the one or more processors of the hosted computing environment acting as the first computing node of the plurality of computing nodes, further causes the hosted computing environment to:
determine that a third computing node is not authorized to receive a notification regarding the first modification; and
responsive to determining that the third computing node is not authorized to receive the notification about the first modification, withhold the notification from the third computing node.

Clause 20. The one or more non-transitory computer-readable media of Clause 18, wherein the computer-executable code, when executed by the one or more processors of the hosted computing environment acting as the first computing node of the plurality of computing nodes, further causes the hosted computing environment to:
receive, from the second computing node, a notification that the second computing node modified the second data; and
responsive to receiving the notification, modify the second data in the first instance of the distributed ledger.

Various example embodiments of the disclosure can be described by the following clauses:

Clause 1. A computer-implemented method to add a first block to a blockchain, the computer-implemented method comprising:
receiving, at a first computing node of a plurality of computing nodes, an end-block command to add a first block to the blockchain;
identifying at least one transaction received before the end-block command;
modifying a first instance of a distributed ledger represented by the blockchain based on the at least one transaction;
identifying the at least one transaction for inclusion in the first block in the first instance of the distributed ledger;
identifying at least one replicated transaction received from a second computing node of the plurality of computing nodes before the end-block command;
modifying the first instance of the distributed ledger based on the at least one replicated transaction;
identifying the at least one replicated transaction for inclusion in the first block in the first instance of the distributed ledger;
obtaining first metadata of the first instance of the distributed ledger, the first metadata associated with a first plurality of transactions executed by the first computing node on the first instance of the distributed ledger;
obtaining transaction data associated with the second computing node, wherein the transaction data associated with the second computing node includes second metadata corresponding to a second plurality of transactions executed by the second computing node on a second instance of the distributed ledger;
generating a Merkle tree based on the transaction data associated with the second computing node and the first metadata of the first instance of the distributed ledger;
storing the Merkle tree in the first instance of the distributed ledger;
communicating with at least the second computing node to validate the Merkle tree;
completing a signing procedure for the first block; and
adding the first block to the first instance of the distributed ledger.

Clause 2. The computer-implemented method of Clause 1, further comprising:
determining that the at least one transaction includes a first modification to first data in the first instance of the distributed ledger stored on the first computing node and a second modification to second data in the second instance of the distributed ledger stored on the second computing node; and
asynchronously communicating at least the second modification to the second data in the second instance of the distributed ledger to the second computing node, wherein the second computing node asynchronously modifies the second data in the second instance of the distributed ledger in accordance with the second modification without obtaining approval from other computing nodes of the plurality of computing nodes,
wherein modifying the first instance of the distributed ledger based on the at least one transaction comprises modifying the first data in the first instance of the distributed ledger in accordance with the first modification without obtaining approval from other computing nodes of the plurality of computing nodes.

Clause 3. The computer-implemented method of Clause 2, further comprising:
communicating a notification to a third computing node of the plurality of computing nodes that the first computing node has modified the first data, wherein responsive to receiving the notification, the third computing node asynchronously modifies a third instance of the distributed ledger.

Clause 4. The computer-implemented method of Clause 1, wherein the first metadata includes an ordering of the first plurality of transactions, wherein generating the Merkle tree comprises generating the Merkle tree using the transaction data, the first metadata of the first instance of the distributed ledger, and the ordering of the first plurality of transactions.

Clause 5. The computer-implemented method of Clause 4, wherein the ordering of the first plurality of transactions is assigned by the first computing node.

Clause 6. The computer-implemented method of Clause 1:
wherein the transaction data includes at least one hash generated using at least one of the second plurality of transactions,
wherein generating the Merkle tree further comprises generating the Merkle tree using the at least one hash.

Clause 7. The computer-implemented method of Clause 1, wherein the transaction data includes a hash generated using the second plurality of transactions, and wherein generating the Merkle tree further comprises generating the Merkle tree using the hash.

Clause 8. The computer-implemented method of Clause 1, wherein the transaction data includes an ordering of the second plurality of transactions, and wherein generating the Merkle tree comprises generating the Merkle tree using the transaction data, the first metadata of the first instance of the distributed ledger, and the ordering of the second plurality of transactions.

Clause 9. The computer-implemented method of Clause 8, wherein the ordering of the second plurality of transactions is assigned by the second computing node.

Clause 10. The computer-implemented method of Clause 6, wherein generating the Merkle tree further comprises generating the Merkle tree using the second plurality of transactions.

Clause 11. The computer-implemented method of Clause 1:
wherein the first metadata includes a first ordering of the first plurality of transactions,
wherein the first ordering is assigned by the first computing node
wherein the second metadata includes a second ordering of the second plurality of transactions, wherein the second ordering is different from the first ordering,
wherein the second ordering is assigned by the second computing node,
wherein generating the Merkle tree comprises generating the Merkle tree using the first plurality of transactions ordered according to the first ordering and the second plurality of transactions ordered according to the second ordering.

Clause 12. The computer-implemented method of Clause 1, wherein the transaction data is received from the second computing node.

Clause 13. The computer-implemented method of Clause 1, wherein the transaction data is received from a multi-home consensus node that is different from the second computing node.

Clause 14. The computer-implemented method of Clause 1, wherein generating the Merkle tree further comprises generating the Merkle tree according to an order prescribed by a multi-home node that is different from the second computing node.

Clause 15. A computing system comprising:
a data store of a hosted computing environment, the data store storing computer-executable code hosted by the hosted computing environment, wherein the hosted computing environment verifies immutability of the computer-executable code; and
one or more processors of the hosted computing environment configured to execute the computer-executable code, wherein execution of the computer-executable code by the one or more processors causes the computing system, acting as a first computing node a plurality of computing nodes implementing a blockchain, to:
receive, at the first computing node of the plurality of computing nodes, an end-block command to add a first block to the blockchain;
identify at least one transaction received before the end-block command;
modify a first instance of a distributed ledger represented by the blockchain based on the at least one transaction;
identify the at least one transaction for inclusion in the first block in the first instance of the distributed ledger;
identify at least one replicated transaction received from a second computing node of the plurality of computing nodes before the end-block command;
modify the first instance of the distributed ledger based on the at least one replicated transaction;
identify the at least one replicated transaction for inclusion in the first block in the first instance of the distributed ledger;
obtain first metadata of the first instance of the distributed ledger, the first metadata associated with a first plurality of transactions executed by the first computing node on the first instance of the distributed ledger;
obtain transaction data associated with the second computing node, wherein the transaction data associated with the second computing node includes second metadata corresponding to a second plurality of transactions executed by the second computing node on a second instance of the distributed ledger;
generate a Merkle tree based on the transaction data associated with the second computing node and the first metadata of the first instance of the distributed ledger;
store the Merkle tree in the first instance of the distributed ledger;
communicate with at least the second computing node to validate the Merkle tree;
complete a signing procedure for the first block; and
add the first block to the first instance of the distributed ledger.

Clause 16. The computing system of Clause 15, wherein the execution of the computer-executable code further causes the computing system to:
determine that the at least one transaction includes a first modification to first data in the first instance of the distributed ledger stored on the first computing node and a second modification to second data in the second instance of the distributed ledger stored on the second computing node; and
asynchronously communicate at least the second modification to the second data in the second instance of the distributed ledger to the second computing node, wherein the second computing node asynchronously modifies the second data in the second instance of the distributed ledger in accordance with the second modification without obtaining approval from other computing nodes of the plurality of computing nodes,
wherein modifying the first instance of the distributed ledger based on the at least one transaction comprises modifying the first data in the first instance of the distributed ledger in accordance with the first modification without obtaining approval from other computing nodes of the plurality of computing nodes.

Clause 17. The computing system of Clause 16, wherein the execution of the computer-executable code further causes the computing system to:
communicate a notification to a third computing node of the plurality of computing nodes that the first computing node has modified the first data, wherein responsive to receiving the notification, the third computing node asynchronously modifies a third instance of the distributed ledger.

Clause 18. The computing system of Clause 16, wherein the transaction data includes an ordering of the second plurality of transactions, and wherein generating the Merkle tree comprises generating the Merkle tree using the transaction data, the first metadata of the first instance of the distributed ledger, and the ordering of the second plurality of transactions.

Clause 19. One or more non-transitory computer-readable media comprising computer-executable code hosted by a hosted computing environment, wherein the hosted computing environment verifies immutability of the computer-executable code, and wherein the computer-executable code, when executed by one or more processors of the hosted computing environment acting as a first computing node of a plurality of computing nodes implementing a blockchain, causes the hosted computing environment to:
  receive, at the first computing node of the plurality of computing nodes, an end-block command to add a first block to the blockchain;
  identify at least one transaction received before the end-block command;
  modify a first instance of a distributed ledger represented by the blockchain based on the at least one transaction;
  identify the at least one transaction for inclusion in the first block in the first instance of the distributed ledger;
  identify at least one replicated transaction received from a second computing node of the plurality of computing nodes before the end-block command;
  modify the first instance of the distributed ledger based on the at least one replicated transaction;
  identify the at least one replicated transaction for inclusion in the first block in the first instance of the distributed ledger;
  obtain first metadata of the first instance of the distributed ledger, the first metadata associated with a first plurality of transactions executed by the first computing node on the first instance of the distributed ledger;
  obtain transaction data associated with the second computing node, wherein the transaction data associated with the second computing node includes second metadata corresponding to a second plurality of transactions executed by the second computing node on a second instance of the distributed ledger;
  generate a Merkle tree based on the transaction data associated with the second computing node and the first metadata of the first instance of the distributed ledger;
  store the Merkle tree in the first instance of the distributed ledger;
  communicate with at least the second computing node to validate the Merkle tree;
  complete a signing procedure for the first block; and
  add the first block to the first instance of the distributed ledger.

Clause 20. The one or more non-transitory computer-readable media of Clause 19:
  wherein the first metadata includes a first ordering of the first plurality of transactions,
  wherein the first ordering is assigned by the first computing node
  wherein the second metadata includes a second ordering of the second plurality of transactions, wherein the second ordering is different from the first ordering,
  wherein the second ordering is assigned by the second computing node,
  wherein generating the Merkle tree comprises generating the Merkle tree using the first plurality of transactions ordered according to the first ordering and the second plurality of transactions ordered according to the second ordering.

Various example embodiments of the disclosure can be described by the following clauses:

Clause 1. A computer-implemented method to validate transactions processed by distinct computing nodes:
  generating, at a first computing node, a first digital signature based on a first transaction processed by a first computing node
  generating a second digital signature based on a second transaction processed by the first computing node
  generating a third digital signature based on the first digital signature and the second digital signature;
  receiving a fourth digital signature from a second computing node, wherein the fourth digital signature is based on a plurality of digital signatures generated by the second computing node, wherein the plurality of digital signatures correspond to a plurality of transactions processed by the second computing node;
  generating a fifth digital signature based on the third digital signature and the fourth digital signature;
  communicating the third digital signature to the second computing node, wherein the second computing node generates a sixth digital signature based on the third digital signature and the fourth digital signature;
  receiving the sixth digital signature from the second computing node;
  comparing the fifth digital signature with the sixth digital signature; and
  based on a determination that the fifth digital signature matches the sixth digital signature, validating a block for a blockchain, wherein the block corresponds to the first transaction, the second transaction, and the plurality of transactions.

Clause 2. The method of Clause 1, wherein generating the first digital signature based on the first transaction comprises generating a first hash value using the first transaction and a hash function.

Clause 3. The method of Clause 1, wherein the first digital signature is a first hash value and the second digital signature is a second hash value, wherein generating the third digital signature based on the first digital signature and the second digital signature comprises generating a third hash value using the first hash value and the hash value.

Clause 4. The method of Clause 1, wherein the first computing node and the second computing node form at least a portion of a distributed ledger system.

Clause 5. The method of Clause 1, wherein validating the block comprises validating the block without access to the content of the plurality of transactions used to generate the fourth digital signature.

Clause 6. The method of Clause 1, wherein generating the fifth digital signature comprises generating the fifth digital signature without access to the content of the plurality of transactions used to generate the fourth digital signature.

Clause 7. The method of Clause 1, wherein the second computing node generates the sixth digital signature without access to the content of the first transaction or the second transaction.

Clause 8. The method of Clause 1, wherein the plurality of transactions is a first plurality of transactions, the method further comprising:
  receiving a seventh digital signature from a third computing node, wherein the seventh digital signature is based on a second plurality of digital signatures generated by the third computing node, wherein the second plurality of digital signatures correspond to a second plurality of transactions processed by the third computing node, wherein generating the fifth digital signature comprises generating the fifth digital signature based on the third digital signature, the fourth digital signature, and the seventh digital signature.

Clause 9. The method of Clause 8, wherein generating the fifth digital signature comprises generating the fifth digital signature without access to the content of the first plurality of transactions used to generate the fourth digital signature and without access to the content of the second plurality of transactions used to generate the seventh digital signature.

Clause 10. The method of Clause 8, further comprising communicating the third digital signature to the third computing node, wherein the third computing node generates an eighth digital signature based on the third digital signature, the fourth digital signature, and the seventh digital signature.

Clause 11. The method of Clause 1, wherein the third computing node generates the eighth digital signature without access to the content of the first plurality of transactions used to generate the fourth digital signature and without access to the content of the first transaction or the second transaction.

Clause 12. A computing system comprising:
a data store of a hosted computing environment, the data store storing computer-executable code hosted by the hosted computing environment; and
one or more processors of the hosted computing environment configured to execute the computer-executable code, wherein execution of the computer-executable code by the one or more processors causes the computing system, acting as a first computing node of a plurality of computing nodes implementing a blockchain, to:
generate a first digital signature based on a first transaction processed by the first computing node
generate a second digital signature based on a second transaction processed by the first computing node
generate a third digital signature based on the first digital signature and the second digital signature;
receive a fourth digital signature from a second computing node, wherein the fourth digital signature is based on a plurality of digital signatures generated by the second computing node, wherein the plurality of digital signatures correspond to a plurality of transactions processed by the second computing node;
generate a fifth digital signature based on the third digital signature and the fourth digital signature;
communicate the third digital signature to the second computing node, wherein the second computing node generates a sixth digital signature based on the third digital signature and the fourth digital signature;
receive the sixth digital signature from the second computing node;
compare the fifth digital signature with the sixth digital signature; and
based on a determination that the fifth digital signature matches the sixth digital signature, validate a block for a blockchain, wherein the block corresponds to the first transaction, the second transaction, and the plurality of transactions.

Clause 13. The system of Clause 12, wherein the plurality of transactions is a first plurality of transactions, wherein the computer-executable code further cause the computing system to:
receive a seventh digital signature from a third computing node, wherein the seventh digital signature is based on a second plurality of digital signatures generated by the third computing node, wherein the second plurality of digital signatures correspond to a second plurality of transactions processed by the third computing node,
wherein to generate the fifth digital signature, the computer-executable code further cause the computing system to generate the fifth digital signature based on the third digital signature, the fourth digital signature, and the seventh digital signature.

Clause 14. The system of Clause 13, wherein to generate the fifth digital signature the computer-executable code further cause the computing system to generate the fifth digital signature without access to the content of the first plurality of transactions used to generate the fourth digital signature and without access to the content of the second plurality of transactions used to generate the seventh digital signature.

Clause 15. The system of Clause 13, the wherein computer-executable code further cause the computing system to communicate the third digital signature to the third computing node, wherein the third computing node generates an eighth digital signature based on the third digital signature, the fourth digital signature, and the seventh digital signature.

Clause 16. The system of Clause 13, wherein the third computing node generates the eighth digital signature without access to the content of the first plurality of transactions used to generate the fourth digital signature and without access to the content of the first transaction or the second transaction.

Clause 17. One or more non-transitory computer-readable media comprising computer-executable code hosted by a hosted computing environment, wherein the computer-executable code, when executed by one or more processors of the hosted computing environment acting as a first computing node of a plurality of computing nodes implementing a blockchain, causes the hosted computing environment to:
generate a first digital signature based on a first transaction processed by the first computing node
generate a second digital signature based on a second transaction processed by the first computing node
generate a third digital signature based on the first digital signature and the second digital signature;
receive a fourth digital signature from a second computing node, wherein the fourth digital signature is based on a plurality of digital signatures generated by the second computing node, wherein the plurality of digital signatures correspond to a plurality of transactions processed by the second computing node;
generate a fifth digital signature based on the third digital signature and the fourth digital signature;
communicate the third digital signature to the second computing node, wherein the second computing node generates a sixth digital signature based on the third digital signature and the fourth digital signature;
receive the sixth digital signature from the second computing node;
compare the fifth digital signature with the sixth digital signature; and
based on a determination that the fifth digital signature matches the sixth digital signature, validate a block for a blockchain, wherein the block corresponds to the first transaction, the second transaction, and the plurality of transactions.

Clause 18. The one or more non-transitory computer-readable media of Clause 17, wherein the plurality of transactions is a first plurality of transactions, wherein computer-executable code further cause the hosted computing environment to:

receive a seventh digital signature from a third computing node, wherein the seventh digital signature is based on a second plurality of digital signatures generated by the third computing node, wherein the second plurality of digital signatures correspond to a second plurality of transactions processed by the third computing node, wherein to generate the fifth digital signature, the computer-executable code further cause the hosted computing environment to generate the fifth digital signature based on the third digital signature, the fourth digital signature, and the seventh digital signature.

Clause 19. The one or more non-transitory computer-readable media of Clause 18, wherein to generate the fifth digital signature, the computer-executable code further cause the hosted computing environment generate the fifth digital signature without access to the content of the first plurality of transactions used to generate the fourth digital signature and without access to the content of the second plurality of transactions used to generate the seventh digital signature.

Clause 20. The one or more non-transitory computer-readable media of Clause 18, wherein the computer-executable code further cause the hosted computing environment to communicate the third digital signature to the third computing node, wherein the third computing node generates an eighth digital signature based on the third digital signature, the fourth digital signature, and the seventh digital signature.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

Additional details regarding some embodiments of the present disclosure are provided by the attached appendices. Statements made in the attached appendices should be understood to apply to the embodiments discussed in the respective appendix, and should not be construed as applying to all embodiments of the present disclosure.

What is claimed is:

1. A computer-implemented method to add a first block to a blockchain, the computer-implemented method implemented by a first computing node of a plurality of computing nodes implementing the blockchain and comprising:
   receiving, at the first computing node of the plurality of computing nodes, an end-block command to add the first block to the blockchain;
   identifying at least one transaction received before the end-block command;
   modifying a first instance of a distributed ledger represented by the blockchain based on the at least one transaction;
   identify the at least one transaction for inclusion in the first block in the first instance of the distributed ledger;
   identifying at least one replicated transaction received from a second computing node of the plurality of computing nodes before the end-block command;
   modifying the first instance of the distributed ledger based on the at least one replicated transaction;
   identify the at least one replicated transaction for inclusion in the first block in the first instance of the distributed ledger;
   obtaining first metadata of the first instance of the distributed ledger, the first metadata associated with a first plurality of transactions executed by the first computing node on the first instance of the distributed ledger, wherein the first plurality of transactions modify a first set of data objects indicated within the blockchain as owned by the first computing node;
   obtaining transaction data associated with the second computing node, wherein the transaction data associated with the second computing node includes second metadata corresponding to a second plurality of transactions executed by the second computing node on a second instance of the distributed ledger, wherein the second plurality of transactions modify a second set of data objects indicated within the blockchain as owned by the second computing node;
   generating a Merkle tree based on the transaction data associated with the second computing node and the first metadata of the first instanceof the distributed ledger, wherein the Merkle tree is generated according to (i) a first computation order, for the first plurality of transactions modifying the first set of data objects indicated within the blockchain as owned by the first computing node, that is prescribed by the first computing node that is indicated within the blockchain as owning the first set of data objects and (ii) a second computation order, for the second plurality of transactions modifying the second set of data objects indicated within the blockchain as owned by the second computing node, that is prescribed by the second computing node that is indicated within the blockchain as owning the second instance;
   storing the Merkle tree in the first instance of the distributed ledger;
   communicating with at least the second computing node to validate the Merkle tree;
   completing a signing procedure for the first block; and
   adding the first block to the first instance of the distributed ledger,
   wherein the blockchain is federated and non-public.

2. The computer-implemented method of claim 1, further comprising:
   determining that the at least one transaction includes a first modification to first data in the first instance of the distributed ledger stored on the first computing node and a second modification to second data in the second instance of the distributed ledger stored on the second computing node; and
   asynchronously communicating at least the second modification to the second data in the second instance of the distributed ledger to the second computing node, wherein the second computing node asynchronously modifies the second data in the second instance of the distributed ledger in accordance with the second modification without obtaining approval from other computing nodes of the plurality of computing nodes,
   wherein modifying the first instance of the distributed ledger based on the at least one transaction comprises modifying the first data in the first instance of the distributed ledger in accordance with the first modification without obtaining approval from other computing nodes of the plurality of computing nodes.

3. The computer-implemented method of claim 2, further comprising:
   communicating a notification to a third computing node of the plurality of computing nodes that the first computing node has modified the first data, wherein responsive to receiving the notification, the third computing node asynchronously modifies a third instance of the distributed ledger.

4. The computer-implemented method of claim 1, wherein the first metadata includes the first computation order for the first plurality of transactions, wherein generating the Merkle tree comprises generating the Merkle tree using the transaction data, the first metadata of the first instance of the distributed ledger, and the first computation order for the first plurality of transactions.

5. The computer-implemented method of claim 1:
wherein the transaction data includes at least one hash generated using at least one of the second plurality of transactions,
wherein generating the Merkle tree further comprises generating the Merkle tree using the at least one hash.

6. The computer-implemented method of claim 1, wherein the transaction data includes a hash generated using the second plurality of transactions, and wherein generating the Merkle tree further comprises generating the Merkle tree using the hash.

7. The computer-implemented method of claim 1, wherein the transaction data includes the second computation order for the second plurality of transactions, and wherein generating the Merkle tree comprises generating the Merkle tree using the transaction data, the first metadata of the first instance of the distributed ledger, and the second computation order for the second plurality of transactions.

8. The computer-implemented method of claim 5, wherein generating the Merkle tree further comprises generating the Merkle tree using the second plurality of transactions.

9. The computer-implemented method of claim 1:
wherein the first metadata includes the first computation order for the first plurality of transactions,
wherein the second metadata includes the second computation order for the second plurality of transactions,
wherein generating the Merkle tree comprises generating the Merkle tree using the first plurality of transactions ordered according to the first computation order and the second plurality of transactions ordered according to the second computation order for.

10. The computer-implemented method of claim 1, wherein the transaction data is received from the second computing node.

11. The computer-implemented method of claim 1, wherein the transaction data is received from a multi-home consensus node that is different from the second computing node.

12. The computer-implemented method of claim 1, wherein generating the Merkle tree further comprises generating the Merkle tree according to an order prescribed by a multi-home node that is different from the second computing node.

13. A computing system comprising:
a data store of a hosted computing environment, the data store storing computer-executable code hosted by the hosted computing environment; and
one or more processors of the hosted computing environment configured to execute the computer-executable code, wherein execution of the computer-executable code by the one or more processors causes the computing system, acting as a first computing node of a plurality of computing nodes implementing a blockchain, to:

receive, at the first computing node of the plurality of computing nodes, an end-block command to add a first block to the blockchain;
identify at least one transaction received before the end-block command;
modify a first instance of a distributed ledger represented by the blockchain based on the at least one transaction;
identify the at least one transaction for inclusion in the first block in the first instance of the distributed ledger;
identify at least one replicated transaction received from a second computing node of the plurality of computing nodes before the end-block command;
modify the first instance of the distributed ledger based on the at least one replicated transaction;
identify the at least one replicated transaction for inclusion in the first block in the first instance of the distributed ledger;
obtain first metadata of the first instance of the distributed ledger, the first metadata associated with a first plurality of transactions executed by the first computing node on the first instance of the distributed ledger, wherein the first plurality of transactions modify a first set of data objects indicated within the blockchain as owned by the first computing node;
obtain transaction data associated with the second computing node, wherein the transaction data associated with the second computing node includes second metadata corresponding to a second plurality of transactions executed by the second computing node on a second instance of the distributed ledger, wherein the second plurality of transactions modify a second set of data objects indicated within the blockchain as owned by the second computing node;
generate a Merkle tree based on the transaction data associated with the second computing node and the first metadata of the first instance of the distributed ledger, wherein the Merkle tree is generated according to (i) a first computation order, for the first plurality of transactions modifying the first set of data objects indicated within the blockchain as owned by the first computing node, that is prescribed by the first computing node that is indicated within the blockchain as owning the first set of data objects and (ii) a second computation order, for the second plurality of transactions modifying the second set of data objects indicated within the blockchain as owned by the second computing node, that is prescribed by the second computing node that is indicated within the blockchain as owning the second instance;
store the Merkle tree in the first instance of the distributed ledger;
communicate with at least the second computing node to validate the Merkle tree;
complete a signing procedure for the first block; and
add the first block to the first instance of the distributed ledger,
wherein the blockchain is federated and non-public.

14. The computing system of claim 13, wherein the execution of the computer-executable code further causes the computing system to:
determine that the at least one transaction includes a first modification to first data in the first instance of the distributed ledger stored on the first computing node and a second modification to second data in the second instance of the distributed ledger stored on the second computing node; and asynchronously communicate at least the second modification to the second data in the second instance of the distributed ledger to the second computing node, wherein the second computing node asynchronously modifies the second data in the second instance of the distributed ledger in accordance with the second modification without obtaining approval from other computing nodes of the plurality of computing nodes, wherein modifying the first instance of the distributed ledger based on the at least one transaction comprises modifying the first data in the first instance of the distributed ledger in accordance with the first modification without obtaining approval from other computing nodes of the plurality of computing nodes.

15. The computing system of claim 14, wherein the execution of the computer-executable code further causes the computing system to:

communicate a notification to a third computing node of the plurality of computing nodes that the first computing node has modified the first data, wherein responsive to receiving the notification, the third computing node asynchronously modifies a third instance of the distributed ledger.

16. The computing system of claim 14, wherein the transaction data includes the second computation order for the second plurality of transactions, and wherein generating the Merkle tree comprises generating the Merkle tree using the transaction data, the first metadata of the first instance of the distributed ledger, and the second computation order for the second plurality of transactions.

17. One or more non-transitory computer-readable media comprising computer-executable code hosted by a hosted computing environment, wherein the computer-executable code, when executed by one or more processors of the hosted computing environment acting as a first computing node of a plurality of computing nodes implementing a blockchain, causes the hosted computing environment to:

receive, at the first computing node of the plurality of computing nodes, an end-block command to add a first block to the blockchain;

identify at least one transaction received before the end-block command;

modify a first instance of a distributed ledger represented by the blockchain based on the at least one transaction;

identify the at least one transaction for inclusion in the first block in the first instance of the distributed ledger;

identify at least one replicated transaction received from a second computing node of the plurality of computing nodes before the end-block command;

modify the first instance of the distributed ledger based on the at least one replicated transaction;

identify the at least one replicated transaction for inclusion in the first block in the first instance of the distributed ledger;

obtain first metadata of the first instance of the distributed ledger, the first metadata associated with a first plurality of transactions executed by the first computing node on the first instance of the distributed ledger, wherein the first plurality of transactions modify a first set of data objects indicated within the blockchain as owned by the first computing node;

obtain transaction data associated with the second computing node, wherein the transaction data associated with the second computing node includes second metadata corresponding to a second plurality of transactions executed by the second computing node on a second instance of the distributed ledger, wherein the second plurality of transactions modify a second set of data objects indicated within the blockchain as owned by the second computing node;

generate a Merkle tree based on the transaction data associated with the second computing node and the first metadata of the first instanceof the distributed ledger, wherein the Merkle tree is generated according to (i) a first computation order, for the first plurality of transactions modifying the first set of data objects indicated within the blockchain as owned by the first computing node, that is prescribed by the first computing node that is indicated within the blockchain as owning the first set of data objects and (ii) a second computation order, for the second plurality of transactions modifying the second set of data objects indicated within the blockchain as owned by the second computing node, that is prescribed by the second computing node that is indicated within the blockchain as owning the second instance;

store the Merkle tree in the first instance of the distributed ledger;

communicate with at least the second computing node to validate the Merkle tree;

complete a signing procedure for the first block; and add the first block to the first instance of the distributed ledger, wherein the blockchain is federated and non-public.

18. The one or more non-transitory computer-readable media of claim 17:

wherein the first metadata includes the first computation order for the first plurality of transactions, wherein the second metadata includes the second computation order for the second plurality of transactions, wherein generating the Merkle tree comprises generating the Merkle tree using the first plurality of transactions ordered according to the first computation order and the second plurality of transactions ordered according to the second computation order.

* * * * *